(12) United States Patent
Spaniol et al.

(10) Patent No.: US 7,246,479 B2
(45) Date of Patent: *Jul. 24, 2007

(54) AGRICULTURAL BALE ACCUMULATOR

(76) Inventors: Phillip G. Spaniol, 31578 N. 550 East Rd., Streator, IL (US) 60195; Stephen J. Spaniol, 8933 E. 3000 North Rd., Manville, IL (US) 61319; Kevin D. Kaschke, 1507 Diamond Dr., Hoffman Estates, IL (US) 60195

( * ) Notice: Subject to any disclaimer, the term of this patent is extended or adjusted under 35 U.S.C. 154(b) by 0 days.

This patent is subject to a terminal disclaimer.

(21) Appl. No.: 10/208,602

(22) Filed: Jul. 29, 2002

(65) Prior Publication Data

US 2002/0184870 A1 Dec. 12, 2002

Related U.S. Application Data

(63) Continuation of application No. 09/486,902, filed as application No. PCT/US97/15574 on Sep. 2, 1997, now Pat. No. 6,425,235.

(51) Int. Cl.
*A01D 74/04* (2006.01)

(52) U.S. Cl. .......................................... 56/474; 56/476
(58) Field of Classification Search ................ 56/473.5, 56/480, 474, 341, 343, 476; 414/111, 24.5, 414/24.6, 501, 502, 780, 781
See application file for complete search history.

(56) References Cited

U.S. PATENT DOCUMENTS 4,215,964 A * 8/1980 Schrag et al. ................ 414/111
4,259,035 A 3/1981 De Coene et al.

(Continued)

FOREIGN PATENT DOCUMENTS

GB 22979444 A * 8/1996

OTHER PUBLICATIONS

Case 8576 Bale Accumulator Brochure, 1996.*

Way Back Machine web site having linked pages at: http://web.archive.org/web/*/http://casecorp.com (1 page); htpp://web.archive.org/web/19970703210113/www.casecorp.com/agricultural/newequip/hay/newequip.html (1 page); and http://web.archive.org/web/19970703210130/www.casecorp.com/agricultural/newequip/hay/rectbaler.html (2 pages), Authored by Case Corp. © 1997, Published on the Internet on Jul. 03, 1997, Four pages having passages and a photo describing Case IH Model 8576 Mid–size Bale Accumulator. Retrieved from the Internet on Apr. 10, 2003.

(Continued)

*Primary Examiner*—Meredith Petravick

(57) ABSTRACT

An agricultural bale accumulator (100) includes a load bed (113) and a load bed extension module (102). The load bed extension module (102) includes an extension table (104) pivotally connected to a side (124) of a load bed (113) by a hinge mechanism (122). The hinge mechanism (122) permits the load bed extension module (102) to move relative to the load bed (113) between a stowed position, perpendicular to the load bed (113), and an unstowed position, co-planar with a load bed (113) and adjacent to the side (124) of the load bed (113). The agricultural bale accumulator (100) has a first lateral width dimension (160) when the first extension table (104) is in the stowed position to provide a first bale accumulating capacity and a first bale discharging capacity. The agricultural bale accumulator (100) has a second lateral width dimension (161), greater than the first lateral width dimension (160), when the first extension table (104) is in the unstowed position to provide a second bale accumulating capacity and a second bale discharging capacity, greater than the first bale accumulating capacity and the second bale discharging capacity, respectively. Optionally, an extension table support system (130) may also be used to provide additional support for the extension table (104).

80 Claims, 19 Drawing Sheets

U.S. PATENT DOCUMENTS

| | | | | |
|---|---|---|---|---|
| 4,310,275 A | | 1/1982 | Hoelscher | |
| 4,501,111 A | * | 2/1985 | Abbott | 56/8 |
| 4,710,087 A | | 12/1987 | Naaktgeboren et al. | |
| 4,844,675 A | * | 7/1989 | Strosser et al. | 414/111 |
| 4,955,774 A | * | 9/1990 | Van Eecke et al. | 414/111 |
| 5,192,177 A | * | 3/1993 | Cardinal | 414/501 |
| 5,560,191 A | * | 10/1996 | Finney et al. | 56/474 |

OTHER PUBLICATIONS

Way Back Machine web site having linked pages at: http://web.archive.org/web/*/http://agcocorp.com (1 page); and http://web.archive.org/web/19971026232117/www.agco-corp.com/news/625.html (2 pages); Authored by Angie Skochdopole for AGCO Corp., Published on the Internet on Oct. 26, 1997, Three pages including a press release describing AGCO Corp. Hesston ® Model 4720 bale accumulator. @griculture Online, Machinery having linked pages at: http://www.agriculture.com/machinery/1997/0731ag-co.html (1 page); and http://www.agriculture.com/machinery/1997/0731agco.html#12 (1 page), Authored by Gene Johnston, Managing Editor for Successful Farming, Published on the Internet on Aug. 1, 1997, Two pages including a product description of AGCO Corp. Hesston ® Model 4720 bale accumulator.

Product brochure pages for AGCO Corp. Hesston ® Large Bale Systems. (5 pages), Authored by AGCO Corp., Publication date unknown, Five pages including a product description of AGCO Corp. Hesston ® Model 4720 bale accumulator.

Way Back Machine web site having linked pages at: http://web.archive.org/web/*/http://casecorp.com (1 page); http://web.archive.org/web/19970703210113/www.casecorp.com/agricultural/newequip/hay/newequip.html 1 page); and http://web.archive.org/web/19970703210130/www.casecorp.com/agricultural/newequip/hay/rectbaler.html (2 pages). Authored by Case Corp. © 1997. Published on the Internet on Jul. 3, 1997.

Way Back Machine web site having linked pages at: http://web.archive.org/web/*http://agcocorp.com (1 page); and http://web.archive.org/web/19971026232117/www.agco-corp.com/news/625.html (2 pages); Authored by Angie Skochdopole for AGCO Corp. Published on the Internet on Oct. 26, 1997.

@griculture Online, Machinery having linked pages at: http://www.agriculture.com/machinery/1997/0731ag-co.html (1 page); and http://www.agriculture.com/machinery/1997/0731agco.html #12 (1 page). Authored by Gene Johnston, Managing Editor for Successful Farming. Published on the Internet on Aug. 1, 1997.

Product brochure pages for AGCO Corp. Hesston ® Large Bale Systems. (5 pages). Authored by AGCO Corp. Publication date unknown.

* cited by examiner

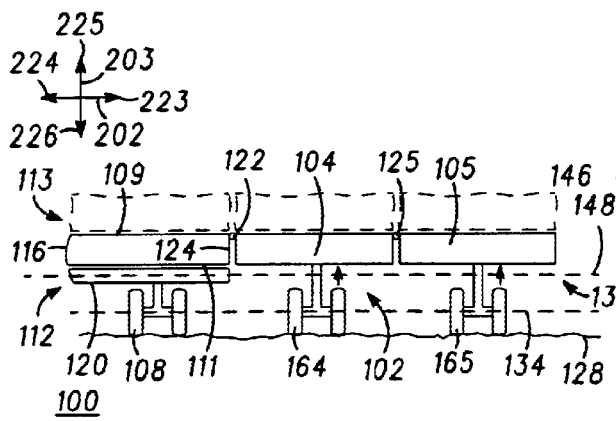
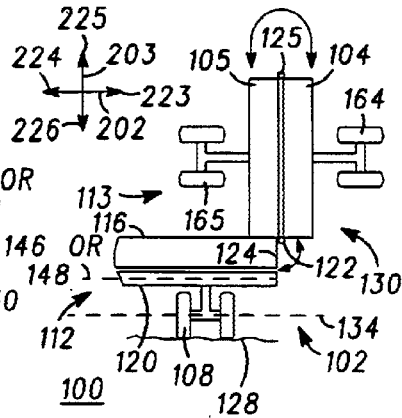
FIG.24    FIG.25
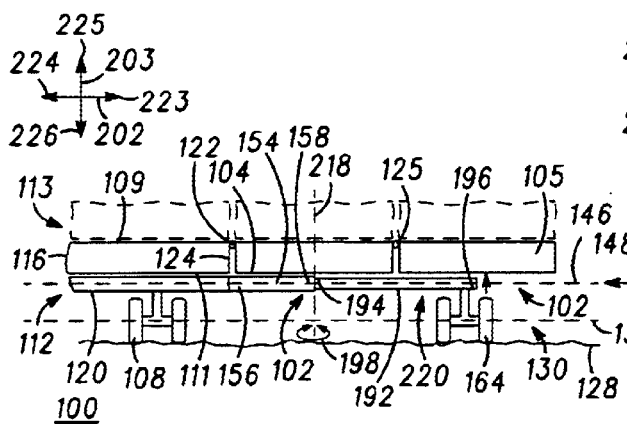
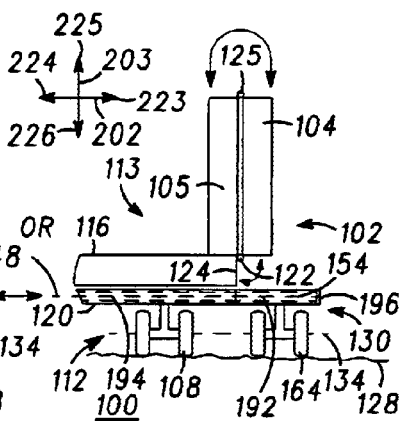
FIG.26    FIG.27
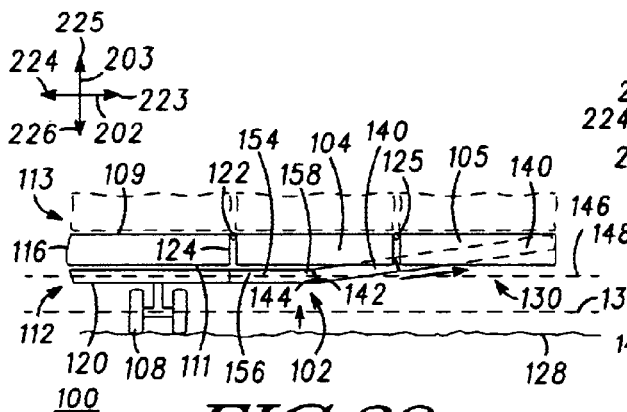
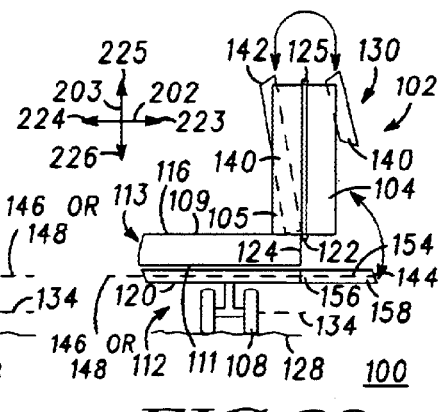
FIG.28    FIG.29

| FIRST SUPPORT SYSTEM (130) \ SECOND SUPPORT SYSTEM (130) | NO SUPPORT | CONNECTED TO EXTENSION TABLE — SUPPORT WHEEL (164) | CONNECTED TO EXTENSION TABLE — FIRST FRAME EXTENSION MEMBER (EX:TRUSS) (140) | CONNECTED TO BASE MODULE AND EXTENSION TABLE — SECOND FRAME EXTENSION MEMBER (EX:CYLINDER) (150) | CONNECTED TO MAIN FRAME — THIRD FRAME EXTENSION MEMBER (EX:FIXED FRAME) (154) | CONNECTED TO MAIN FRAME — FOURTH FRAME EXTENSION MEMBER (EX:MOVEABLE FRAME) (192) |
|---|---|---|---|---|---|---|
| NO SUPPORT | 1 | 2 | 3 | 4 | 5 | 6 |
| CONNECTED TO EXTENSION TABLE — SUPPORT WHEEL (164) | 7 | 8 | 9 | 10 | 11 | 12 |
| CONNECTED TO EXTENSION TABLE — FIRST FRAME EXTENSION MEMBER (EX:TRUSS) (140) | 13 | 14 | 15 | 16 | 17 | 18 |
| CONNECTED TO BASE MODULE AND EXTENSION TABLE — SECOND FRAME EXTENSION MEMBER (EX:CYLINDER) (150) | 19 | 20 | 21 | 22 | 23 | 24 |
| CONNECTED TO MAIN FRAME — THIRD FRAME EXTENSION MEMBER (EX:FIXED FRAME) (154) | 25 | 26 | 27 | 28 | 29 | 30 |
| CONNECTED TO MAIN FRAME — FOURTH FRAME EXTENSION MEMBER (EX:MOVEABLE FRAME) (192) | 31 | 32 | 33 | 34 | 35 | 36 |

FIG.42   212

AGRICULTURAL BALE ACCUMULATOR

CROSS REFERENCE TO RELATED APPLICATIONS

The present application is a continuation application filed under 37 C.F.R. 1.53(b) and 35 U.S.C. 120 of U.S. application having Ser. No. 09/486,902, now U.S. Pat. No. 6,425,235, which was a national stage application filed under 35 U.S.C. 371 of international patent application having Ser. No. PCT/US97/15574, filed on Sep. 2, 1997, by Phillip G. Spaniol, Stephen J. Spaniol and Kevin D. Kaschke, and entitled "Agricultural Bale Accumulator Having A Load Bed Extension Module."

FIELD OF THE INVENTION

The present invention relates generally to agricultural machinery for harvesting crop material such as hay, straw, grass or the like, and more particularly the present invention relates to an agricultural bale accumulator having a load bed extension module.

BACKGROUND OF THE INVENTION

A continuing trend to achieve an efficient farming operation and to decrease manual labor provides the need for efficient and capable agricultural machinery. One type of agricultural machinery is used to harvest crop material such as hay, straw, grass or the like.

An agricultural baler (hereinafter referred to as a "baler") is a widely used piece of mobile equipment which collects and compresses the crop material as it travels over the ground to produce a compact unit of crop, commonly referred to as a bale. The baler may comprise a motorized machine driven by an operator or, alternatively, may comprise a wheeled frame adapted for traveling alongside or behind a tractor. Typically, a baler is a wheeled chassis adapted for hitched connection to a tractor to be towed in tandem behind the tractor. After the baler forms a bale, a cord, such as wire or twine, is tied around the bale to hold the bale together in its compressed form. The baler ejects the tied bales periodically from a bale chamber of a baler as the baler travels over the ground. Each ejected bale may be directly discharged either to a bale accumulator or to the ground for later pick up by a bale collector in order to make the harvesting of the crop material more efficient and to decrease manual labor. Bales provided by either the bale accumulator or the bale collector may then be deposited on a vehicle, such as a tractor trailer, for hauling to another location for storage.

A bale accumulator is a widely used piece of mobile equipment which may comprise a part of a baler or, alternatively, may comprise a wheeled chassis adapted for traveling alongside or behind a baler. Typically, a bale accumulator is a wheeled chassis adapted for hitched connection to a baler to be towed in tandem behind the baler. Examples of conventional bale accumulators are disclosed in U.S. Pat. Nos. 3,272,352, 4,310,275, 4,215,964 and 4,961,679. A bale accumulator is normally arranged to receive a plurality of successive bales as they eject from the bale chamber of the baler and to accumulate the received bales into a group or parcel of accumulated bales for temporary storage. The group of accumulated bales may then be discharged onto the ground in an ordered array permitting mechanical recovery thereof or, otherwise, be mechanically removed from the bale accumulator.

A bale collector is a widely used piece of mobile equipment which may comprise a motorized machine driven by an operator or, alternatively, may comprise a wheeled chassis adapted for traveling alongside or behind a tractor. Typically, a bale collector is a motorized machine driven by an operator. The bale collector is normally arranged to pick up individual bales from the ground and to accumulate the retrieved bales into a group or parcel of collected for temporary storage. The group of collected bales may then be discharged onto the ground in an ordered array permitting mechanical recovery thereof or, otherwise, be mechanically removed from the bale collector.

Since the phrases "bale accumulator" and "bale collector" are sometimes referred to interchangeably in the agricultural industry, the present invention generally refers to both pieces of equipment as a bale accumulator in the sense that both pieces of equipment receive and store bales. Therefore, it is contemplated that the present invention may be used on a bale collector as well as the bale accumulator, as described hereinabove.

Bales vary in size and shape according to the type of baler used to form the bales. The types of balers generally include rectangular balers and round balers. Some rectangular balers form so-called small-sized bales measuring about 36 cm×46 cm×31 cm to 132 cm and weighing 18 kg to 27 kg. Other rectangular balers form so-called medium-sized bales measuring about 80 cm×87 cm×up to 249 cm and weighing 300 to 600 kg. An example of a rectangular baler forming medium-sized bales is disclosed in U.S. Pat. No. 4,525,991. Still other rectangular balers form so-called large-sized bales measuring about 118 cm×127 by up to 274 cm and weighing up to 1000 kg. Examples of rectangular balers forming large-sized bales are disclosed in U.S. Pat. Nos. 4,034,543 and 4,307,528. Some round balers form so-called cylindrical-sized bales measuring about 1.75 m in diameter× 1.75 m long and weighing 450 kg to 675 kg.

The bale accumulator of the present invention is particularly well-suited for use in conjunction with rectangular balers producing the medium-sized bales. However, it will be apparent from the description and claims that follow that the principles of the present invention are not limited to bale accumulators for rectangular balers producing medium-sized bales. The present invention may be utilized with great effectiveness in conjunction with rectangular balers producing the large-sized bales, rectangular balers producing the small-sized bales as well as round balers producing the cylindrical-sized bales.

U.S. Pat. Nos. 4,961,679 and 4,955,774 each disclose an agricultural bale accumulator having a bale-transfer and bale-turning mechanism attached to one side of a chassis and an extension table pivotally attached to an opposite side of the chassis. The extension table is moveable between a horizontal bale accumulating position and a vertical transport position. The extension table and a main bale-receiving table, supported by the chassis, form a load bed for accumulating thereon up to four medium sized bales. The extension table can accommodate one bale when located in the horizontal operative position. When the extension table is attached to the chassis, an additional castor wheel is provided on a main axle supporting the chassis in order to accommodate the extra load that can be accumulated on the extension table. Bales received on one side of the load bed are turned 90 degrees and transferred across the load bed. The bales are discharged using a bale-discharge conveyor that pushes the bales accumulated on the load bed off the load bed to the ground.

However, U.S. Pat. Nos. 4,961,679 and 4,955,774 do not disclose a support system which contacts the extension table at a location beyond a side of a chassis to which the extension table is attached. Therefore, the extension table does not have any direct support for a bale accumulated thereon from either the chassis or the ground. A lack of direct support for the extension table places all the stress due to the weight of a bale on the hinge which may weaken or break over time under normally rigorous field conditions. These patents also do not disclose attaching the extension table to the main bale-receiving table. These patents also do not disclose a bale discharge module for moving the main bale-receiving table between a bale accumulating position and bale discharging position, wherein the main bale-receiving table is in a horizontal position and an inclined position, respectively, relative to the chassis. Therefore, these patents do not teach or suggest a need for supporting an extension table, at a location beyond a side of the load bed to which the extension table is attached, when the extension table is in the unstowed position and when the load bed is in a bale accumulating position and/or a bale discharging position relative to a main frame.

U.S. Pat. No. 4,844,675 discloses an agricultural bale accumulator having a center table, a right table and a left table. The center table receives large-sized bales from a bale chamber of a baler. A push bar pushes a bale on the center table to the right or left table. The right and left tables are provided with associated extensions which appear to have a width dimension approximately equal to one third a width dimension of each of the right and left tables. A hinge connects each extension to its associated table so that it may be moved between a transport and storage position on a top surface of its associated table and an unfolded position coplanar with its associated table. When an extension is in its transport and storage position, a sensor is actuated to give a false indication that a bale in on its associated table. The sensor provides a control signal to the push bar to prevent movement of the push bar toward that table thereby preventing damage to the push bar that would result if a bale were moved onto a table whose extension is folded to the transport and storage position. The right and left tables are pivotally mounted on their frames between a bale accumulating position and a bale discharging position so that when the tables are unlatched they tilt downwardly at the rear of the tables under the weight of the bale to permit a bale carried thereon to slide to the ground as the bale accumulator continues its forward movement. When the weight of the bale is removed from a table a spring pulls the table back to its latched position.

However, U.S. Pat. No. 4,844,675 does not disclose a purpose for the extensions when unfolded to a position coplanar with the associated tables. Since the extensions appear to have a width dimension approximately equal to one third a width dimension of each of the right and left tables, it is clear that each of the extensions cannot accumulate an additional large bale. This patent also does not disclose a support system that contacts the extension at a location beyond the side of the table to which the extension is attached. Therefore, the extension does not have any direct support for a partial bale that may be accumulated thereon from either a main frame or the ground. A lack of direct support for the extension places all the stress due to the weight of a partial bale on the hinge that may weaken or break over time under normally rigorous field conditions. Further, this patent does not teach or suggest a need for supporting the extension, at a location beyond the side of the table to which the extension is attached, when the extension is m the unstowed position and when the table is in the bale accumulating position and/or the bale discharging position.

Hoelscher, Inc., located at 312 S. Main, P.O Box 195, Bushton, Kans., U.S.A., 67427, manufactures a bale accumulator Model 1030 having a load bed pivotally mounted to a main frame. The load bed includes a center table and two side tables on opposite sides of the center table. The bale accumulator bale has a carrying capacity of three total bales on each of the three tables and a bale dumping capacity of two of the three total bales from the two side tables. The center table continuously receives bales from a bale chamber of a baler during while baling and is not permitted to dump any bales. The two side tables dump the two bales by pivoting about a pivot axis between a bale accumulating position and a bale discharging position, wherein the two side tables are in a horizontal position and an inclined position, respectively, relative to the main frame.

However, Holescher's bale accumulator Model 1030 is limited to a bale accumulation capacity of three bales and to a bale discharge capacity of two bales. Holescher's bale accumulator does not have an extension table connected to a load bed and moveable relative to the load bed between a stowed position and an unstowed position, wherein the extension table is substantially co-planar with the load bed and adjacent to the side of the load bed when the extension table is in the unstowed position to permit the extension table to accumulate thereon an additional bale. Therefore, Holescher's bale accumulator Model 1030 cannot accumulate more than three bales.

Recently, Case IH Corporation, located at 700 State Street, Racine, Wisconsin, Illinois, 53404, U.S.A., introduced a bale accumulator Model 8576 having a load bed pivotally mounted to a main frame. The load bed includes a center table and two side tables on opposite sides of the center table. The two side tables each have an extension table pivotally attached a longitudinal side thereof and moveable between a stowed, road transport position and an unstowed, bale accumulating position. The bale accumulator Model 8576 has a bale has a carrying capacity of five total bales on each of the three tables and the two extension tables and a bale dumping capacity of four of the five total bales from the two side tables and the two extension tables. The center table continuously receives bales from a bale chamber of a baler during while baling and is not permitted to dump any bales. The two side tables and the two extension tables dump the two bales by pivoting, about a pivot axis mounted on the main frame, from a bale accumulating position to a bale discharging position, wherein the two side tables are in a horizontal position and an inclined position, respectively, relative to the main frame.

Further, GB 2 297 944A publication discloses, at page 3, line 19 to page 4, line 11: "a bale accumulator having a central fixed bale-receiving surface 6 mounted on a main frame 1. Alongside the central fixed bale-receiving surface 6 are mounted two tipping surfaces 7, each having an inner portion 7a and an outer portion 7b pivotally connected thereto so as to be pivotable between a working position, in which the inner and outer portions 7a and 7b lie in the same plane so as to form between them a single secondary bale-receiving surface, and a transport position, in which the outer portions 7b extend generally vertically from the inner portions 7a. The pivoting of the outer portions 7b is achieved by means of extended side frame members 8 connected through pivots 9 to the front and rear of the respective inner portions 7a. In the transport position, the extended side frame members 8 come into contact with stop members 10 extending from the main frame 1 when they have passed just over the top dead center position, so that they are held in position without need for locking devices. The outer portions 7b are readily manually pivoted outwardly and downwardly to their operative positions without the need for any power assistance. However, should it be desired to provide power lifting and lowering of the outer portions 7b, this could readily be achieved by means of hydraulic rams or the like extending between the outer and inner portions, for example." The bale accumulator has a bale has a carrying capacity of three total bales (one on the central fixed bale-receiving surface 6 and one each on the two tipping surfaces 7) and a bale discharge capacity of two of the three total bales from the two tipping surfaces 7.

However, each one of Case IH Corporation's bale accumulator Model 8576 and the GB 2 297 944A publication does not disclose a support system which contacts the extension table, at a location beyond the side of the load bed to which the extension table is attached, when the extension table is in the unstowed position and when the load bed is in the bale accumulating position and/or the bale discharging position. Therefore, the extension table does not have any direct support for a bale that may be accumulated thereon from either a main frame or the ground. A lack of direct support for the extension table places all the stress due to the weight of a bale on a hinge that may weaken or break over time under normally rigorous field conditions.

U.S. Pat. Nos. 4,961,679 and 4,955,774, 4,844,675, Case IH Corporation's bale accumulator Model 8576, and GB 2 297 944A each teach only one extension table pivotally attached to one side of the chassis, load bed, load bed and load bed, respectively. These references do not teach or suggest attaching additional extension tables to the one extension table or supporting the one extension table in combination with any additional extension tables. Further, each of these references teaches a hinged connection between the extension table and the load bed.

Accordingly, there is a need for an agricultural bale accumulator having a load bed extension module that overcomes the disadvantages of the prior art described hereinabove.

BRIEF DESCRIPTION OF THE DRAWINGS

FIGS. 24 and 25 illustrate, in a rear side elevation view, a night side of an agricultural bale accumulator having a third embodiment of a load bed extension module including a first extension table and a third extension table each being located in an unstowed position and a stowed position, respectively, and a load bed being located in a bale accumulating position.

FIGS. 26 and 27 illustrate, in a rear side elevation view, a right side of an agricultural bale accumulator having a fourth embodiment of a load bed extension module including a first extension table and a third extension table each being located in an unstowed position and a stowed position, respectively, and a load bed being located in a bale accumulating position.

FIGS. 28 and 29 illustrate, in a rear side elevation view, a right side of an agricultural bale accumulator having a fifth embodiment of a load bed extension module including a first extension table and a third extension table each being located in an unstowed position and a stowed position, respectively, and a load bed being located in a bale accumulating position.

FIG. 42 illustrates a table having thirty-six embodiments of an extension table support system for a load bed extension module for use on and/or off a pivot axis for one or more extension tables.

DETAILED DESCRIPTION OF THE PREFERRED EMBODIMENTS

I. Overview

Figure 1:
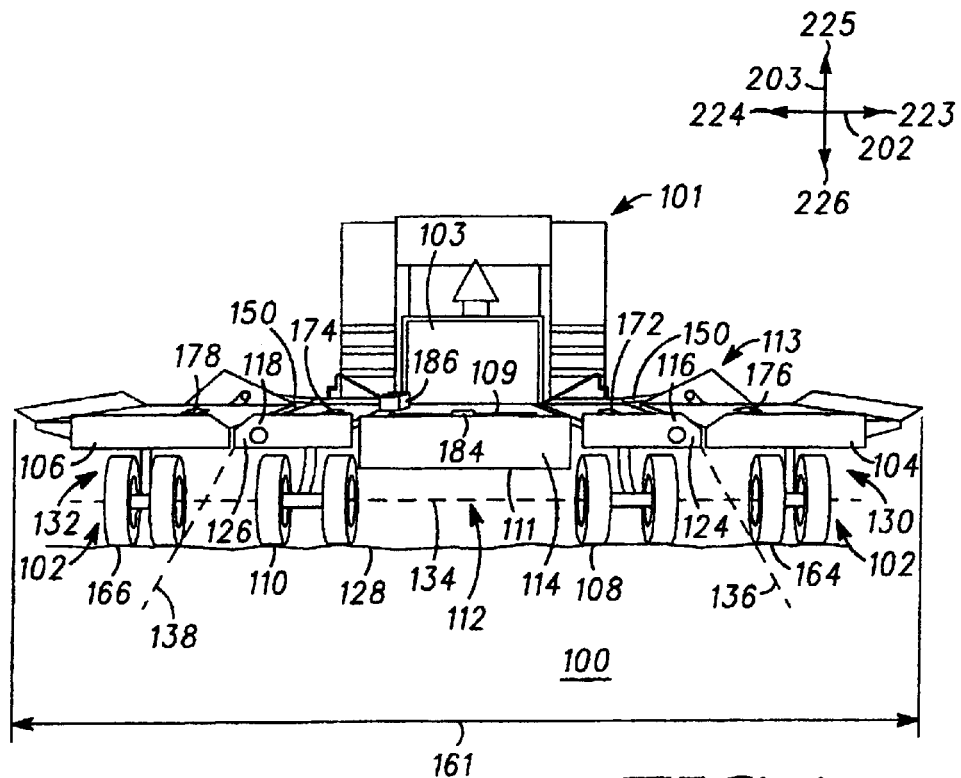
FIGS. 1 and 2 illustrate, in a top and rear side perspective view, an agricultural bale accumulator having a first embodiment of a load bed extension module including a first extension table and a second extension table each being located in an unstowed position and a stowed position, respectively, and a portion of the load bed being located in a bale accumulating position.

Generally referring to all the figures, for the sake of convenience and facilitating a better understanding the preferred embodiments, the figures include a reference diagram illustrating three dimensions and should not limit the scope of the present invention. The reference diagram includes a first axis 201, a second axis 202 and a third axis 203. The reference diagram used in conjunction with the agricultural bale accumulator 100 and/or components thereof is determined with reference to the orientation of agricultural bale accumulator 100. The first axis 201 lies along a longitudinal axis of the agricultural bale accumulator 100. The second axis 202 lies along a lateral axis of the agricultural bale accumulator 100 and is transverse to the first axis 201. A third axis 203 lies in a vertical relationship to the agricultural bale accumulator 100 and is transverse to both the first axis 201 and the second axis 202.

Arrows on the ends of each of the first axis 201, the second axis 202 and the third axis 203 are numbered to indicate direction along each of the three axes. On the first axis 201, arrows 221 and 222 represent a forward direction and a rearward direction, respectively. On the second axis 202, arrows 223 and 224 represent a right direction and a left direction, respectively. On the third axis 203, arrows 225 and 226 represent an upward direction and a downward direction, respectively. For example, the direction of forward operative travel of the agricultural bale accumulator is in the forward direction represented by arrow 221 along the first axis 201.

Figure 40:
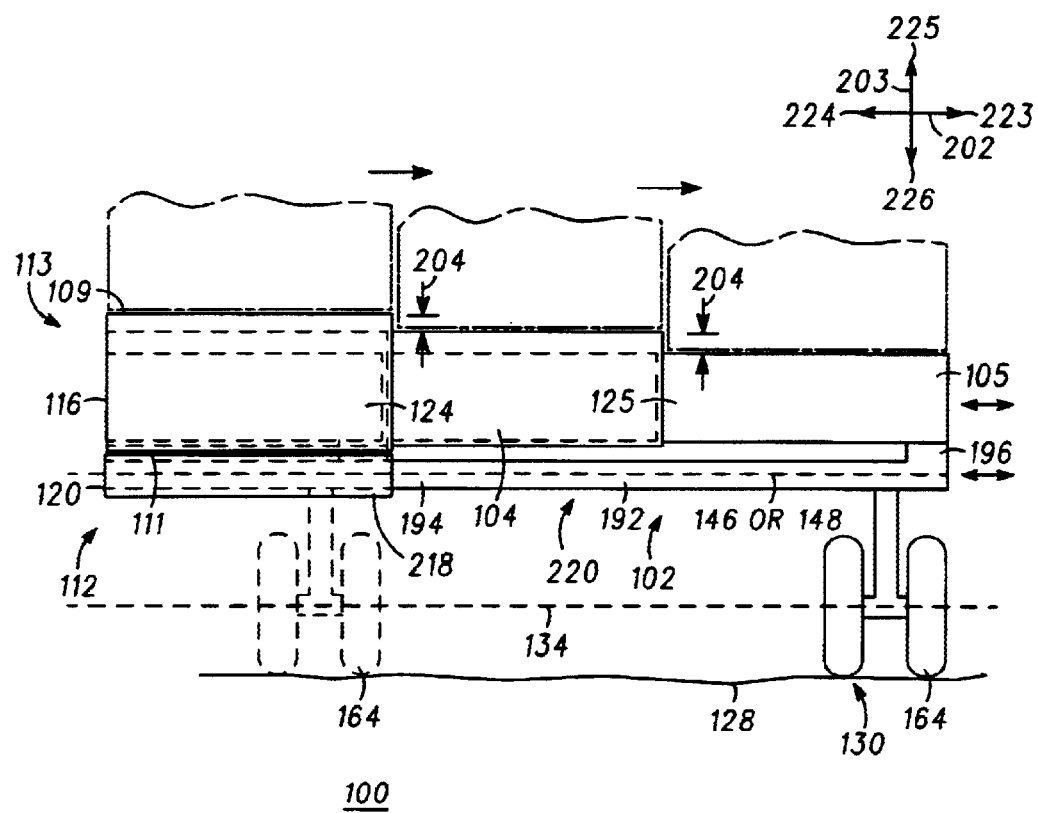
Figure 41:
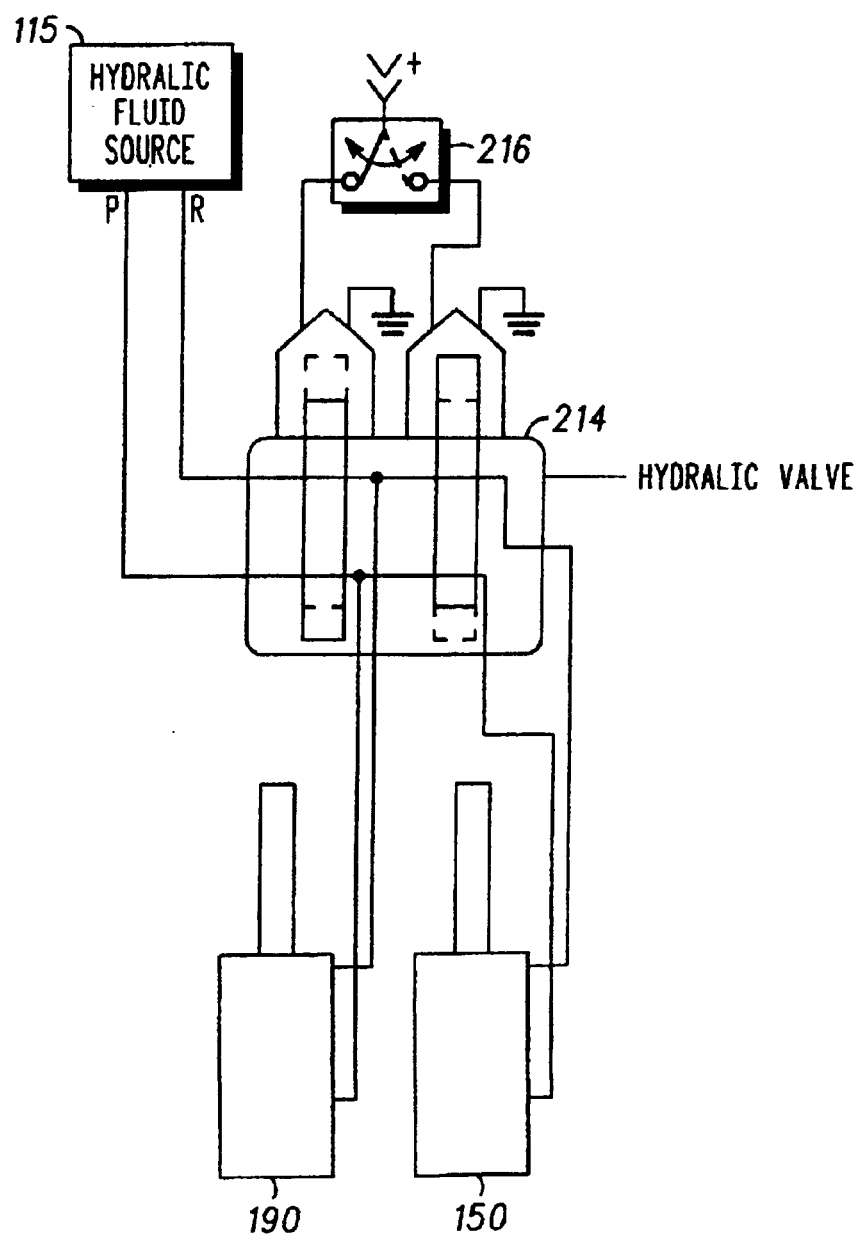
FIG. 41 illustrates a schematic diagram of a hydraulic system for use with the agricultural bale accumulator of FIGS. 1 through 40.

Generally referring to all the figures, FIGS. 1–10 illustrate an agricultural bale accumulator 100 having a first embodiment of a load bed extension module 102. FIGS. 11–23 illustrate an agricultural bale accumulator 100 having a second embodiment of the load bed extension module 102. FIGS. 24–40 illustrate an agricultural bale accumulator 100 having third through twelfth embodiments of the load bed extension module 102. FIG. 41 illustrates a schematic diagram of a hydraulic system for use with the agricultural bale accumulator 100 of FIGS. 1 through 40. FIG. 42 illustrates a table 212 having thirty-six embodiments of an extension table support system for the load bed extension module 102 for use on and/or off a pivot axis for one or more extension tables. The table 212 includes the twelve embodiments of the load bed extension module 102 illustrated in FIGS. 1–40.

II. Base Module

Figure 2:
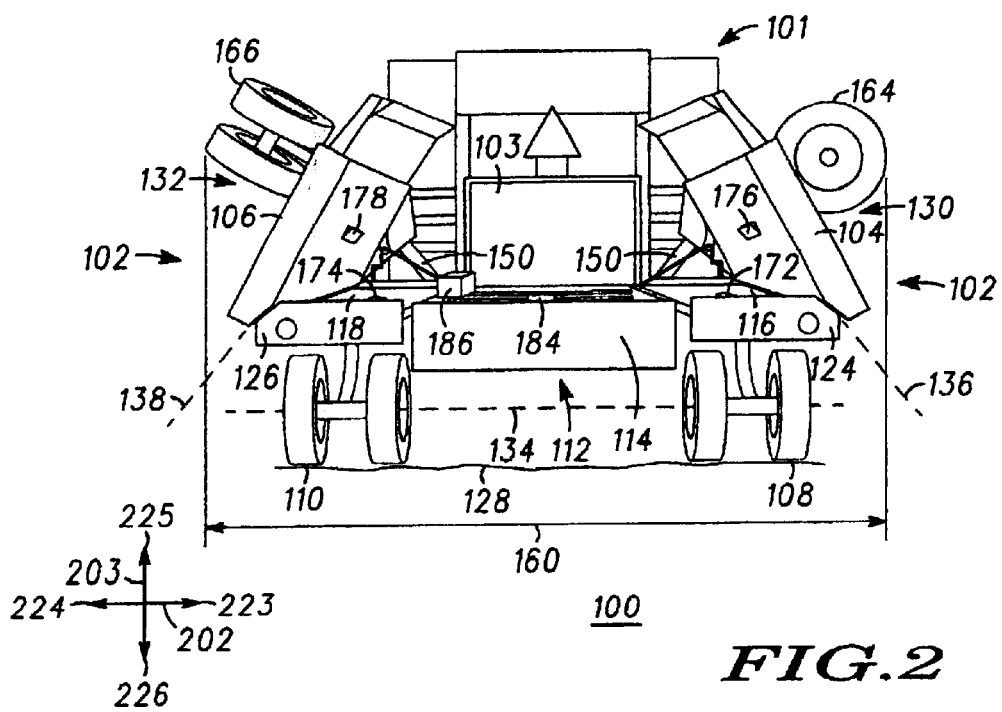
Figure 11:
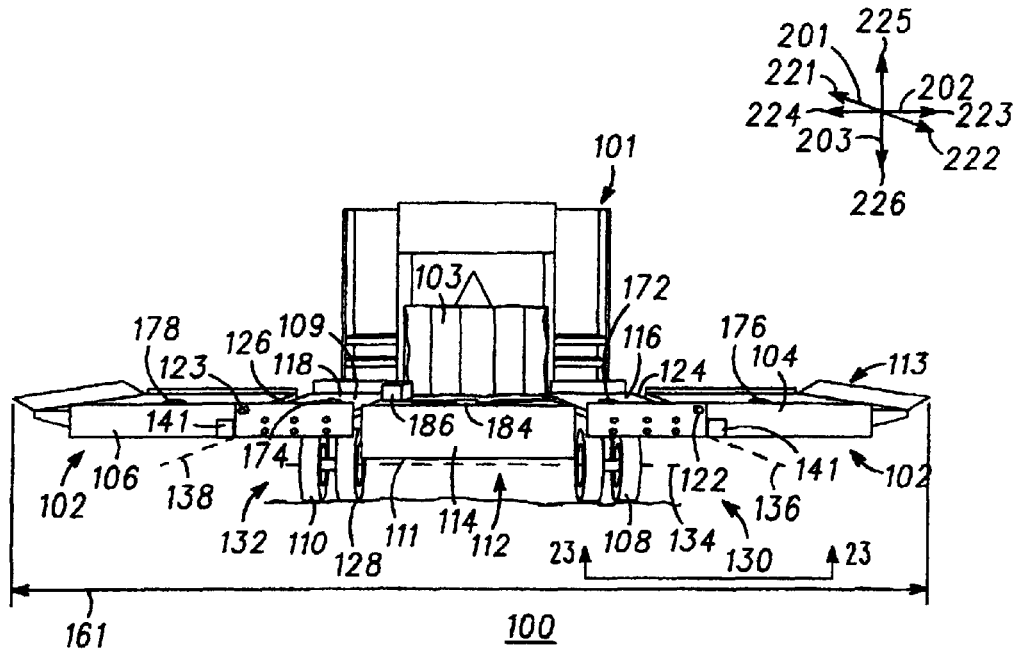
FIGS. 11 and 12 illustrate, in a top and rear side perspective view, an agricultural bale accumulator having a second embodiment of a load bed extension module including a first extension table and a second extension table each being located in an unstowed position and a stowed position, respectively, and a portion of the load bed being located in a bale accumulating position.
Figure 12:
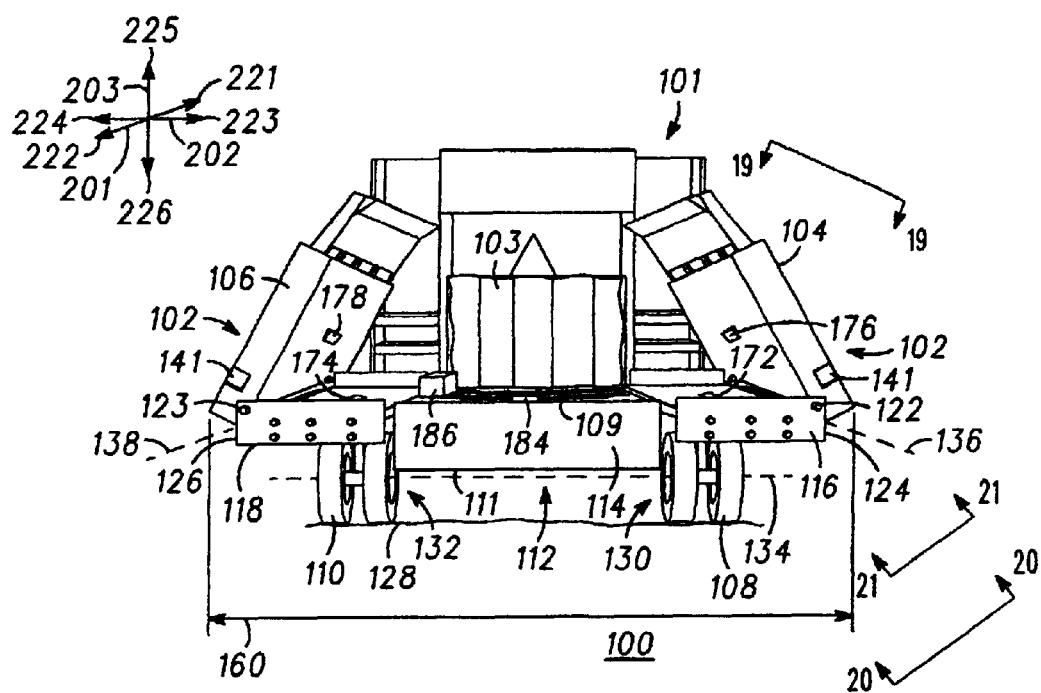

FIGS. 1 and 2 illustrate, in a top and rear side perspective view, an agricultural bale accumulator 100 (hereinafter referred to as "bale accumulator") having a first embodiment of a load bed extension module 102 including a first extension table 104 and a second extension table 106 each being located in an unstowed position and a stowed position, respectively, and a portion 116 and 118 of the load bed 113 being located in a bale accumulating position. FIGS. 11 and 12 illustrate, in a top and rear side perspective view, an agricultural bale accumulator 100 having a second embodiment of a load bed extension module 102 including a first extension table 104 and a second extension table 106 each being located in an unstowed position and a stowed position, respectively, and a portion 116 and 118 of the load bed 113 being located in a bale accumulating position.

The bale accumulator 100 has a modular construction and generally comprises a base module 112, the load bed extension module 102, a bale transfer module 186, and a bale discharge module 116, 118, 190. In the preferred embodiments, the base module 112 comprises a main frame 120 for supporting a load bed 113 and a pair of ground engaging castor wheels 108 and 109 for supporting the main frame 120 above a ground surface 128.

The load bed 113 is substantially planar and successively receives a plurality of bales from a bale chamber 103 of an agricultural baler 101 along the first axis 201 in a rearward direction 222 essentially opposite to a direction of travel 221 of the baler 101 to accumulate the bales on load bed 113. The load bed includes a center load bed 114, a right load bed 116 and a left load bed 118. As will be described with reference to FIGS. 1 through 4 and 11 through 14, the portion 116 and 118 of the load bed 113 moves between a bale accumulating position and a bale discharging position while the center load bed 114 remains in a fixed position relative to the main frame 120.

The base module 112 supports the load bed extension module 102 which is operative to receive and accumulate additional bales, the bale-transfer module 186 which is operable to displace bales transversely on the load bed 113 and bale-discharge module 116, 118, 190 which is operative to discharge bales to the ground. Each of the load bed extension module 102, the bale-transfer module 186 and the bale-discharge module 116, 118, 190 will be described in detail hereinbelow.

As shown in FIGS. 1 and 11, each of the first 104 and second 106 extension tables are substantially co-planar with the load bed 113 and adjacent to a first side 124 and a second side 126, respectively, of the load bed 113 when each of the first 104 and second 106 extension tables are in the unstowed position to permit each of the first 104 and second 106 extension tables to accumulate thereon at least one of the plurality of bales received on the load bed 113. As shown in FIGS. 2 and 12, each of the first 104 and second 106 extension tables are substantially raised to an inclined position relative to the load bed 113 when each of the first 104 and second 106 extension tables are in the unstowed position to permit the bale accumulator 100 to be stored or to be transported on a public roadway.

In FIGS. 1 and 11, the bale accumulator 100 has a lateral width dimension 161 of approximately 548 cm when each of the first 104 and second 106 extension tables are in the unstowed position. In FIGS. 2 and 12 the bale accumulator 100 has a lateral width dimension 160 of approximately 335 cm when each of the first 104 and second 106 extension tables are in the stowed position. Therefore, a lateral width dimension of the load bed 113 is increased by 213 cm when each of the first 104 and second 106 extension tables are in the unstowed position. With these lateral width dimensions, the bale accumulator 100 is permitted to accumulate up to five medium sized bales on the load bed 113 across the lateral axis 202 of the load bed 113 when each of the first 104 and second 106 extension tables are in the unstowed position.

By contrast, U.S. Pat. Nos. 4,961,679 and 4,955,774 teaches the accumulation of up to only four bales across a lateral axis of the load bed, U.S. Pat. No. 4,844,675 teaches the accumulation of up to only three bales across a lateral axis of the center, right and left tables, and Holescher's bale accumulator Model 1030 teaches the accumulation of up to only three bales across a lateral axis of load bed. Therefore, the bale accumulator 100 of the present invention increases the bale accumulating capacity along a lateral axis of a bale accumulator by one or two additional bales over that provided by the bale accumulators described in these references to increase the bale accumulator's bale accumulating efficiency by 25% and 66%, respectively.

As shown in FIGS. 1 and 11, the portion 116 and 118 of the load bed 113 is located in a bale accumulating position which is a horizontal position relative to the main frame 120 to permit the load bed 113 and the first 104 and second 106 extension tables to accumulate thereon the plurality of bales.

The bale accumulator 100 is hitched or attached to the agricultural baler 101, which is partially shown in FIGS. 1–5, 7, 11–15, and 19 of the drawings, by a coupling device comprising, on one hand, a ring or eye bolt attached to the main frame 120 of the bale accumulator 100 and disposed to enter in to a socket coupled to the main frame 120 and to receive a coupling pin therethrough and, on the other hand, a pair of transversely spaced apart tie rods provided at opposite ends of the eye bolt. Each tie rod is attached at its opposite ends to the baler 101 and the main frame 120 by ball joints. In an alternative arrangement only one such tie rod is provided. With this form of hitching or connection, the bale accumulator 100 cannot move in yaw relative to the baler 101 on the one hand while limited movement in the two other main connections is allowed on the other hand. Indeed, the bale accumulator 100 and the baler 101 can move relative to each other to a limited degree in pitch about the ball joints and the eye bolt and in addition thereto the coupling device allows the accumulator and the baler to move relative to each other about a longitudinal, fore-and-aft axis of the two components. The inability of the baler 101 and the bale accumulator 100 to move relative to each other in yaw requires that the two ground-engaging-wheels 108 and 110 of the bale accumulator 100 are castor wheels that are pivotable about generally vertical axes. The foregoing arrangement is necessary to guarantee that, in use, the bales emerging from a bale chamber 103 of the baler 101 are always received at precisely the same location on the bale accumulator 100 by virtue of the bale accumulator 100 always having a bale receiving portion a load bed 114 properly aligned with the bale chamber 103. However, for transport purposes, the bale accumulator 100 should be able to assume, when seen in a horizontal plane, an angled position relative to the pulling baler 101. To this end, the tie rods are removed and the castor wheels are secured in their fixed positions relative to the main frame 120 whereby the bale accumulator 100 becomes a conventional trailed unit.

III. Bale Transfer Module

The bale transfer module distributes a plurality of bales received on the load bed 113 across the load bed 113 and the first and second extension tables 104 and 106 to accumulate the plurality of bales on the load bed 113 and the first and second extension tables 104 and 106 in a side by side relationship when the first and second extension tables 104 and 106 are each in the unstowed position and when the portion 116 and 118 of the load bed 113 is in the bale accumulating position.

In the preferred embodiments, the bale transfer module 186 comprises a push bar 186 operable to alternately transfer bales transversely across the load bed 113 along the second axis 202 as they are received onto the load bed 113 from the bale chute 103 of the baler 101. The push bar 186 and its associated drive mechanism is known in the bale accumulator art as shown in U.S. Pat. Nos. 4,961,679, 4,955,774 and 4,844,675, herein incorporated by reference, Holescher's bale accumulator Model 1030, and Case IH Corporation's bale accumulator Model 8576, for example, referred to hereinabove in the background section.

Alternatively, other types of bale transfer modules may be implemented the bale accumulator 100 without departing from the spirit of the present invention. Such other bale transfer modules may include for example, a robotic arm assembly as shown in U.S. Pat. Nos. 4,961,679, 4,955,774 or a moveable platform as shown in U.S. Pat. Nos. 4,710,086 and 4,710,087, each of which is herein incorporated by reference.

IV. Bale Discharge Module

Figure 3:
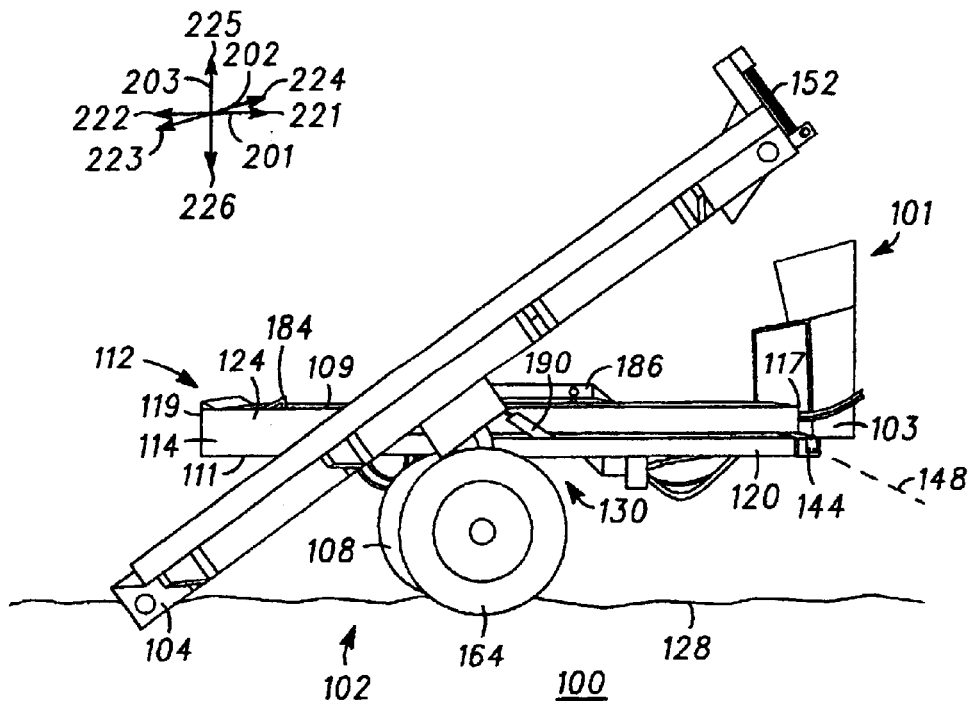
FIGS. 3 and 4 illustrate, in a top and right side perspective view and a top and rear side perspective view, respectively, the agricultural bale accumulator of FIG. 1 having the first embodiment of the load bed extension module including the first extension table and the second extension table each being located in the unstowed position and the portion of the load bed being located in a bale discharging position.
Figure 4:
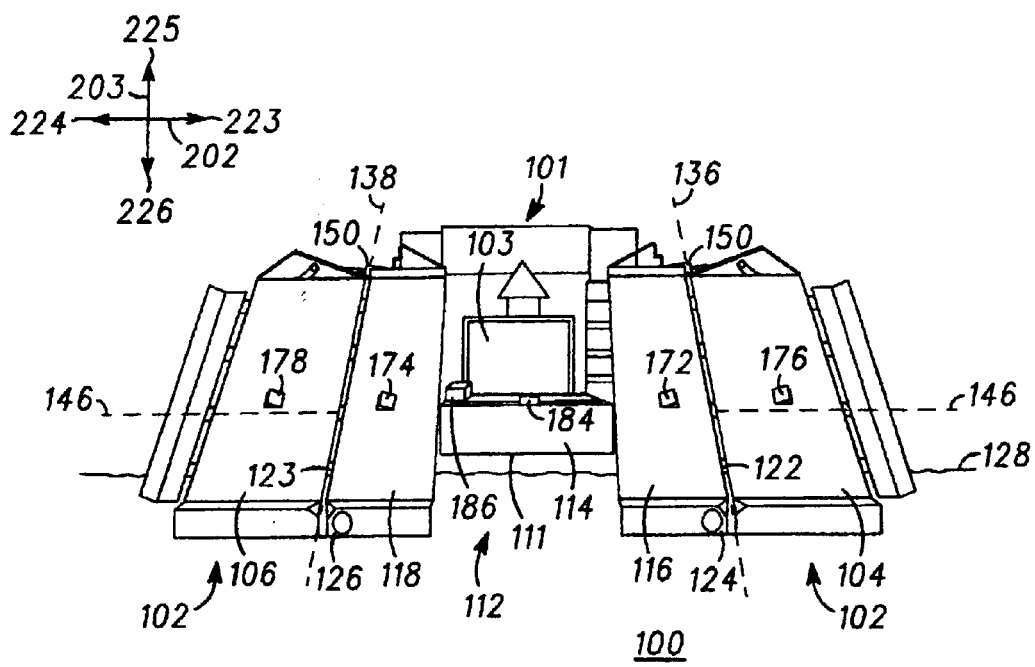
Figure 13:
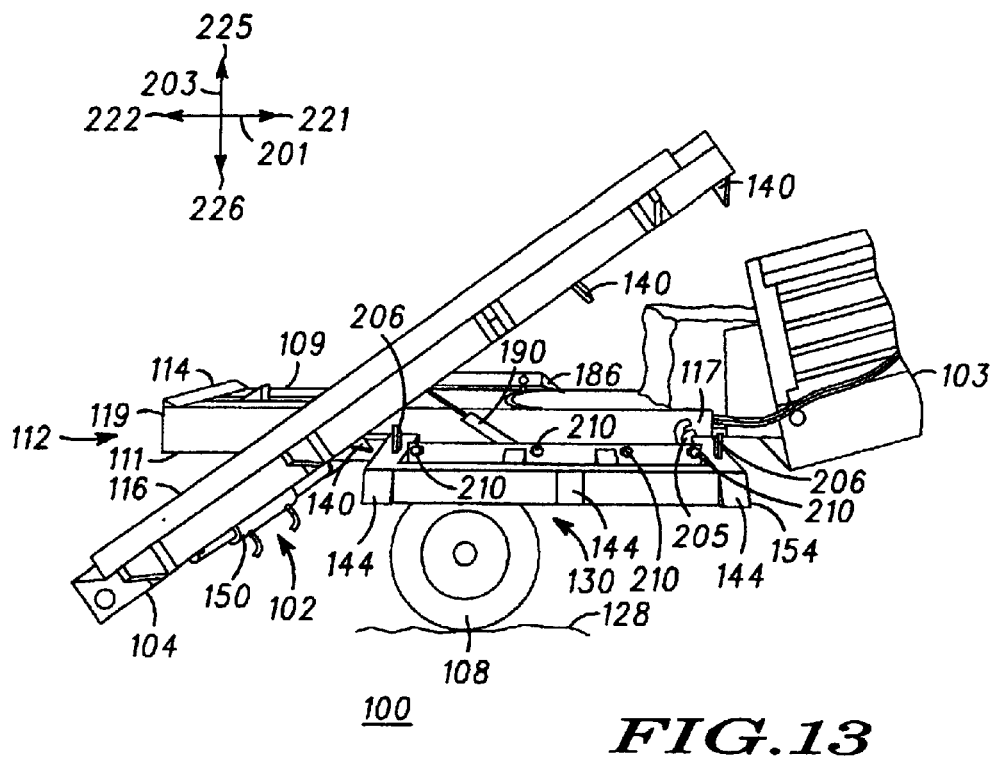
FIGS. 13 and 14 illustrate, in a top and right side perspective view and a top and rear side perspective view, respectively, the agricultural bale accumulator of FIG. 11 having the second embodiment of the load bed extension module including the first extension table and the second extension table each being located in the unstowed position and the portion of the load bed being located in a bale discharging position.
Figure 14:
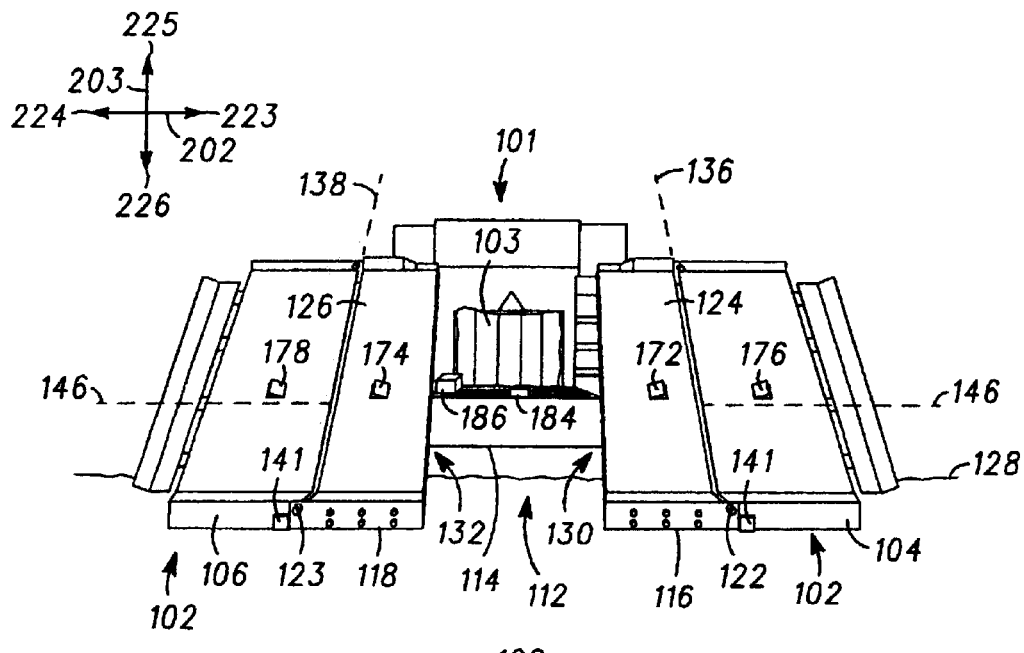

FIGS. 3 and 4 illustrate, in a top and right side perspective view and a top and rear side perspective view, respectively, the agricultural bale accumulator 100 of FIG. 1 having the first embodiment of the load bed extension module 102 including the first extension table 104 and the second extension table 106 each being located in the unstowed position and a portion 116 and 118 of the load bed 113 being located in a bale discharging position. FIGS. 13 and 14 illustrate, in a top and right side perspective view and a top and rear side perspective view, respectively, the agricultural bale accumulator 100 of FIG. 11 having the second embodiment of the load bed extension module 102 including the first extension table 104 and the second extension table 106 each being located in the unstowed position and the portion 116 and 118 of the load bed 113 being located in a bale discharging position.

In the preferred embodiments, the bale discharge module comprises the portion 116 and 118 of the load bed 113 and a hydraulic cylinder 190. The portion 116 and 118 of the load bed 113 is pivotally connected to the main frame 120 about a pivot point 188 disposed on a horizontal pivot axis 146 and moveable relative to the main frame 120 between the bale accumulating position and the bale discharging position. The portion 116 and 118 of the load bed 113 is in a horizontal position relative to the main frame 120 when the portion 116 and 118 of the load bed 113 is in the bale accumulating position to permit the portion 116 and 118 of the load bed 113, the first extension table 104 and the second extension table 106 to accumulate thereon the plurality of bales. The portion 116 and 118 of the load bed 113 is in an inclined position relative to the main frame 120 when the load bed 113 is in the bale discharging position to permit the portion 116 and 118 of the load bed 113 and the first 104 and second 106 extension tables to discharge the plurality of bales accumulated thereon to the ground surface 128.

Alternatively, other types of bale discharge modules may be implemented the bale accumulator 100 without departing from the spirit of the present invention. Such other bale discharge modules may include for example, conveyor chains having push plates which push the accumulated bales off a horizontal load bed to the ground as shown in U.S. Pat. Nos. 4,961,679 and 4,955,774, each of which is herein incorporated by reference. An advantage of this embodiment for a bale discharge module is that the load bed is rigidly fixed to the main frame to provide a stable support for the accumulated bales during the bale accumulating and bale discharging operations.

Still an other bale discharge modules may include, for example, a load bed pivotally mounted on to a main frame and moveable between a bale accumulating position and a bale discharging position so that when the load bed is unlatched, the load bed tilts downwardly at the rear of the load bed under the force of gravity acting on the weight of the accumulated bales to permit the bales carried thereon to slide to the ground as the bale accumulator continues its forward movement. When the weight of the bales is removed from the load bed a spring pulls the load bed to its latched position. An advantage of this embodiment for a bale discharge module is that a hydraulic dump cylinder is not needed to forcibly raise the load bed and the bales accumulated thereon to its bale discharging position.

V. Load Bed Extension Module

With continuing reference to the first and second embodiments shown in FIGS. 1–4 and 11–14, respectively, the load bed extension module 102 generally includes a first extension table 104, a first extension table attachment mechanism 122 and a first extension table support system 130. While the following description of the load bed extension module 102 will be given with reference to the first, right side 124 of the load bed 113, the load bed extension module 102 is also intended to apply to the second, left side 126 of the load bed 113 in a similar manner as that described for first, right side 124 of the load bed 113. However, while use of the load bed extension module 102 on each side of the load bed 113 is preferred, the load bed extension module 102 is not required to be used on both sides of the load bed 113 at the same time.

A. Extension Table Attachment Mechanism

The first extension table attachment mechanism connects the first extension table 104 to the base module 112 to permit the first extension table 104 to be moveable relative to the base module 112 between the stowed position and the unstowed position. The stowed and unstowed positions are described hereinabove.

Preferably, the first extension table attachment mechanism is a hinge 122 located on a first hinge axis 136. Likewise, the second extension table 106 is connected to the second side 126 of the base module 112 with a hinge 123 disposed along a second hinge axis 138. Alternatively, the first extension table attachment mechanism may be a telescoping mechanism as shown in FIG. 40 and described in further detail herein below.

Preferably, the first extension table 104 is connected to the right load bed portion 116 of the load bed 113 and permitted to move with the right load bed portion 116 of the load bed 113 when the right load bed portion 116 of the load bed 113 moves between the bale accumulating position and the bale discharging position. Likewise, the second extension table 106 is connected to the left load bed portion 118 of the load bed 113 and permitted to move with the left load bed portion 118 of the load bed 113 when the left load bed portion 118 of the load bed 113 moves between the bale accumulating position and the bale discharging position. This arrangement permits the bale accumulator 100 to discharge any bales located on the right 116 and left 118 portions of the load bed 113 and the first 104 and second 106 extension tables at the same time by moving the right 116 and left 118 portions of the load bed 113 to the bale discharging position relative to the main frame 120. Alternatively, the load bed extension module 102 is equally well suited for use with a bale discharge module wherein a load bed does not tilt relative to a main frame, such as the chain driven push plates described hereinabove. In this alternative case, the first 104 and second 106 extension tables can be attached directly to the main frame 120, as opposed to the load bed 113, if so desired.

B. Extension Table Support System

The first extension table support system 130 is connected to at least one of the base module 112 and the first extension table 104. The first extension table support system 130 contacts the first extension table 104 at a location beyond the first side 124 of the load bed 113 and contacts at least one of the base module 112 and the ground surface 128 to support the first extension table 104 from at least one of the base module 112 and the ground surface 128, respectively, when the first extension table 104 is in the unstowed position.

Generally, the first extension table support system 130 comprises five embodiments which will be described in detail below. The first embodiment of the first extension table support system 130 utilizes a support wheel 164. The second, third, fourth and fifth embodiments of the first extension table support system 130 utilize a first 140, second 150, third 154 and fourth 192 frame extension members, respectively. For the sake of convenience and to facilitate a better understanding of the present invention, embodiments of the first 140, second 150, third 154 and fourth 192 frame extension members comprise a truss member, a collapsible cylinder, a fixed frame member and a moveable frame member, respectively, which should not limit the spirit and scope of the present invention.

The support wheel 164 will be described in further detail with reference to the first, third, fourth, sixth, seventh, eleventh, and twelfth embodiments of the load bed extension module 102, as shown in FIGS. 1–10, 24 and 25, 26 and 27, 30 and 31, 32 and 33, 39, and 40, respectively. The truss member of the first frame extension member 140 will be described in further detail with reference to the first, second, fifth, seventh, eight and ninth embodiments of the load bed extension module 102, as shown in FIGS. 1–10, 11–23, 28 and 29, 32 and 33, 34 and 35, and 36 and 37, respectively. The collapsible cylinder of the second frame extension member 150 is described with reference to the first, second, and ninth embodiments of the load bed extension module 102, as shown in FIGS. 1–10, 11–23, and 36 and 37, respectively. The fixed frame member of the third frame extension member 154 will be described in further detail with reference to the second, fourth, and fifth, embodiments of the load bed extension module 20, as shown in FIGS. 11–23, 26 and 27, and 28 and 29, respectively. The moveable frame member of the fourth frame extension member 192 will be described in further detail with reference to the fourth, sixth, seventh, eleventh and twelfth embodiments of the load bed extension module 20, as shown in FIGS. 26 and 27, 30 and 31, 32 and 33,39, and 40, respectively.

The first extension table support system 130 contacts the first extension table 104 at a location beyond the first side 124 of the load bed 113. Likewise, a second extension table support system 132 contacts the second extension table 106 at a location beyond the second side 126 of the load bed 113. For the first extension table 104, the location where the contact is made is further described as being beyond the first hinge axis 136 where the first extension table 104 Is attached to the load bed 133. Preferably, a location of contact on the first extension table 104 between a center portion and a distal side of the first extension table 104 is optimal.

By contrast, U.S. Pat. Nos. 4,961,679, 4,955,774 and 4,844,675 and Case IH Corporation's bale accumulator Model 8576 do not disclose a support system which contacts an extension table at a location beyond a side of a base module to which the extension table is attached. Each of these references merely shows an extension table hinged to the base module without any support beyond the hinge area.

When used alone, the support wheel 164 supports the first extension table 104 from the ground surface 128 when the first extension table 104 is in the unstowed position. When used alone, each of the first 140, second 150, third 154 and fourth 192 frame extension members support the first extension table 104 from the base module 112 when the first extension table 104 is in the unstowed position. When used in combination, the support wheel 164 and one of the first 140, second 150, third 154 and fourth 192 frame extension members support the first extension table 104 from the ground surface 128 and the base module 112 when the first extension table 104 is in the unstowed position.

In the first embodiment as shown in FIGS. 1 through 10, the first extension table support system 130 supports the first extension table 104 from at least one of the base module 112 and the ground surface 128 the when the portion 116 and 118 of the load bed 113 is in at least one of the bale accumulating position and the bale discharging position. It is especially important to note that when the portion 116 and 118 of the load bed 113 is moved to the bale discharging position about the pivot axis 146, as shown in FIGS. 3, 4, 13 and 14, there is a large amount of space between the portion 116 and 118 of the load bed 113 and the main frame 120. In the bale discharging position, the portion 116 and 118 of the load bed 113 is supported from the main frame 120 with the hydraulic cylinder 190 which is used to forcibly tilt the portion 116 and 118 of the load bed 113 relative to the main frame 120. Likewise, the first 104 and second 106 extension tables attached to the portion 116 and 118 of the load bed 113, respectively, also need support when the portion 116 and 118 of the load bed 113 is located in at least one of the bale accumulating position and the bale discharging position. During the operation of the bale accumulator 100 in a field, the bale accumulator 100 is subject to a normally present, rough and varying ground surface causing the weight of the bales to bounce or shift on the first 104 and second 106 extension tables. Without the extension table support system 130, such bouncing and shifting will cause wear and fatigue on the hinges 122 and 123 connecting the first 104 and second 106 extension tables, respectively, to the load bed 113. An abnormal amount of wear and fatigue on the hinges 122 and 123 will inhibit proper movement of the first 104 and second 106 extension tables between their stowed and unstowed positions or cause permanent damage to the hinges 122 and 123, the load bed 113 and/or the first 104 and second 106 extension tables.

The first extension table support system 130 supports the first extension table 104 "on" the horizontal pivot axis 146, "off" the horizontal pivot axis 148, or both "on" and "off"

the horizontal pivot axis 146. The first extension table support system 130 provides support "on" pivot axis 146 when the first extension table support system 130 supports the first extension table 104 about the horizontal pivot axis 146 when the first extension table 104 is in the unstowed position and when the at least a portion 116 and 118 of the load bed 113 moves between the bale accumulating position and the bale discharging position. A pivot point 188 at the connection between the load bed 113 and the main frame 120 forms the horizontal pivot axis 146. The support "on" the pivot axis is described with reference to each of the twelve embodiments of the load bed extension module 102, as shown in FIGS. 1–40, respectively. Note that the third through twelfth embodiments of the load bed extension module 20, as shown in FIGS. 24–40 may be implemented either "on" the pivot axis 146 or "off" the pivot axis 148.

For a load bed 113 that tilts, first extension table support system 130 provides support "off" the pivot axis 148 when the first extension table support system 130 supports the first extension table 104 at a location between a front side 117 of the load bed 113 where the plurality of bales are received on the load bed 113 and the horizontal pivot axis 146 when the first extension table 104 is in the unstowed position and when the portion 116 and 118 of the load bed 113 is in the bale accumulating position. The support "off" the pivot axis is described with reference to each of the twelve embodiments of the load bed extension module 102, as shown in FIGS. 1–40, respectively.

The first extension table support system 130 can support more that one extension table disposed on the same side of the load bed 113. The extension table support system 130 of the present invention becomes even more important in this case because the multiple extension tables and any bales accumulated thereon are located at a position far away from the main frame 120. Without the extension table support system 130, the weight of multiple bales on multiple tables extending away from the main frame 120 greatly increases the amount of stress on the hinges 122 and 123. If there are two or more extension tables disposed on the same side of the load bed, the extension table support system 130 of the present invention may even be considered essential to meet minimum standards of durability and usefulness while the bale accumulator 100 is being used in a field over the useable life time of the bale accumulator 100. The application of the extension table support system 130 to multiple extension tables disposed on the same side of the load bed 113 will be described in further detail with reference to FIGS. 24–40. Alternatively, first extension table support system 130 can support more that one bale disposed on a single extension table, such as the first 104 or second 106 extension table, attached to the side of the load bed 113, as described with reference to FIGS. 1–23.

The need for extension table support system 130 is dependent on the construction of the base module 112. In each of the first and second embodiments of the load bed extension module 102, as shown in FIGS. 1–23, the load bed extension module 102 is adapted to a bale accumulator Model 1030, manufactured by Hoelscher, Inc., 312 S. Main, P.O Box 195, Bushton, Kans., U.S.A., 67427. The main frame 120 and the load bed 113 of the base module 112 of Hoelscher's bale accumulator Model 1030 is not built of construction materials durable enough to support the weight of a load bed extension table 104 and any bales accumulated thereon without the assistance of the extension table support system 130 of the present invention. Therefore, the extension table support system 130 becomes essential to providing a durable bale accumulator 100 having the load bed extension module 102 when the load bed extension module 102 is retrofitted to an existing bale accumulator that was not manufactured with the expectation that the load bed extension module 102 would be attached.

The need for extension table support system 130 of the present invention is also dependent on the manufacturing cost of the bale accumulator 100. As shown on Case IH Corporation's bale accumulator Model 8576, extension tables are provided without any support contacting the extension table beyond the hinge connecting the extension table to the load bed. On Case IH Corporation's bale accumulator Model 8576, the only support for the extension table is where a side of the extension table contacts a side of the load bed below the hinge when the extension table is folded down to be coplanar with the load bed. The lack of support for the extension tables is overcome by constructing the main frame, the load bed and the extension tables with very heavy-duty materials. However, disadvantages associated with building a heavy duty bale accumulator include increasing the cost of the bale accumulator, increasing the amount of fuel used to pull the bale accumulator, etc. The extension table support system 130 is advantageous because it cost less to implement than using heavy duty materials and it weighs less than the heavy duty materials while still providing a durable design. Further, even if heavy-duty materials are used, the extension table support system 130 is advantageous for multiple extension tables disposed on the same side of the load bed 113 or more than one bale disposed on a single extension table disposed on the same side of the load bed 113.

1. Support Wheel

The support wheel 164 is described with reference to the first, third, fourth, sixth, seventh, eleventh, and twelfth embodiments of the load bed extension module 102, as shown in FIGS. 1–10, 24 and 25, 26 and 27, 30 and 31, 32 and 33, 39, and 40, respectively.

In the first and third embodiment of the load bed extension module 102, as shown in FIGS. 1–10, 24 and 25, respectively the first extension table support system 130 includes a first support wheel 164 connected to the first extension table 104 and moveable with the first extension table 104 when the first extension table 104 moves between the stowed position and the unstowed position. The first support wheel 164 contacts the ground surface 128 to support the first extension table 104 from the ground surface 128. The first support wheel 164 advantageously provides support along the vertical axis 203 in the upward direction 225 relative to the first extension table 104.

In the fourth, sixth, seventh, eleventh, and twelfth embodiments of the load bed extension module 102, as shown in FIGS. 26 and 27, 30 and 31, 32 and 33, 39, and 40, respectively, the support wheel is connected to the moveable frame member of the fourth frame extension member 192 and will be described in further detail hereinbelow.

Preferably, the first wheel 108, the second wheel 110, the first support wheel 164, as well as the second support wheel 166 on the second extension table 106 share a common axis of rotation 134 to encourage a smooth ride for the bale accumulator 100 across a field.

2. First Frame Extension Member (ex: truss)

The truss member of the first frame extension member 140 is described with reference to the first, second, fifth, seventh, eight and ninth embodiments of the load bed extension module 102, as shown in FIGS. 1–10, 11–23, 28 and 29, 32 and 33, 34 and 35, and 36 and 37, respectively.

The first extension table support system 130 further comprises a first frame extension member 140 connected to the first extension table 104 and moveable with the first extension table 104 when the first extension table 104 moves between the stowed position and the unstowed position. An end surface of the first frame extension member 140 contacts an end surface of the base module 112 to support the first extension table 104 from the base module 112.

Figure 7:
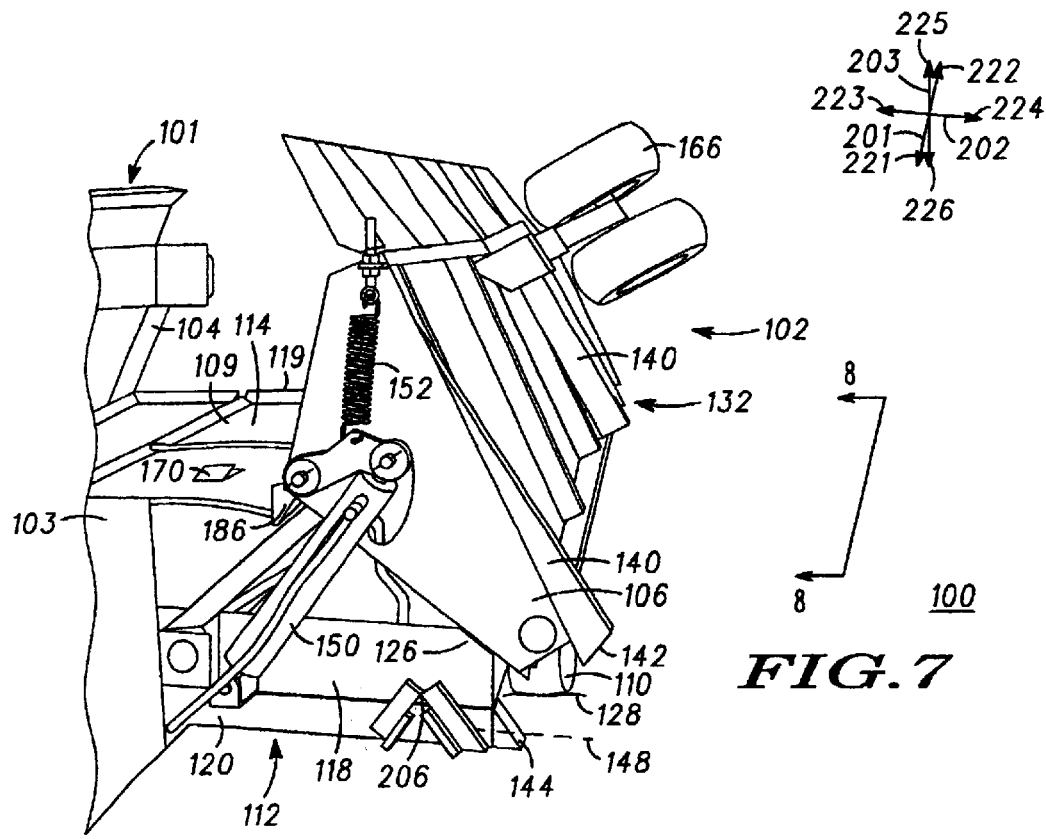
FIG. 7 illustrates, in a top, front, and left side perspective view, the agricultural bale accumulator of FIG. 2 having the first embodiment of the load bed extension module including the first extension table and the second extension table each being located in the stowed position and the portion of the load bed being located in the bale accumulating position.
Figure 8:
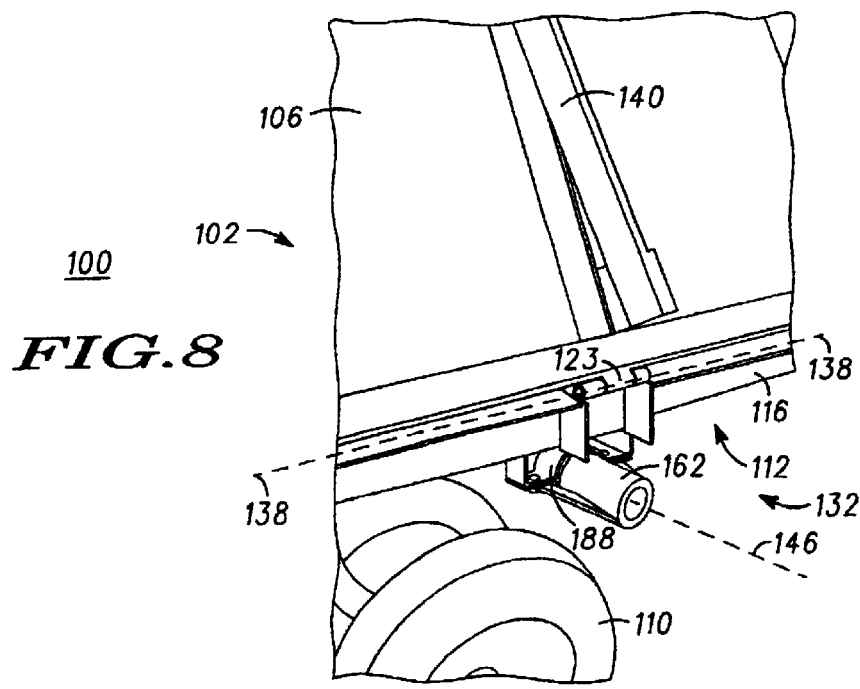
FIG. 8 illustrates, in a top, front, and left side perspective view, a magnified view of a portion of FIG. 7 having the first embodiment of the load bed extension module including the first extension table and the second extension table each being located in the stowed position and the portion of the load bed being located in the bale accumulating position.
Figure 9:
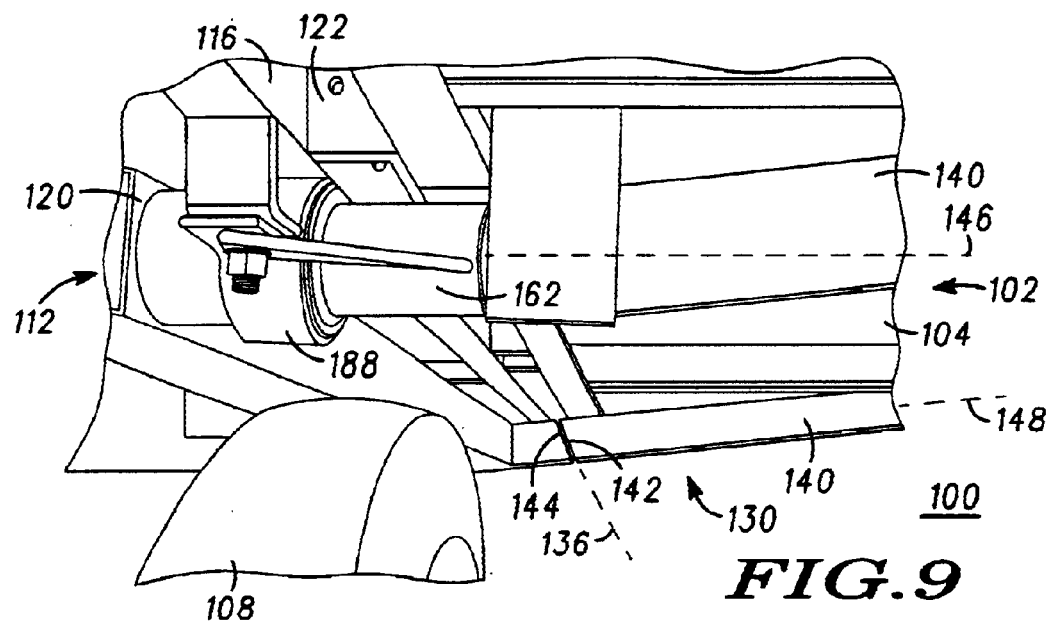
FIG. 9 illustrates, in a bottom, rear and right side perspective view, the agricultural bale accumulator of FIG. 1 having the first embodiment of the load bed extension module including the first extension table and the second extension table each being located in the unstowed position and the portion of the load bed being located in the bale accumulating position.
Figure 10:
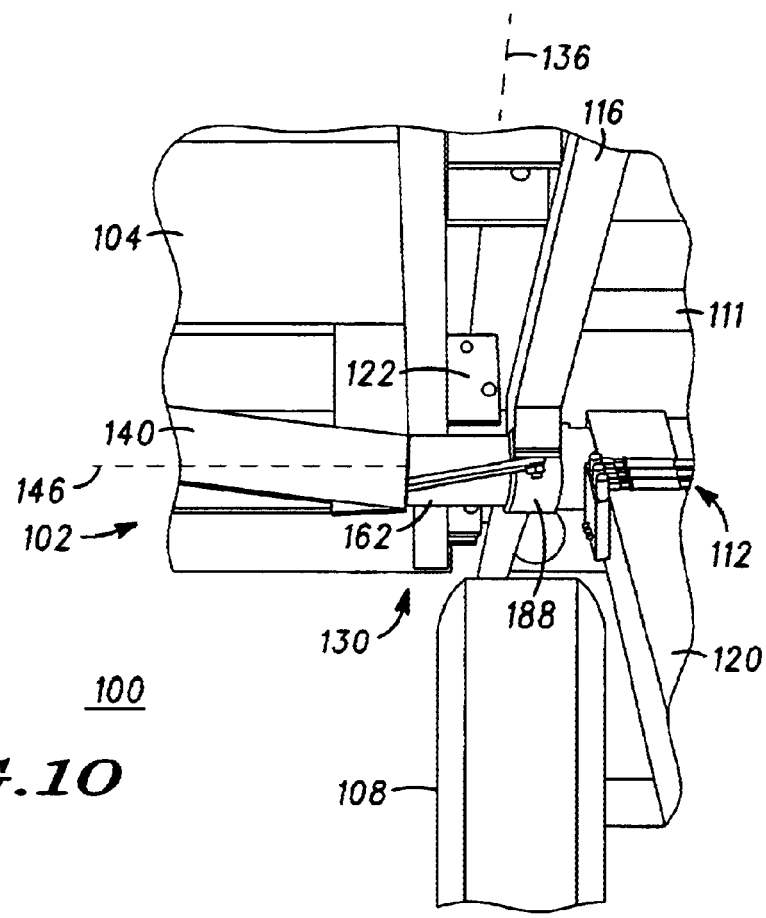
FIG. 10 illustrates, in a bottom, front and right side perspective view, the agricultural bale accumulator of FIGS. 3 and 4 having the first embodiment of the load bed extension module including the first extension table and the second extension table each being located in the unstowed position and the portion of the load bed being located in the bale discharging position.

In the first embodiment of the load bed extension module 102, FIGS. 7–10 are particularly well suited for illustrating the truss member of the first frame extension member 140 providing support "on" the pivot axis 146. FIG. 7 shows the truss member of the first frame extension member 140 attached to a bottom side of the left side extension table 106 near the left side support wheel 166. FIG. 8 shows the truss member of the first frame extension member 140 attached to the bottom side of the left side extension table 106, the pivot point 188 of the base module 112 disposed on the pivot axis 146, and a pivot point spacer 162. FIGS. 9 and 10 each show the truss member of the first frame extension member 140 attached to the bottom side of the first extension table 104, the pivot point 188 of the base module 112 disposed on the pivot axis 146, and a pivot point spacer 162, wherein all of the elements are located on the right side 124 of the load bed 113.

In the first embodiment of the load bed extension module 102, as shown in FIG. 9, the truss member of the first frame extension member 140 contacts the base module 112 at the pivot point 188 to support for the first extension table 104 when the first extension table 104 is located in the unstowed position and when the portion 116 of the load bed 113 is located in the bale accumulating position. The pivot point spacer 162 is used to fill a gap between the pivot point 188 on Holescher's bale accumulator Model 1030 and an end of the truss member of the first frame extension member 140. Such a spacer would not be required on a new design for a bale accumulator.

In the first embodiment of the load bed extension module 102, as shown in FIG. 10, the truss member of the first frame extension member 140 contacts the base module 112 at the pivot point 188 to support for the first extension table 104 when the first extension table 104 is located in the unstowed position and when the portion 116 of the load bed 113 is located in the bale discharging position. It is critical to note in this view that the truss member of the first frame extension member 140 is the only support for the first extension table 104 beyond the first hinge 122. Supporting the first extension table from the pivot point 188 on the pivot axis 146 is important to reduce wear and fatigue on the hinge 122 when the first extension table is moved to the bale discharging position. Therefore, supporting the extension table from the pivot point 188 using the truss member of the first frame extension member 140 provides a significant advantage over that presently available in the prior art.

Figure 5:
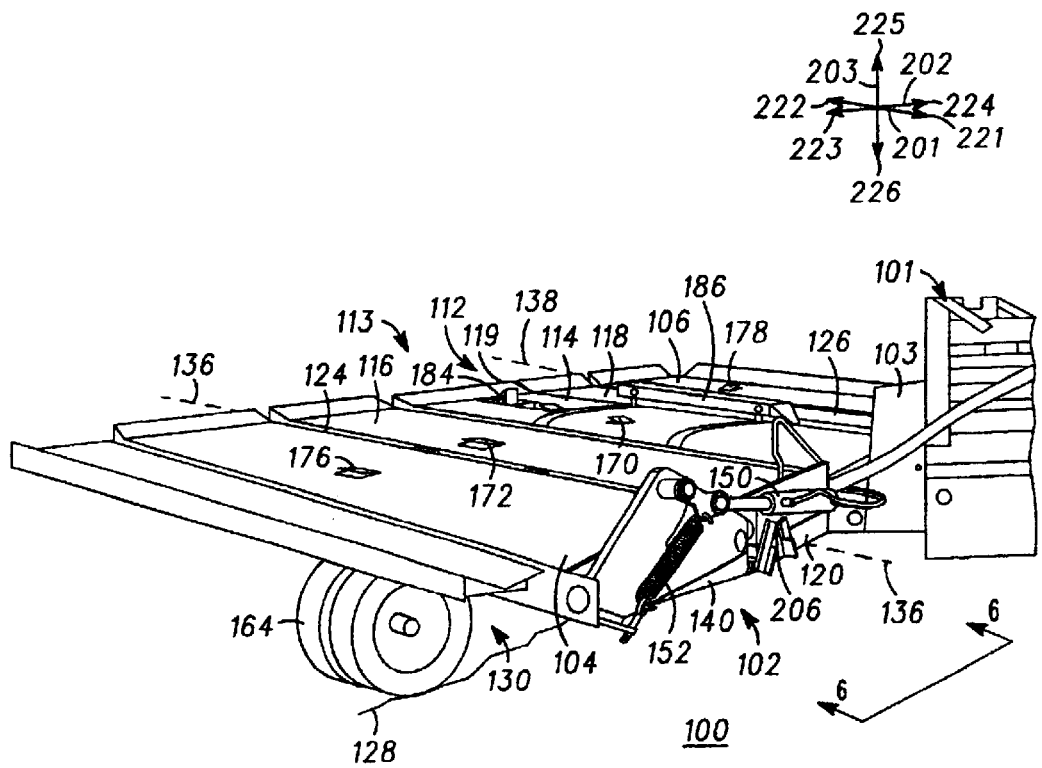
FIG. 5 illustrates, in a top, front and right side perspective view, the agricultural bale accumulator of FIG. 1 having the first embodiment of the load bed extension module including the first extension table and the second extension table each being located in the unstowed position and the portion of the load bed being located in the bale accumulating position.
Figure 6:
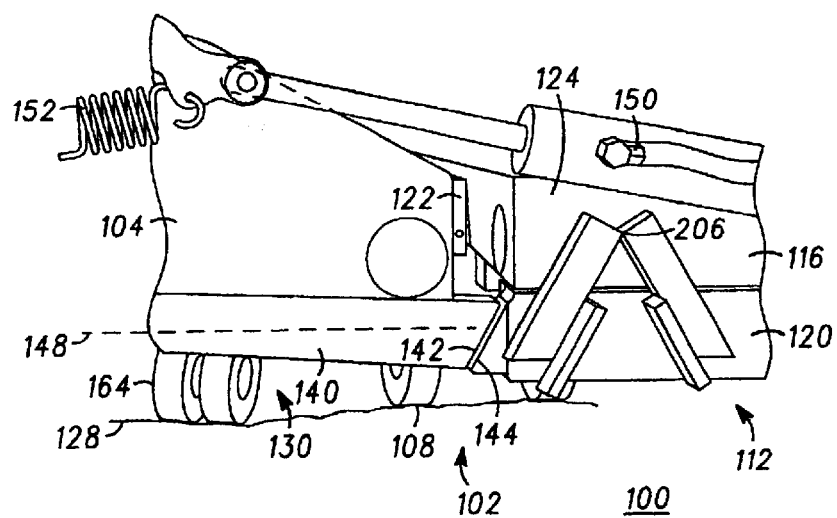
FIG. 6 illustrates, in a top, front and right side perspective view, a magnified view of a portion of FIG. 5 having the first embodiment of the load bed extension module including the first extension table and the second extension table each being located in the unstowed position and the portion of the load bed being located in the bale accumulating position.

In the first embodiment of the load bed extension module 102, FIGS. 5–7 are particularly well suited for illustrating a truss member of the first frame extension member 140 providing support "off" the pivot axis 148.

In FIG. 5 the general area of interest showing the truss member of the first frame extension member 140 is at the front, right corner of the bale accumulator 100.

FIG. 6 shows the truss member of the first frame extension member 140 contacting the main frame 120 from "off" the pivot axis 148. Preferably, the "off" axis is located near the front 117 of the bale accumulator 100 to provide even support in combination with the truss member of the first frame extension member 140 contacting the base module 112 at the pivot point 188. Preferably, the truss member of the first frame extension member 140 contacts the main frame 120.

FIG. 6 also appropriately shows a mating contact between an end surface 142 of the first frame extension member 140 an end surface 144 on the base module 112. The end surface 142 of the first frame extension member 140 has a downward angle relative to a horizontal axis when the first extension table 104 is in the unstowed position. The end surface 144 on the base module 112 has an upward angle relative to the horizontal axis which is complementary to the downward angle. The end surface 142 the first frame extension member 140 contacts the end surface 144 on the base module 112 to translate an upward force through the first frame extension member 140 to support the first extension table 104 from the base module 112. The complimentary angles advantageously direct a larger component of force from the base module 112 to the first extension table 104.

FIG. 7 shows a separation between the end surface 142 of the first frame extension member 140 the end surface 144 on the base module 112 when the second, left side extension table 106 is in the stowed position.

In the second embodiment of the load bed extension module 102, FIGS. 15–20, and 22 are particularly well suited for illustrating a truss member of the first frame extension member 140 providing support "off" the pivot axis 148. FIGS. 15–20, and 22 show the first frame extension member 140 having three truss members. Each of the three truss members contact the fixed frame member of the third frame extension member 154 which will be described in further detail hereinbelow. Each of the three truss members contacts the fixed frame member of the third frame extension member 154 in a similar manner to the way the truss member contacts that main frame 120 as described hereinabove with the first embodiment of the load bed extension module 102. Although three truss members are shown which provide superior support along the length first extension table 104, only one truss member near the front 117 of the bale accumulator 100 can be used to provide adequate support "off" the pivot axis 148.

Figure 32:
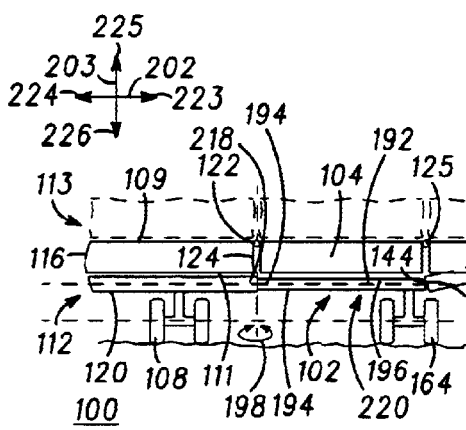
FIGS. 32 and 33 illustrate, in a rear side elevation view, a right side of an agricultural bale accumulator having a sixth embodiment of a load bed extension module including a first extension table and a third extension table each being located in an unstowed position and a stowed position, respectively, and a load bed being located in a bale accumulating position.
Figure 33:
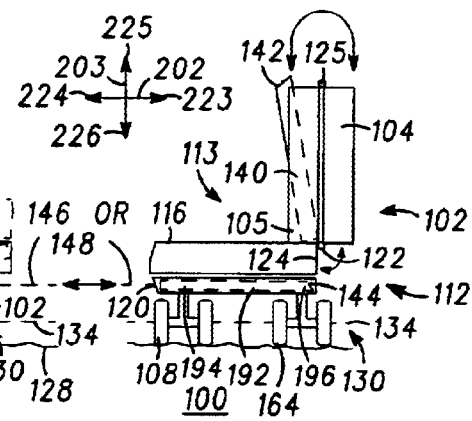
Figure 34:
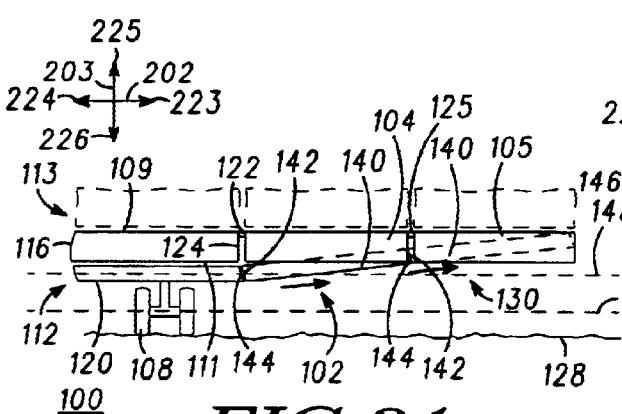
FIGS. 34 and 35 illustrate, in a rear side elevation view, a right side of an agricultural bale accumulator having a seventh embodiment of a load bed extension module including a first extension table and a third extension table each being located in an unstowed position and a stowed position, respectively, and a load bed being located in a bale accumulating position.
Figure 35:
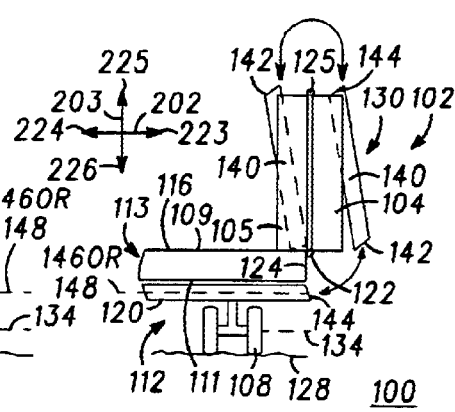
Figure 36:
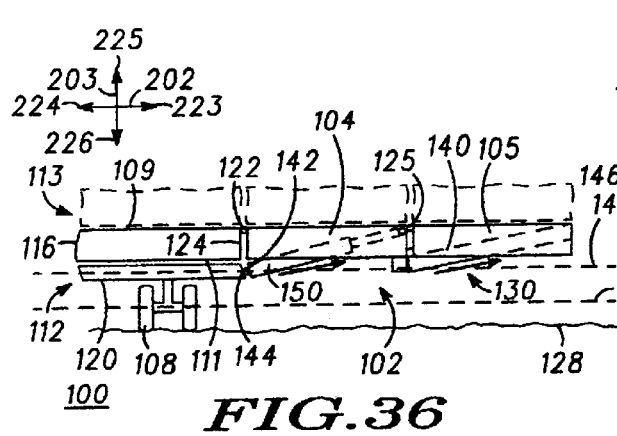
FIGS. 36 and 37 illustrate, in a rear side elevation view, a right side of an agricultural bale accumulator having an eighth embodiment of a load bed extension module including a first extension table and a third extension table each being located in an unstowed position and a stowed position, respectively, and a load bed being located in a bale accumulating position.
Figure 37:
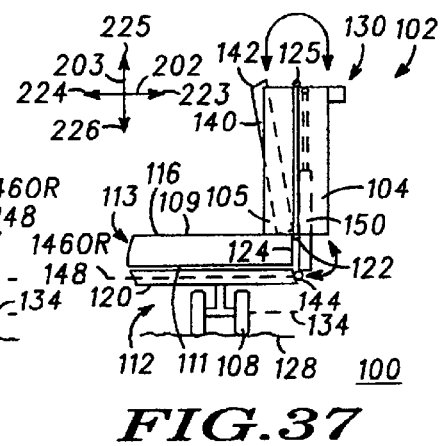
Figure 38:
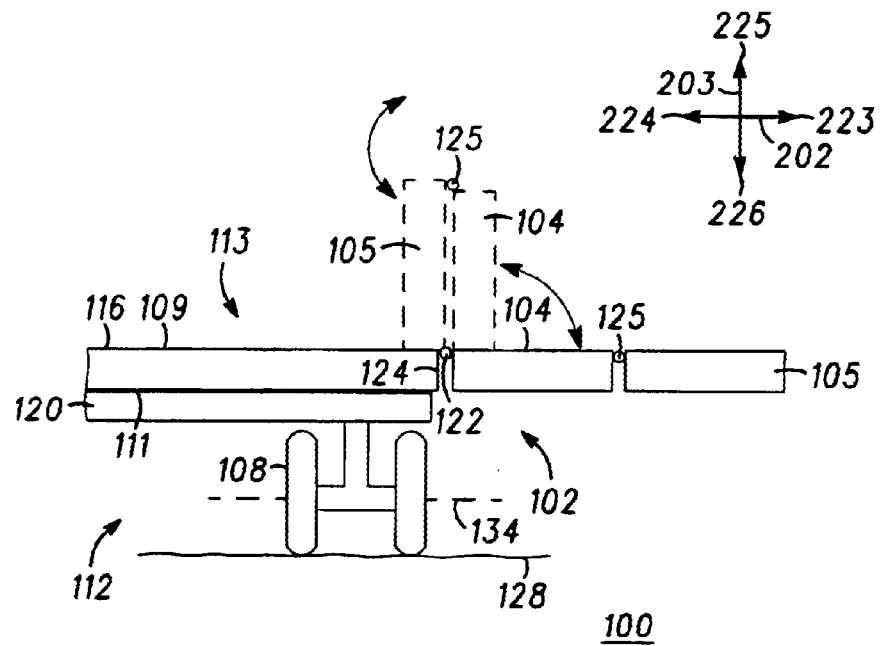
FIGS. 38, 39 and 40 illustrate, in a rear side elevation view, a right side of an agricultural bale accumulator having a tenth, eleventh and twelfth embodiment, respectively, of a load bed extension module including a first extension table and a third extension table each being located in an unstowed position and a stowed position and a load bed being located in a bale accumulating position.

The truss member of the first frame extension member 140 is described with reference to the fifth, seventh, eight and ninth embodiments of the load bed extension module 102, as shown in FIGS. 28 and 29, 32 and 33, 34 and 35, and 36 and 37, respectively. In FIGS. 28 and 29, the truss member of the first frame extension member 140 is attached to a third extension table 105 and contacts the fixed frame member of the third frame extension member 154. In FIGS. 32 and 33, the truss member of the first frame extension member 140 is attached to a third extension table 105 and contacts the moveable frame member of the fourth frame extension member 192. This embodiment is advantageous in reducing the distance traveled by the moveable frame member of the fourth frame extension member 192. In FIGS. 34 and 35, the truss member of the first frame extension member 140 is attached to each of the first extension table 104 and the third extension table 105 to build a continuous truss support for each of the first extension table 104 and the third extension table 105 when each of the first extension table 104 and the third extension table 105 are in the unstowed position. This embodiment is advantageous because no moveable parts are needed to support the extension tables. In FIGS. 36 and 37, the truss member of the first frame extension member 140 is attached to a third extension table 105 and contacts a lower part of the first extension table 104. This embodiment is advantageous in reducing the travel of the cylinder 150 which would support a wider extension table.

The second embodiment, as shown in FIGS. 11–23, illustrates an alternate truss member 141 of the first frame extension member 140. The truss member 141 is shown in FIGS. 11, 12 and 14 at the rear side 119 of the bale accumulator 100. Preferably, the truss member 141 is a metal block attached to the rear side of the first extension table 104 or the second extension table 106 and makes contact with the rear side of the right side load bed 116 or the left side load bed 118, respectively, at a location beyond the first hinge axis 136 or the second hinge axis 138, respectively. The mechanical interference between these corresponding elements advantageously supports the first extension table 104 and the second extension table 106 from the load bed 113.

3. Second Frame Extension Member (ex: cylinder)

The collapsible cylinder of the second frame extension member 150 is described with reference to the first, second, and ninth embodiments of the load bed extension module 102, as shown in FIGS. 1–10, 11–23, and 36 and 37, respectively.

The first extension table support system 130 further comprises a second frame extension member 150 having a first end connected to the base module 112 and a second end connected to the first extension table 104 and being moveable between a collapsed position and an expanded position. The second frame extension member 150 is connected to the first extension table 104 and the base module 112 to support the first extension table 104 from the base module 112.

In the first embodiment, as shown in FIGS. 1–10, the first end of the second frame extension member 150 is connected to the load bed 113 of the base module 112 and the second end of the second frame extension member 150 is connected to the first extension table 104. In this case, the second frame extension member 150 supports the first extension table 104 from the load bed 113. The second frame extension member 150 is in the collapsed position when the first extension table 104 is in the stowed position and in the expanded position when the first extension table 104 is in the unstowed position. This correspondence between the position of the second frame extension member 150 and the position of the first extension table 104 occurs because the second frame extension member 150 is located above the first extension table 104 and the load bed 113.

In the second and ninth embodiments, as shown in FIGS. 11–23 and FIGS. 36 and 37, respectively, the first end of the second frame extension member 150 is connected to the main frame 120 of the base module 112 and the second end of the second frame extension member 150 is connected to the first extension table 104. In this case, the second frame extension member 150 supports the first extension table 104 from the main frame 120. In FIGS. 11–23 and FIGS. 36 and 37, the second frame extension member 150 is in the collapsed position when the first extension table 104 is in the unstowed position and in the expanded position when the first extension table 104 is in the stowed position. This correspondence between the position of the second frame extension member 150 and the position of the first extension table 104 occurs because the second frame extension member 150 is located below the first extension table 104 and the load bed 113.

In the first, second, and ninth embodiments of the load bed extension module 102, as shown in FIGS. 1–10, 11–23, and 36 and 37, respectively, the second frame extension member 150 further comprises a first hydraulic cylinder 150 for moving the first extension table 104 between the stowed position and the unstowed position responsive to receiving pressurized hydraulic fluid from a hydraulic fluid source 115. FIG. 41 shows the hydraulic fluid source 115. Alternatively, the second frame extension member 150 can be a telescoping frame member that provides equivalent support as the hydraulic cylinder 150 for the first extension table 104 but does not require pressurized hydraulic fluid from the hydraulic fluid source. In this case, the extension table would require manual assistance.

In the second and ninth embodiments of the load bed extension module 102, as shown in FIGS. 15–17, 19–21–23, and 36 and 37, respectively, the second frame extension member 150 is connected to the main frame 120 of the base module 112 "on" the pivot axis 146. These embodiments advantageously provide a combination of support for the extension table and hydraulic assistance. In the first embodiment of the load bed extension module 102, the second frame extension member 150 is connected to the load bed 113 of the base module 112 "off" the pivot axis 148. This embodiment advantageously provides additional support for the extension table 104 from above the extension table 104 in addition to the support on the pivot point 162 provided by the truss member of the first frame extension member 140.

In the first and second embodiments of the load bed extension module 102, as shown in FIGS. 1–10 and 11–23, respectively, the agricultural bale accumulator 100 further comprises the second hydraulic fluid cylinder 190 having a first end connected to the main frame 120 and a second end connected to the portion 116 and 118 of the load bed 113. The second cylinder 190 moves the portion 116 and 118 of the load bed 113 relative to the main frame 120 between the bale accumulating position and the bale discharging position responsive to receiving pressurized hydraulic fluid from the hydraulic fluid source 115, as shown in FIG. 41. FIG. 41 illustrates a schematic diagram of a hydraulic system for use with the agricultural bale accumulator of FIGS. 1 and 23. A hydraulic valve 214, as shown in FIG. 41, selectively routes the pressurized hydraulic fluid from the hydraulic fluid source 115 to one of the first hydraulic cylinder 150 and the second hydraulic cylinder 190 responsive to an electric control signal 216. This embodiment advantageously permits hydraulic power to be used to move the extension table 104 when there are a limited number of hydraulic sets of ports available from a tractor carrying the hydraulic fluid source 115. In the preferred embodiment, the tractor used to pull the baler 101 and the bale accumulator 100 only has three hydraulic sets of ports: a first set is used to by the baler 101 to bale the crop into bales, a second set is used by the bale accumulator 100 to operate the bale transfer module 186, a third set to operate the bale discharge module 116, 118, and 190. Therefore, one set is lacking to move the extension tables between their stowed and unstowed positions. Therefore, the third set of hydraulic ports is advantageously shared between the bale discharge module 116, 118, and 190 and the load bed extension module 102.

In the first and second embodiments of the load bed extension module 102, as shown in FIGS. 1–10 and 11–23, respectively, the second frame extension member 150 further comprises at least one spring member 152, connected to at least one of the base module 112, the first extension table 104 and the second frame extension member 150, for exerting a bias force on the first extension table 104 when the first extension table 104 is moved to at least one of the stowed position and the unstowed position. The spring member 152 advantageously pulls the collapsible frame member over its center point when moving the first extension table 104 to the stowed position. In the first embodiment of the load bed extension module 102, as shown in FIGS. 5–7, the spring member 152 is connected to a front, top side of the first extension table 104 and to a distal end of the hydraulic cylinder 150. In the second and ninth embodiments of the load bed extension module 102, as shown in FIGS. 15–17 and 20–23, and FIGS. 36 and 37, respectively, the spring member 152 is connected to a bottom side of the first extension table 104 and to a distal end of the hydraulic cylinder 150.

4. Third Frame Extension Member (ex: fixed frame)

The fixed frame member of the third frame extension member 154 is described with reference to the second, fourth, and fifth, embodiments of the load bed extension module 20, as shown in FIGS. 11–23, 26 and 27, and 28 and 29, respectively.

In the second, fourth, and fifth, embodiments of the load bed extension module 20, as shown in FIGS. 11–23, 26 and 27, and 28 and 29, respectively, the first extension table support system 130 further comprises a third frame extension member 154 having a proximal end 156 and a distal end 158. The proximal end 156 of the third frame extension member 154 is connected to the main frame 120. The distal end 158 of the third frame extension member 154 extends beyond the main frame 120 in a direction transverse to a traveling direction of the agricultural bale accumulator 100 at a fixed position which is located inside a road travel width dimension 160 of the agricultural bale accumulator 100 to permit safe traveling of the agricultural bale accumulator 100 on a public roadway when the first extension table 104 is in the stowed position. A first portion of the first extension table 104 is positioned inside the distal end 158 of the third frame extension member 154 and a second portion of the first extension table 104 is positioned outside the distal end 158 of the third frame extension member 154 when the first extension table 104 is in the unstowed position to permit the third frame extension member 154 to contact the first extension table 104 between the first portion of the first extension table 104 and the second portion of the first extension table 104 to support the first extension table 104 from the main frame 120.

Figure 15:
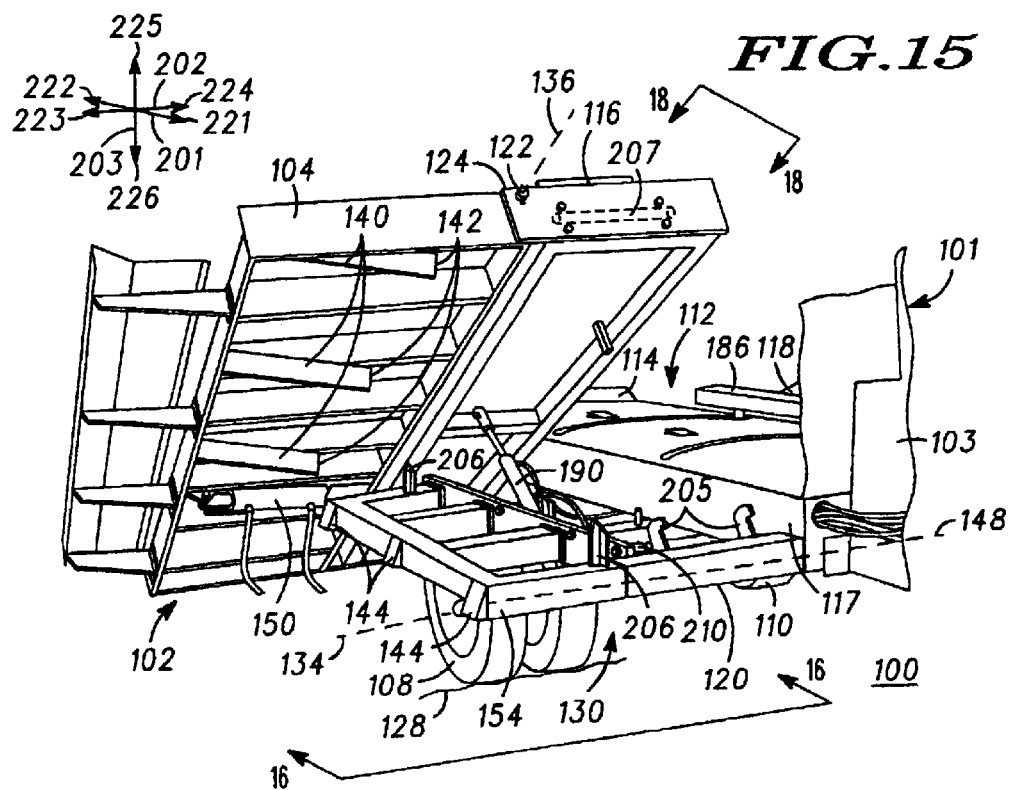
FIG. 15 illustrates, in a top, front and right side perspective view, the agricultural bale accumulator of FIGS. 13 and 14 having the second embodiment of the load bed extension module including the first extension table and the second extension table each being located in the unstowed position and the portion of the load bed being located in the bale discharging position.
Figure 16:
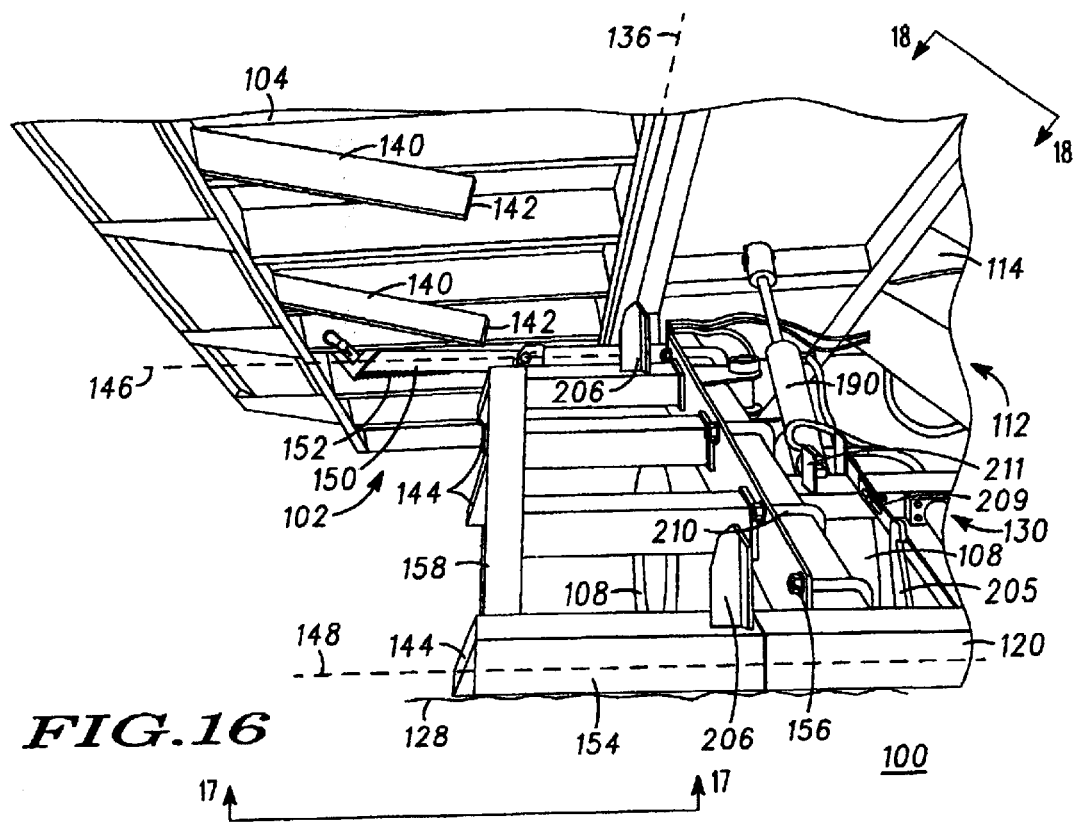
FIG. 16 illustrates, in a top, front and right side perspective view, a magnified view of a portion of FIG. 15 having the second embodiment of the load bed extension module including the first extension table and the second extension table each being located in the unstowed position and the portion of the load bed being located in the bale discharging position.
Figure 17:
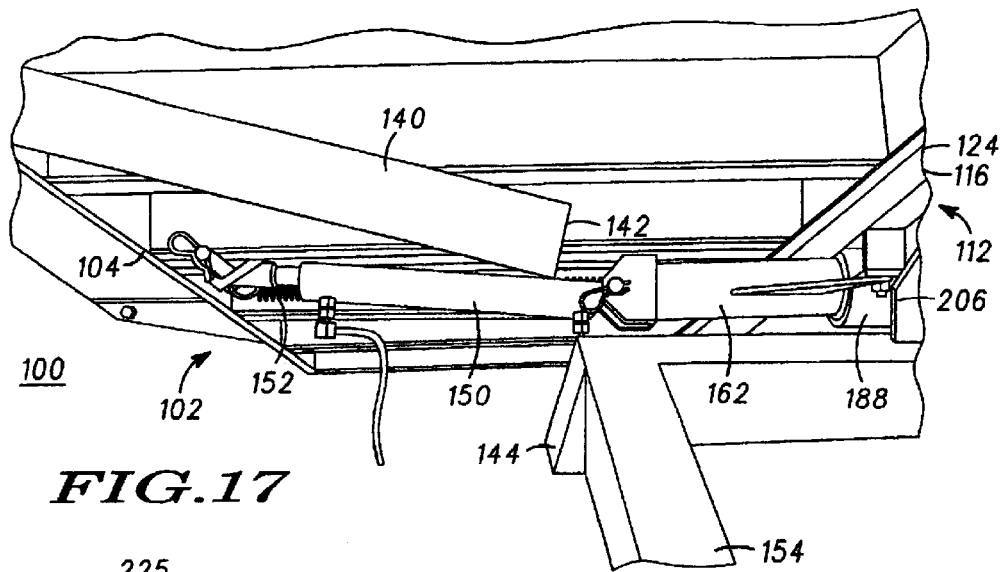
FIG. 17 illustrates, in a top, front and right side perspective view, a magnified view of a portion of FIG. 16 having the second embodiment of the load bed extension module including the first extension table and the second extension table each being located in the unstowed position and the portion of the load bed being located in the bale discharging position.
Figure 18:
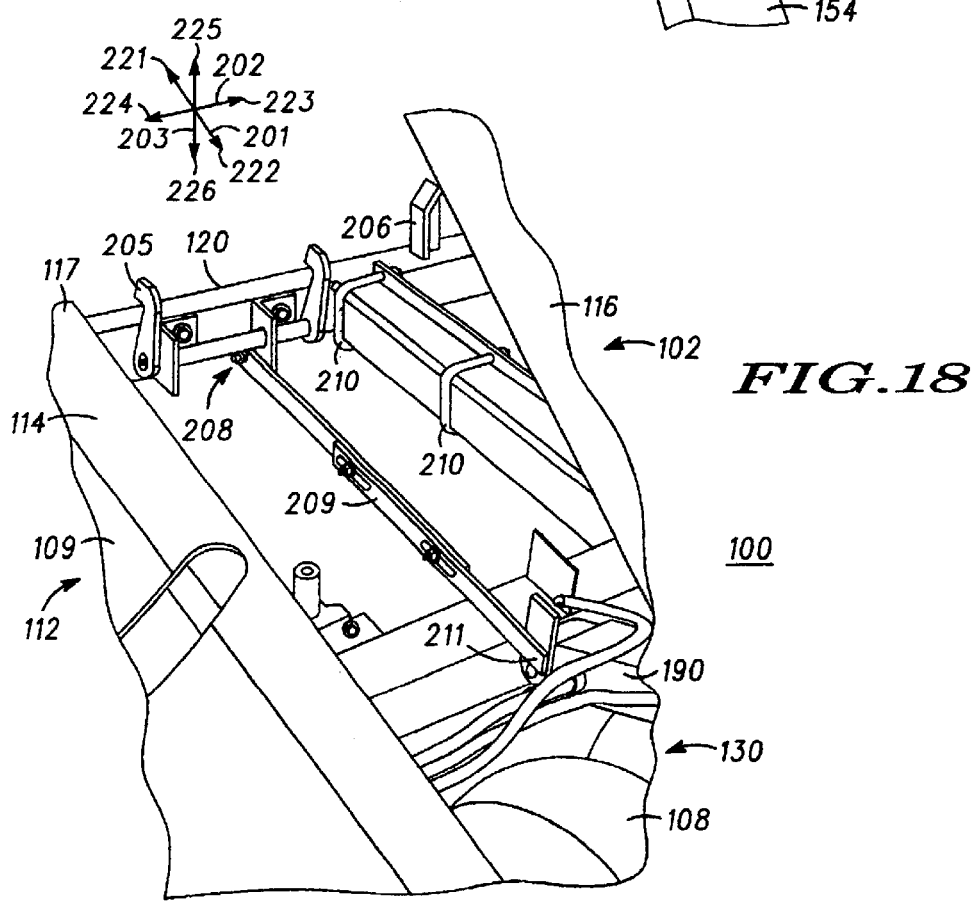
FIG. 18 illustrates, in a top, rear and left side perspective view, a magnified view of a portion of FIGS. 15 and 16 having the second embodiment of the load bed extension module including the first extension table and the second extension table each being located in the unstowed position and the portion of the load bed being located in the bale discharging position.
Figure 19:
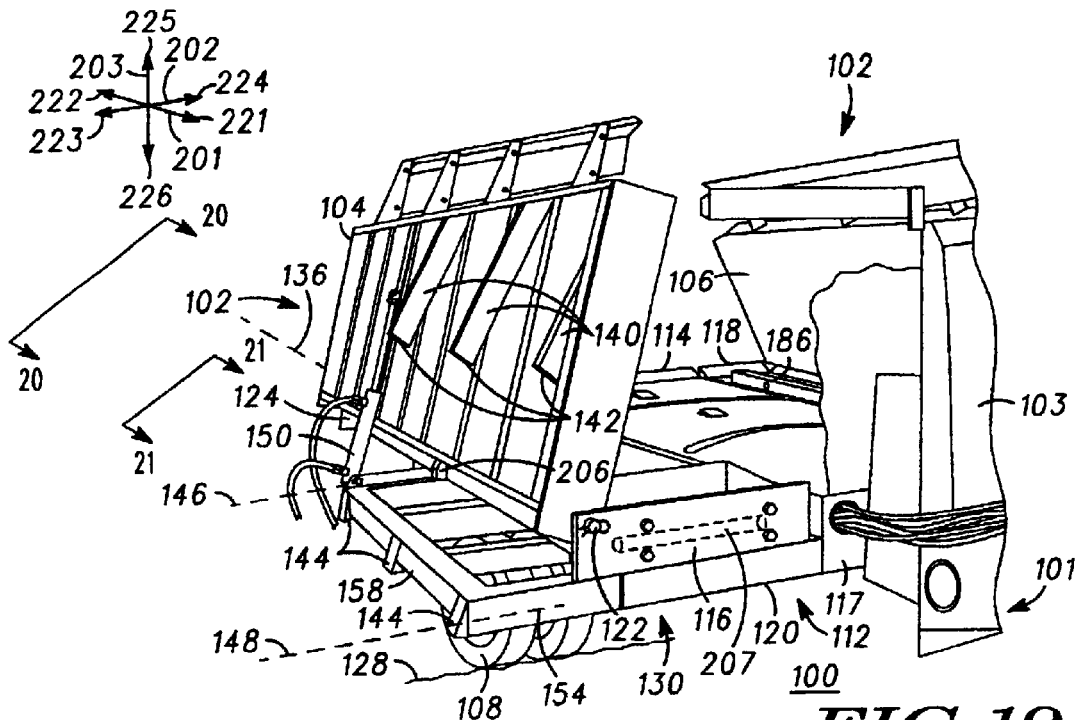
FIG. 19 illustrates, in a top, front and right side perspective view, the agricultural bale accumulator of FIG. 12 having the second embodiment of the load bed extension module including the first extension table and the second extension table each being located in the stowed position and the portion of the load bed being located in the bale accumulating position.
Figure 20:
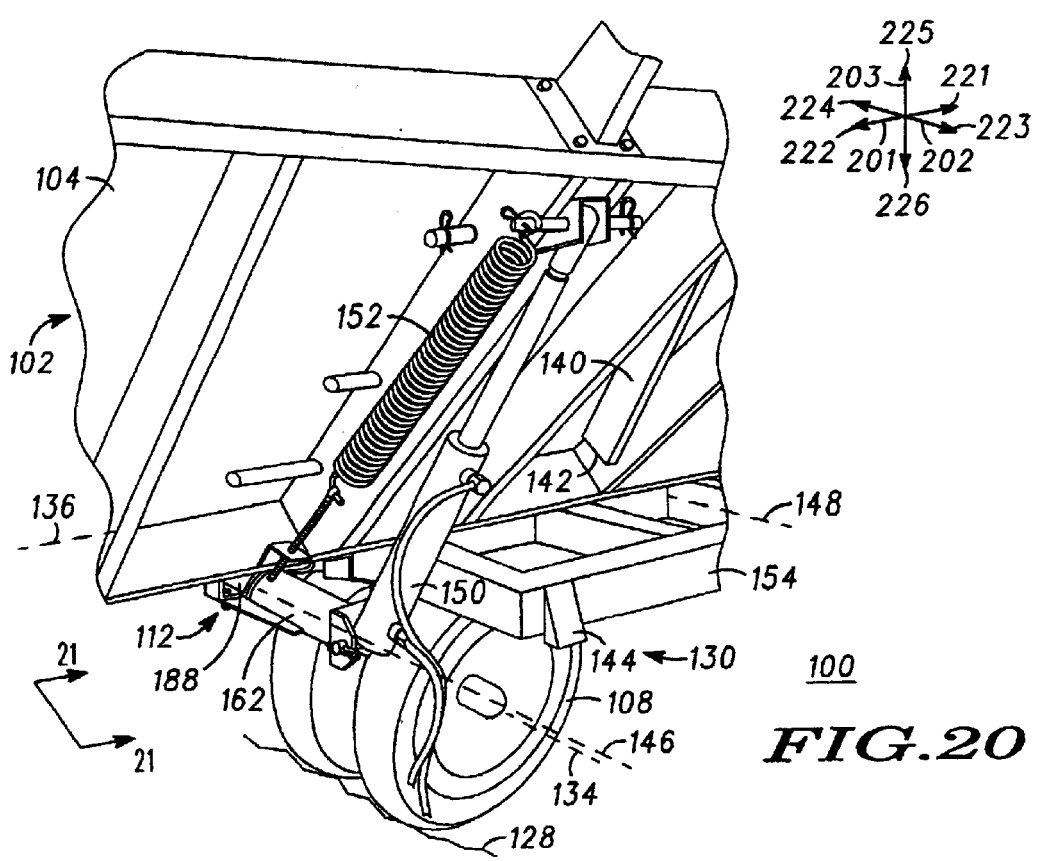
FIG. 20 illustrates, in a top, rear and right side perspective view, the agricultural bale accumulator of FIGS. 12 and 19 having the second embodiment of the load bed extension module including the first extension table and the second extension table each being located in a partially stowed position and the portion of the load bed being located in the bale accumulating position.
Figure 21:
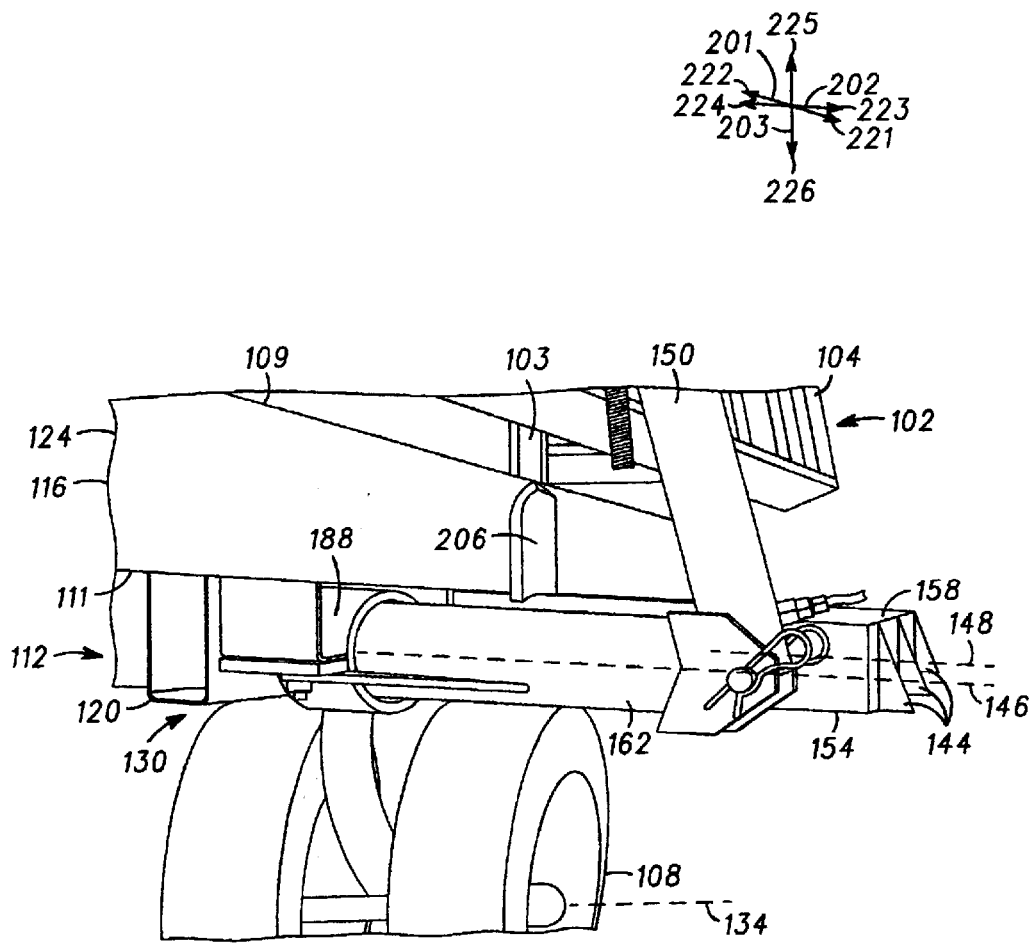
FIG. 21 illustrates, in a top, rear and right side perspective view, a magnified view of a portion of FIGS. 12, 19 and 20 having the second embodiment of the load bed extension module including the first extension table being located in the stowed position and the portion of the load bed being located in the bale accumulating position.
Figure 22:
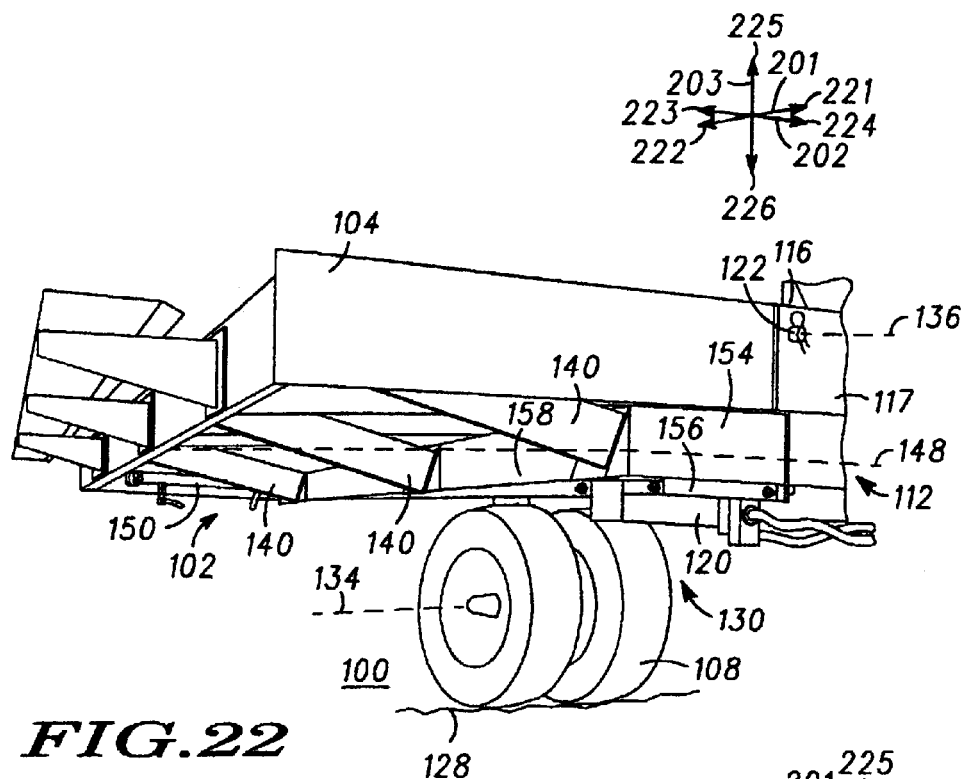
FIG. 22 illustrates, in a bottom, front and right side perspective view, the agricultural bale accumulator of FIG. 11 having the second embodiment of the load bed extension module including the first extension table and the second extension table each being located in the unstowed position and the portion of the load bed being located in the bale accumulating position.
Figure 23:
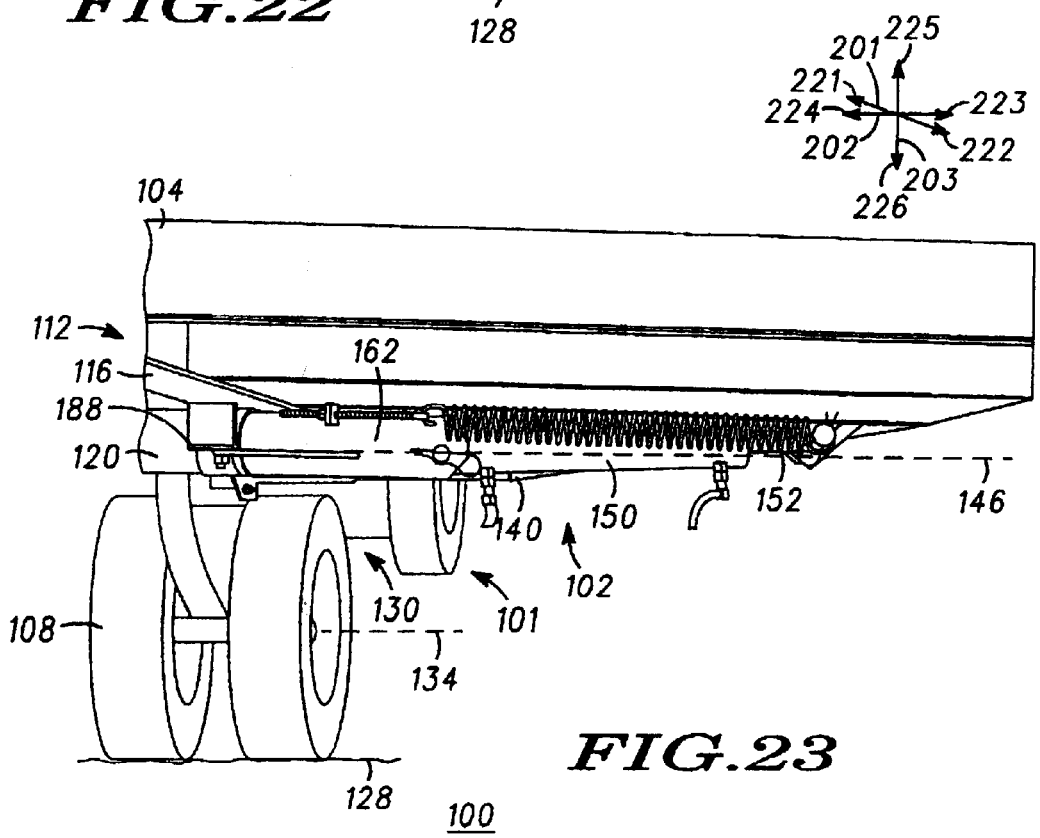
FIG. 23 illustrates, in a bottom, rear and right side perspective view, the agricultural bale accumulator of FIG. 11 having the second embodiment of the load bed extension module including the first extension table and the second extension table each being located in the unstowed position and the portion of the load bed being located in the bale accumulating position.
Figure 30:
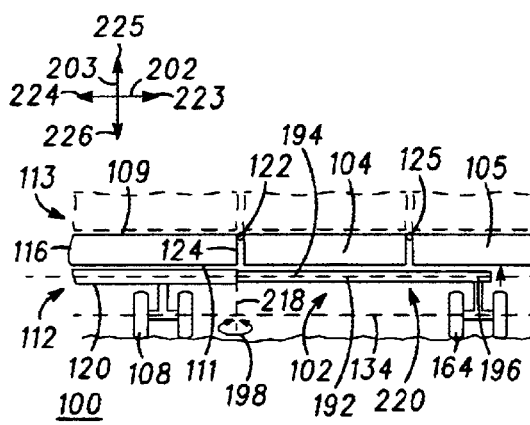
FIGS. 30 and 31 illustrate, in a rear side elevation view, a right side of an agricultural bale accumulator having a sixth embodiment of a load bed extension module including a first extension table and a third extension table each being located in an unstowed position and a stowed position, respectively, and a load bed being located in a bale accumulating position.
Figure 31:
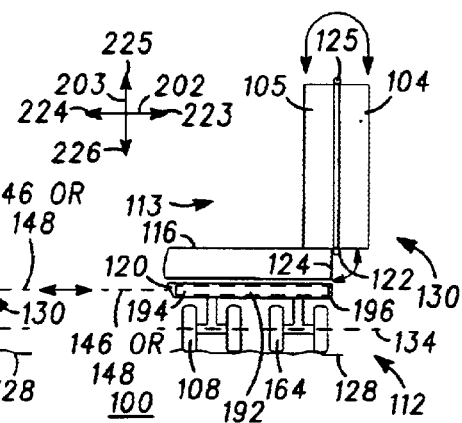

The fixed frame member of the third frame extension member 154 is removeably attached to the main frame 120 using any attachment mechanism including, without limitation, nuts, bolts and clamps, as shown in FIGS. 15, 16 and 18. This removable attachment mechanism is beneficial when the fixed frame member of the third frame extension member 154 is attached to an existing bale accumulator 100. Alternatively, the fixed frame member of the third frame extension member 154 may be permanently attached to the main frame 120 using any attachment mechanism including, without limitation, being integrally formed with or welded to the main frame 120, as shown in FIGS. 26 and 27, and 28 and 29. This fixed attachment mechanism is beneficial when the fixed frame member of the third frame extension member 154 is formed as part of a new bale accumulator 100.

These embodiments advantageously provide support for the extension table 104 with no moving parts. Further, the third frame extension member 154 is positioned directly beneath the extension table 104 to provide a component of force along the vertical axis 203 in an upward direction 225.

5. Fourth Frame Extension Member (ex: moveable frame)

The moveable frame member of the fourth frame extension member 192 is described with reference to the fourth, sixth, seventh, eleventh and twelfth embodiments of the load bed extension module 102, as shown in FIGS. 26 and 27, 30 and 31, 32 and 33, 39, and 40, respectively.

In the fourth, sixth, seventh, eleventh and twelfth embodiments of the load bed extension module 102, as shown in FIGS. 26 and 27, 30 and 31, 32 and 33, 39, and 40, respectively, the first extension table support system 130 further comprises a fourth frame extension member 192 and a frame attachment mechanism 218. The fourth frame extension member 192 has a proximal end 194 and a distal end 196. The frame attachment mechanism 218 is connected to the proximal end 194 of the fourth frame extension member 192 and the main frame 120 to permit the distal end 196 of the fourth frame extension member 192 to be moveable relative to the main frame 120 between a stowed position and an unstowed position. The distal end 196 of the fourth frame extension member 192 moves towards the main frame 120 when the fourth frame extension member 192 is in the stowed position, wherein the distal end 196 of the fourth frame extension member 192 moves away from the main frame 120 when the fourth frame extension member 192 is in the unstowed position, wherein the distal end 196 of the fourth frame extension member 192 contacts the first extension table 104 to support the first extension table 104 from the main frame 120 when the fourth frame extension member 192 is in the unstowed position.

In the fourth, sixth, seventh, eleventh and twelfth embodiments of the load bed extension module 102, as shown in FIGS. 26 and 27, 30 and 31, 32 and 33, 39, and 40, respectively, the frame attachment mechanism 218 comprises a telescoping mechanism for telescopically connecting the proximal end 194 of the fourth frame extension member 192 to the main frame 120 along a horizontal axis 146 or 148 relative to the main frame 120. Preferably, the frame attachment mechanism 218 telescopes from the main frame along the pivot axis 146 to provide support for the first extension table 104 when the first extension table moves between the bale accumulating position and the bale discharging position. Alternatively, the frame attachment mechanism 218 may telescope from the main frame "off" the pivot axis 148. Alternatively, the frame attachment mechanism 218 further comprises a pivoting mechanism for pivotally connecting the proximal end 194 of the fourth frame extension member 192 to the main frame 120 about a vertical axis 198 relative to the main frame 120.

In the fourth, sixth, seventh, eleventh and twelfth embodiments of the load bed extension module 102, as shown in FIGS. 26 and 27, 30 and 31, 32 and 33, 39, and 40, respectively, the first extension table support system 130 further comprises a first support wheel 164 connected to the distal end 196 of the fourth frame extension member 192 and moveable with the fourth frame extension member 192 when the fourth frame extension member 192 moves between the stowed position and the unstowed position. The first support wheel 164 contacts the ground surface 128 to support the first extension table 104 from the ground surface 128 when the fourth frame extension member 192 is in the unstowed position. The support wheel 164 advantageously provides additional support for the first 104 or second 106 extension table.

In the twelfth embodiment of the load bed extension module 102, as shown in FIG. 40, the first support wheel 164 provides a sole support for a first side 124 of the base module 112 from the ground surface 128 to permit the agricultural bale accumulator 100 to be transported across the ground surface 128 when the first extension table 104 is in the stowed position and when the fourth frame extension member 192 is in the stowed position. The first support wheel 164 also provides the sole support for the first side of the base module 112 and the first extension table 104 from the ground surface 128 to permit the agricultural bale accumulator 100 to be transported across the ground surface 128 when the first extension table 104 is in the unstowed position and when the fourth frame extension member 192 is in the unstowed position. In this embodiment, the main wheels 108 and 110 on the bale accumulator 100 are eliminated. Preferably, the frame attachment mechanism 218 telescopes the fourth frame extension member 192 from the main frame 120 along the pivot axis 146 to provide support for the first 104 or second 106 extension table when the load bed 113 moves between the bale accumulating position and the bale discharging position, as well as to provide the sole support for the one side of the base module 112 when the frame attachment mechanism 218 moves the fourth frame extension member 192 to the stowed position.

In the fourth, sixth, seventh, and eleventh embodiments of the load bed extension module 102, as shown in FIGS. 26 and 27, 30 and 31, 32 and 33, and 39, respectively, the agricultural bale accumulator 100 further comprises a first wheel 108 and a second wheel 110 coupled to the main frame 120. The first wheel 108 and the second wheel 110 contact the ground surface 128 to support the base module 112 from the ground surface 128 and to permit the agricultural bale accumulator 100 to be transported across the ground surface 128 when the first extension table 104 is in the stowed position and in the unstowed position and when the fourth frame extension member 192 is in the stowed position and in the unstowed position. The first support wheel 164 contacts the ground surface 128 to support the first extension table 104 from the ground surface 128 when the first extension table 104 is in the unstowed position and when the fourth frame extension member 192 is in the unstowed position. The first wheel 108, the second wheel 110 and the first support wheel 164 share a common axis of rotation 134 when the fourth frame extension member 192 is in at least the unstowed position. Preferably, the frame attachment mechanism 218 telescopes from the main frame 120 along the pivot axis 146 to provide support for the extension tables when the load bed 113 moves to at least one of the bale accumulating position and the bale discharging position, as well as the additional support for the one side of the base module 112 when the frame attachment mechanism 218 moves the fourth frame extension member 192 to the stowed position.

C. Load Bed Alignment Mechanism

In the first and second embodiments of the load bed extension module 102, as shown in FIGS. 1–10 and 11–23, respectively, the agricultural bale accumulator further comprises an alignment mechanism 206 for aligning the portion 116 and 118 of the load bed 113 with the main frame 120 when the portion 116 and 118 of the load bed 113 moves from the bale discharging position to the bale accumulating position.

In the first embodiment of the load bed extension module 102, as particularly shown in FIGS. 5–7, the alignment mechanism 206 includes first and second alignment members, each being in the shape of an inverted "V", connected to the main frame 120 and the portion 116 and 118 of the load bed 113, respectively, on a front side 117 of the bale accumulator 100. The first alignment member cooperatively engages the second alignment member to align the portion 116 and 118 of the load bed 113 with the main frame 120 when the portion 116 and 118 of the load bed 113 is in the bale accumulating position. The first alignment member cooperatively disengages the second alignment member when the portion 116 and 118 of the load bed 113 is in the bale discharging position.

In the second embodiment of the load bed extension module 102, as particularly shown in FIGS. 13, 15–19 and 21, the alignment mechanism 206 includes two guide posts attached to the fixed frame member of the third frame extension member 154. The guide posts are positioned to fall between a side 124 or 126 of the load bed 113 and the first 104 or second 106 extension table to channel the load bed 113 into a home position on the main frame 120 when the load bed 113 is returning from the bale discharging position to the bale accumulating position.

The alignment mechanism 206 advantageously reduces the strain on the pivot point 188 when the load bed 113 moves from the bale discharging position to the bale accumulating position. Under new design considerations, the alignment mechanism 206 may not be necessary, if heavy-duty construction materials are used, especially on the pivot point 188 and the load bed 113.

D. Load Bed Latch Mechanism

In the second embodiment of the load bed extension module 102, as shown in FIGS. 11–23, the agricultural bale accumulator 100 further comprises a latch mechanism 208 for latching the portion 116 and 118 of the load bed 113 to the main frame 120 when the portion 116 and 118 of the load bed 113 is in the bale accumulating position and for unlatching the portion 116 and 118 of the load bed 113 from the main frame 120 when the portion 116 and 118 of the load bed 113 is in the bale discharging position.

The latch mechanism 208 advantageously secures the portion 116 and 118 of the load bed 113 to the main frame 120 when the extension tables have bales accumulated thereon. Without the latch mechanism 208, the weight of the bales on one side of the portion 116 and 118 of the load bed 113 could cause the front end 117 of the portion 116 and 118 of the load bed 113 on the other side of the portion 116 and 118 of the load bed 113 to twist in an upward direction away from the main frame 120. Under new design considerations the latch mechanism 208 may not be necessary if heavy duty construction materials are used, especially on the pivot point 188 and the load bed 113.

In the second embodiment of the load bed extension module 102, the latch mechanism 208 is shown in shown in FIGS. 13, 15, 16 and 18. The latch mechanism 208 includes a hook member 205, connected to the front side 117 of the main frame 120, a bar member 207, adapted to engage the hook member 205 and connected to the front side 117 of the load bed 113, and a control bar 209, connected to the hook member 205. The, latch mechanism 208 is attached to a front side 117 of the right side portion 116 of the load bed 113. The control bar is connected between the hook member 205 and the hydraulic cylinder 190 that is used for tilting the portion 116 and 118 of the load bed 113. When the hydraulic cylinder 190 begins to cause the portion 116 and 118 of the load bed 113 to move to the bale discharging position, an end of the hydraulic cylinder 190 moves along a slot 211 formed in the main frame 120 where the hydraulic cylinder 190 is attached. Such movement, pulls the control bar 209 to cause the hook member 205 to disengage the bar member 207 thereby permitting the hydraulic cylinder 190 to pivot the portion 116 and 118 of the load bed 113 to the bale discharging position. When the portion 116 and 118 of the load bed 113 returns to the bale accumulating position from the bale discharging position, the hydraulic cylinder 190 moves the opposite direction along the slot 211 to cause the hook member 205 to engage the bar member 207 thereby securing the portion 116 and 118 of the load bed 113 to the main frame 120 Therefore, the movement of the load bed 113 between bale accumulating position and the bale discharging position by the hydraulic cylinder 190 is advantageously mechanically coupled to the movement of the latch mechanism 208 between its latched position and its unlatched position, respectively.

E. Bale Position Sensors

In the first and second embodiment of the load bed extension module 102, as shown in FIGS. 1–10 and 11–23, respectively, each of the first 104 and second 106 extension tables include bale position sensors 176 and 178, respectively, for sensing bales disposed on each of the first 104 and second 106 extension tables, respectively. Bale position sensors 170, 172 and 174 are also located on the center table 114, right table 116 and left table 118 of load bed 113, respectively.

F. Multiple Extension Tables

In the third through twelfth embodiments of the load bed extension module 102, as shown in FIGS. 24–40, the agricultural bale accumulator further comprises a third extension table 105, a third extension table attachment mechanism 125 and a third extension table support system. The third extension table attachment mechanism 125 is connected to the third extension table 105 and the first extension table 104 to permit the third extension table 105 to be moveable with the first extension table 104 relative to the base module 112 when the first extension table 104 moves between the stowed position and the unstowed position. The third extension table 105 is moveable between a stowed position and an unstowed position relative to the first extension table 104. The third extension table 105 is substantially co-planar with the load bed 113 and the first extension table 104 and adjacent to the first extension table 104 when the first extension table 104 and the third extension table 105 are each in their unstowed positions to permit the third extension table 105 to accumulate thereon at least one of the plurality of bales.

The third extension table support system is connected to at least one of the base module 112, the first extension table 104 and the third extension table 105. The third extension table support system contacts the third extension table 105 at a location beyond the first extension table 104 and contacts at least one of the base module 112, the first extension table 104 and the ground surface 128 to support the third extension table 105 from at least one of the base module 112, the first extension table 104 and the ground surface 128, respectively, when the first extension table 104 and the third extension table 105 are each in their unstowed positions.

In the third through tenth embodiment of the load bed extension module 102, as shown in FIGS. 24–38, the first extension table attachment mechanism further comprises a first hinge 122 for pivotally connecting the first extension table 104 to the base module 112, at the load bed 113, about a first hinge axis 136. The third extension table attachment mechanism further comprises a third hinge 125 for pivotally connecting the third extension table 105 to the first extension table 104 about a third hinge axis 137. The first extension table 104 pivots upwards towards the base module 112 about the first hinge axis 136 when the first extension table is in the stowed position. The third extension table 105 pivots upwards towards the base module 112 and the first extension table 104 about the third hinge axis 137 when the third extension table 105 is in the stowed position. These embodiments advantageously permit the first 104 and third 105 extension tables to fold up next to the side of the load bed 113.

Figure 39:
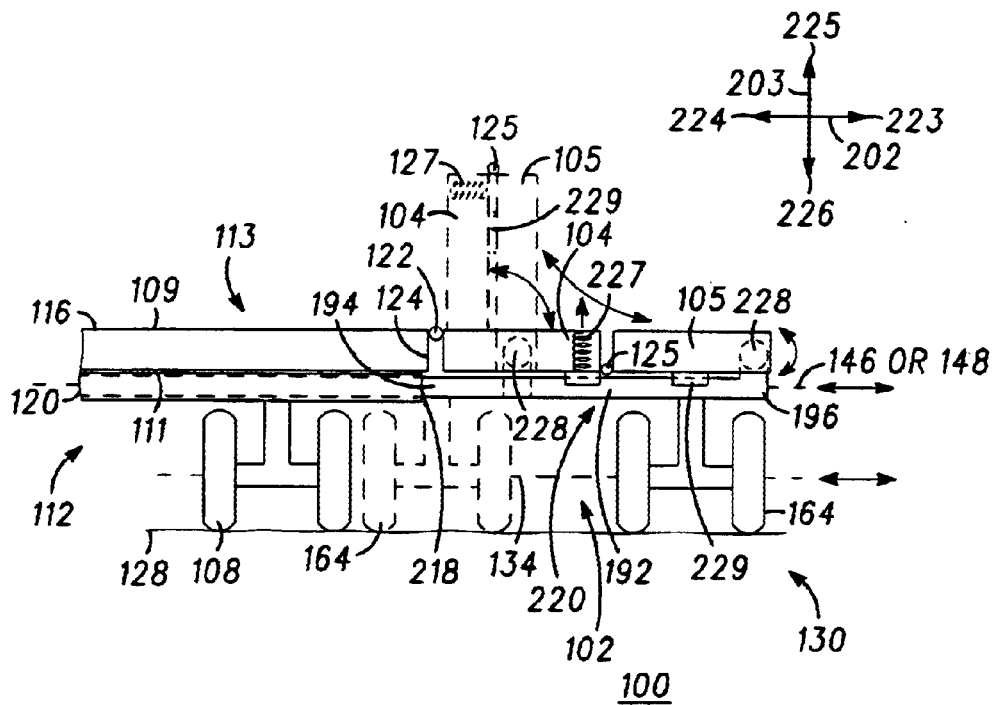

In the eleventh embodiment of the load bed extension module 102, as shown in FIG. 39, the first extension table attachment mechanism further comprises a first hinge 122 for pivotally connecting the first extension table 104 to the base module about a first hinge axis 136. The third extension table attachment mechanism further comprises a third hinge 125 for pivotally connecting the third extension table 105 to the first extension table 104 about a third hinge axis 137. The first extension table 105 pivots upwards towards the base module 112 about the first hinge axis 136 when the first extension table 104 is in the stowed position. The third extension table 105 pivots downwards towards the base module 112 and the first extension table 104 about the third hinge axis 137 when the third extension table 105 is in the stowed position. This embodiment advantageously permits the first 104 and third 105 extension tables to collapse in an accordion fashion next to the side of the load bed 113.

In the twelfth embodiment of the load bed extension module 102, as shown in FIG. 40, the first extension table attachment mechanism further includes a first telescoping mechanism 220 for telescopically connecting a proximal end of the first extension table 104 to the base module 112 along a horizontal axis relative to the base module 112. The third extension table attachment mechanism further comprises a first telescoping mechanism 220 for telescopically connecting a proximal end of the third extension table 105 to a distal end of the first extension table 104 along the horizontal axis relative to the base module 112. The first extension table 104 telescopes along the horizontal axis to a first position substantially inside a perimeter of the base module 112 when the first extension table 104 is in the stowed position. The third extension table 105 telescopes along the horizontal axis to a first position substantially inside the perimeter of the base module 112 and preferably inside the first extension table 104 when the third extension table 104 is in the stowed position. The first extension table 104 telescopes along the horizontal axis to a second position substantially outside the perimeter of the base module 112 when the first extension table 104 is in the unstowed position. The third extension table 105 telescopes along the horizontal axis to a second position substantially outside the perimeter of the base module 112 and preferably outside the first extension table 104 when the third extension table 105 is in the unstowed position. This twelfth embodiment advantageously permits the first 104 and third 105 extension tables to collapse within the perimeter of the load bed 113, and preferably inside or underneath the load bed 113.

In the twelfth embodiment of the load bed extension module 102, as shown in FIG. 40, a top surface of the first extension table 104 is lower than a top surface of the load bed 113 by a first predetermined distance 204 when the first extension table 104 is in the unstowed position. Further, a top surface of the third extension table 105 is lower than the top surface of the first extension table 104 by a second predetermined distance 204 when the third extension table 105 is in the unstowed position. This twelfth embodiment advantageously prevents bales disposed on the first 104 and third 105 extension tables from sliding back towards the center the load bed 113 of the bale accumulator 100, under relatively normal field conditions.

In the eleventh and twelfth embodiment of the load bed extension module 102, as shown in FIGS. 39 and 40, the moveable frame member of the fourth frame extension member 192 is connected to the third extension table 105 to move the first 104 and third 105 extension tables between their stowed and unstowed positions in cooperation with the moveable frame member of the fourth frame extension member 192 moving between its stowed and unstowed positions.

In FIG. 39, a bias spring 227 causes the first 104 and third 105 extension tables to pop upward about the hinge axis 225. The bias spring 227 exerts an upward force on at least one of the first 104 and third 105 extension tables to encourage the first extension table 104 to buckle towards the third extension table 105 about the hinge axis 225, without jamming. Hence, the bias spring 227 prevents the from third extension table 105 from jamming against the first extension table 104 through the hinge 125, if the first 104 and third 105 extension tables happen to be slightly inverted in a downward direction forming a "V" configuration.

In FIG. 39, spacers 229 support the first 104 and third 105 extension tables on the moveable frame member of the fourth frame extension member 192 when the first 104 and third 105 extension tables are each moved to their respective unstowed position. Preferably, the spacers 229 are located on each of the first 104 and third 105 extension tables in such a manner that the spacers 229 each of the first 104 and third 105 extension tables interleave or nest with each other to avoid mechanical interference. Hence, the spacers 229 permit the bale receiving surfaces of the first 104 and third 105 extension tables to be coplanar, even under the weight of the bales thereon, when the first 104 and third 105 extension tables are each moved to their respective unstowed position.

G. Modular Attachment/Detachment

Preferably, the load bed extension module 102 of the present invention is attachable to and detachable from the base module 112 as a modular unit independently of any other module on the agricultural bale accumulator 100. In each of the first and second embodiments of the load bed extension module 102, as shown in FIGS. 1–23, the load bed extension module 102 is adapted to a bale accumulator Model 1030, manufactured by Hoelscher, Inc.,312 S. Main, P.O Box 195, Bushton, Kans., U.S.A., 67427. With a modular construction, conventional bale accumulators presently used in the field may be upgraded with the load bed extension module 102 to increase the bale carrying capacity of the conventional bale accumulators. Alternatively, the modular construction of the load bed extension module 102 may offered as an option on newly manufactured bale accumulators to vary the bale carrying capacity of the bale accumulator according to the desires of the manufacturer, wholesaler, retailer or purchaser of the bale accumulator While the preferred embodiments describe a modular construction for the load bed extension module 102, the present invention is not limited to only a modular construction. The load bed extension module 102 may also be incorporated in to mechanical designs for bale accumulators such that it is not possible, difficult or inconvenient to detach the load bed extension module 102 from the base module 112.

H. Combination of Extension Table Support Systems

FIG. 42 illustrates a table 212 having thirty-six embodiments of the extension table support system 130 for a load bed extension module 102 for use on 146 and/or off 148 the pivot axis and/or for one or more extension tables 104, 105, 106 or 107. The twelve embodiments of the load bed extension module 102 are represented as individual combinations in the table 212 The table 212 shows each of the five embodiments for extension table support system 130 along each side of the table plus one category on each side indicating no support for an extension table. In the first and second embodiments of the load bed extension module 102, as shown in FIGS. 1–10 and 11–23, respectively, the table 212 is applied to one extension table 104 or 106 disposed on a side of the base module 112. In the third through twelfth embodiments of the load bed extension module 102, as shown in FIGS. 24–40, the table 212 is applied to more than one extension table 104 and 105 disposed on a side of the base module 112. In all twelve embodiments of the load bed extension module 102, as shown in FIGS. 1–40, the table 212 is applied to on 146 and/or off 148 the pivot axis. Thus, from the combinations in the table 212 and from the preferred embodiments described hereinabove numerous design alternatives can be achieved without departing from the spirit and scope of the present invention.

While the present invention has been described with reference to various illustrative embodiments thereof, the present invention is not intended that the invention be limited to these specific embodiments. Those skilled in the art will recognize that variations and modifications can be made without departing from the spirit and scope of the invention as set forth in the appended claims.

We claim:

1. An agricultural bale accumulator comprising:
    a base module including:
        a main frame positioned substantially horizontal to a ground surface;
        a hitch assembly mechanically coupled to the main frame and adapted to mechanically couple and decouple a front side of the main frame to a mating hitch assembly on a rear side of an agricultural baler, wherein the hitch assembly supports the front side of the main frame when the hitch assembly is mechanically coupled to the mating hitch assembly on the rear side of the agricultural baler to permit the agricultural bale accumulator and the agricultural baler to move about a longitudinal, fore-and-aft axis of the agricultural bale accumulator and the agricultural baler;
        first and second pairs of castor wheels mechanically coupled to the main frame at first and second locations, respectively, and adapted to pivot about first and second vertical axes, respectively, wherein the first and second pair of castor wheels, having a common axis of rotation transverse to the longitudinal axis, support the agricultural bale accumulator from the ground surface to permit the agricultural bale accumulator to be transported across the ground surface in a direction of travel;
        a load bed, having a substantially planar bale receiving surface, mechanically coupled to the main frame in a substantially horizontal position, and adapted to receive thereon a plurality of bales, having either a medium size or a large size, having a rectangular shape, and including a leading bale immediately followed by a trailing bale, successively ejected from a bale chamber of the agricultural baler along a bale receiving axis in a bale traveling direction, opposite to the direction of travel of the agricultural bale accumulator, towards a rear side of the agricultural bale accumulator to accumulate the plurality of bales on the load bed, wherein the load bed further includes:
            a center load bed adapted to successively receive thereon each bale of the plurality of bales ejected from the bale chamber of the agricultural baler and to accumulate thereon a first bale of the plurality of bales, where the center load bed is mechanically coupled to the main frame in a fixed, substantially horizontal position;
            a right load bed, located adjacent to a right side of the center load bed, adapted to receive thereon a bale of the plurality of bales from the center load bed and to accumulate thereon a second bale of the plurality of bales; and
            a left load bed, located adjacent to a left side, opposite to the right side, of the center load bed, adapted to receive thereon a bale of the plurality of bales from the center load bed and to accumulate thereon a third bale of the plurality of bales, a load bed extension module including:
- a first extension table, having a substantially planar bale receiving surface, adapted to receive thereon a bale of the plurality of bales from the right load bed and to accumulate thereon a fourth bale of the plurality of bales;
- a first hinge mechanism, including at least two spaced apart hinges, adapted to pivotally connect the first extension table to a right side of the right load bed about a first hinge axis to permit the first extension table to be moveable relative to the right load bed between a stowed position and an unstowed position, and to permit the first extension table to be moveable with the right load bed when the right load bed moves between a bale accumulating position and a bale discharging position, wherein the first extension table is disposed substantially perpendicular to and above the right load bed when the first extension table is in the stowed position thereby preventing the first extension table from accumulating thereon the fourth bale when the right load bed is in the bale accumulating position, and wherein the first extension table is disposed substantially co-planar with the right load bed and adjacent to the right side of the right load bed when the first extension table is in the unstowed position to permit the first extension table to accumulate thereon the fourth bale when the right load bed is in the bale accumulating position;
- a second extension table, having a substantially planar bale receiving surface, adapted to receive thereon a bale of the plurality of bales from the left load bed and to accumulate thereon a fifth bale of the plurality of bales; and
- a second hinge mechanism, including at least two spaced apart hinges, adapted to pivotally the second extension table to a left side of the right load bed about a second hinge axis to permit the second extension table to be moveable relative to the left load bed between a stowed position and an unstowed position, and to permit the second extension table to be moveable with the left load bed when the left load bed moves between the bale accumulating position and the bale discharging position, wherein the second extension table is disposed substantially perpendicular to and above the left load bed when the second extension table is in the stowed position thereby preventing the second extension table from accumulating thereon the fifth bale when the left load bed is in the bale accumulating position, and wherein the second extension table is disposed substantially co-planar with the left load bed and adjacent to the left side of the left load bed when the second extension table is in the unstowed position to permit the second extension table to accumulate thereon the fifth bale when the left load bed is in the bale accumulating position;
- wherein the bale accumulator has a first lateral width dimension when the first extension table and the second extension table are each in their stowed positions to provide a first bale accumulating capacity and a first bale discharging capacity, and wherein the bale accumulator has a second lateral width dimension, longer than the first lateral width dimension, when the first extension table and the second extension table are each in their unstowed positions to provide a second bale accumulating capacity greater than the first bale accumulating capacity and a second bale discharging capacity greater than the first bale discharging capacity, and
- wherein the agricultural bale accumulator is permitted to accumulate up to five bales, including the first bale, the second bale, the third bale, the fourth bale, and the fifth bale, when the first extension table and the second extension table are each in the unstowed position and when the right load bed and the left load bed are each in the bale accumulating position, and wherein the agricultural bale accumulator is permitted to discharge up to four bales at one time, including the second bale, the third bale, the fourth bale, and the fifth bale, when the first extension table and the second extension table are each in the unstowed position and when the right load bed and the left load bed are each in the bale discharging position;

a bale position sensing module adapted to determine when each bale of the plurality of bales located in a predetermined position on the center load bed along the bale receiving axis, indicative of each bale of the plurality of bales being completely formed, received by and accumulated on the center load bed, responsive to the receipt of each bale onto the center load bed to generate a first bale position signal, wherein the bale position sensing module further includes:
- a sensing plate located at the predetermined position along the bale receiving axis and moveable between a first position, at least coplanar with the bale receiving surface of the center load bed, and a second position, extending above the bale receiving surface of the center load bed, wherein the sensing plate is located in the first position responsive to a bale applying a force on the sensing plate, and wherein the sensing plate is located in the second position responsive to a bale not applying a force on the sensing plate; and
- a switch coupled to the sensing plate, wherein the switch has a first switch state responsive to the sensing plate being located in the first position to generate the first bale position signal, and wherein the switch has a second switch state responsive to the sensing plate being located in the second position to generate a second bale position signal;

a bale transfer module adapted to alternately transfer each of the plurality of bales, received by and accumulated on the center load bed, across the load bed to the right load bed and to the left load bed along a bale transfer axis transverse to the bale receiving axis responsive to a bale transfer signal to accumulate the plurality of bales on at least one of the right load bed, the left load bed, the first extension table, and the second extension table in a side-by-side relationship, wherein the bale transfer module further includes:
- a push bar extending above the bale receiving surface of the load bed and having a longitudinal axis disposed substantially parallel to the bale receiving axis, wherein the push bar is adapted move between a first position and a second position, wherein the push bar is in the first position when the push bar is located on at a right side of the center load, wherein the push bar is in the second position when the push bar is located at a left side of the center load bed, wherein the push bar is adapted to push a bale from the center load bed to the left load bed along the bale transfer axis responsive to the push bar moving from the first position to the second position, and wherein the push bar is adapted to push a bale from the center load bed to the right load bed along the bale transfer axis responsive to the push bar moving from the second position to the first position;

a bale discharge module adapted to discharge the plurality of bales accumulated on the load bed to the ground surface, wherein the bale discharge module is adapted to move between the bale accumulating position and the bale discharging position, wherein the agricultural bale accumulator is adapted to accumulate the plurality of bales on at least one of the center load bed, the right load bed, the left load bed, the first extension table, and the second extension table when the bale discharge module is located in the bale accumulating position, wherein the agricultural bale accumulator is adapted to discharge the plurality of bales accumulated on at least one of the right load bed, the left load bed, the first extension table, and the second extension table to the ground surface when the bale discharge module is located in the bale discharging position, wherein the bale discharge module further includes: p2 an attachment mechanism adapted to pivotally connect the load bed to the main frame, about a pivot point disposed on a horizontal pivot axis positioned transverse to the bale receiving axis, to permit the load bed to pivot relative to the main frame between the bale accumulating position and the bale discharging position, wherein the load bed is in a substantially horizontal position relative to the main frame when the load bed is in the bale accumulating position, and wherein the load bed is in an inclined position relative to the main frame when the load bed is in the bale discharging position, wherein a front side of the load bed is pivoted above the horizontal pivot axis and a rear side of the load bed is pivoted below the horizontal pivot axis when the load bed is in the inclined position to permit the plurality of bales accumulated on at least one of the right load bed, the left load bed, the first extension table, and the second extension table to be discharged from a rear side of the agricultural bale accumulator to the ground surface; and a pivot mechanism adapted to pivot the load bed between the bale accumulating position and the bale discharging position; and a controller, electrically coupled to the bale position sensing module, the bale transfer module, and the bale discharge module, and adapted to control the operation of the agricultural bale accumulator.

2. An agricultural bale accumulator according to claim 1, wherein the pivot mechanism further comprises:

a latch mechanism, including at least one hook and at least one catch bar located at a front side of the agricultural bale accumulator, mechanically coupled to an inside of the main frame and an under side of the load bed, and adapted to move between a latched position and an unlatched position, wherein the latch mechanism latches at least one of the right load bed and the left load bed to the main frame when the latch mechanism is in the latched position, wherein the latch mechanism unlatches at least one of the right load bed and the left load bed from the main frame when the latch mechanism is in the unlatched position, wherein at least one of the right load bed and the left load bed is in the bale accumulating position when the latch mechanism is in the latched position, wherein at least one of the right load bed and the left load bed is permitted to move to from the bale accumulating position to the bale discharging position under a force of gravity acting on a weight of the plurality of bales accumulated on at least one of the right load bed, the left load bed, the first extension table, and the second extension table when the latch mechanism is moved from the latched position to the unlatched position, respectively, and wherein at least one of the right load bed and the left load bed is permitted to move from the bale discharging position to the bale accumulating position under a bias force acting on at least one of the right load bed, the left load bed, the first extension table, and the second extension table without any bales accumulated thereon when the latch mechanism moves from the unlatched position to the latched position, respectively.

3. An agricultural bale accumulator according to claim 1, wherein the pivot mechanism further comprises:

a hydraulic cylinder having a first end coupled to the main frame and a second end coupled to at least one of the right load bed and the left load bed, and adapted to move the at least one of the right load bed and the left load bed between the bale accumulating position and the bale discharging position.

4. An agricultural bale accumulator according to claim 1, wherein:

the agricultural bale accumulator is permitted to accumulate up to three bales, including the first bale, the second bale, and the third bale, when the first extension table and the second extension table are each in the stowed position and when at least one of the right load bed and the left load bed is in the bale accumulating position, and wherein the agricultural bale accumulator is permitted to discharge up to two bales at one time, including the second bale, the third bale, when the first extension table and the second extension table are each in the stowed position and when at least one of the right load bed and the left load bed is in the bale discharging position.

5. An agricultural bale accumulator according to claim 1, wherein:

the agricultural bale accumulator is permitted to accumulate only the first bale when the first extension table and the second extension table are each in the stowed position and when each one of the right load bed and the left load bed is in the bale accumulating position, and wherein the agricultural bale accumulator is permitted to discharge only the first bale when the first extension table and the second extension table are each in the stowed position and when each one of the right load bed and the left load bed is in one of the bale accumulating position and the bale discharging position.

6. An agricultural bale accumulator according to claim 1, wherein the load bed extension module further comprises:

a first spring member, mechanically coupled between the right load bed and the first extension table and extending at least partially above the right load bed when the first extension table is in the stowed position, for exerting a bias force on the first extension table in a direction upward and inward towards the right side load bed portion to assist manual movement of the first extension table between the unstowed position and the stowed position when the right load bed is in the bale accumulating position; and a second spring member, mechanically coupled between the left load bed and the second extension table and extending at least partially above the left load bed when the second extension table is in the stowed position, for exerting a bias force on the second extension table in a direction upward and inward towards the left load bed to assist manual movement of the second extension table between the unstowed position and the stowed position when the left load bed is in the bale accumulating position.

7. An agricultural bale accumulator according to claim 1, wherein:
the bale discharge module moves between the bale accumulating position and the bale discharging position responsive to an automatically or manually generated electrical signal.

8. An agricultural bale accumulator according to claim 1, wherein:
the bale transfer module moves between the first position and the second position responsive to an automatically or manually generated electrical signal.

9. An agricultural bale accumulator according to claim 1 further comprising:
a control console, electrically coupled to the controller, adapted to be mounted in a cab of an operator to provide the operator with feedback about the operation of the agricultural bale accumulator to permit the operator to at least one of monitor and change the operation of the agricultural bale accumulator.

10. An agricultural bale accumulator according to claim 1, wherein the load bed extension module is attachable to and detachable from the base module independently of any other module on the agricultural bale accumulator.

11. An agricultural bale accumulator according to claim 1 wherein the load bed extension module further includes:
a first extension table support system connected to at least one of the base module and the first extension table, wherein the first extension table support system contacts the first extension table at a location beyond the first hinge axis and contacts at least one of the base module and the ground surface to support the first extension table from at least one of the base module and the ground surface, respectively, when the first extension table is in the unstowed position and when the right load bed is in one of or between the bale accumulating position and the bale discharging position; and
a second extension table support system connected to at least one of the base module and the second extension table, wherein the first extension table support system contacts the second extension table at a location beyond the second hinge axis and contacts at least one of the base module and the ground surface to support the second extension table from at least one of the base module and the ground surface, respectively, when the second extension table is in the unstowed position and when the left load bed is in one of or between the bale accumulating position and the bale discharging position.

12. An agricultural bale accumulator according to claim 11, wherein the first extension table support system further includes:
a second frame extension member, having a first end connected to the base module and a second end connected to the first extension table, being disposed below the bale receiving surface of each of the load bed and the first extension table when the first extension table is in the unstowed position and being moveable between a collapsed position and an expanded position, wherein the second frame extension member is in one of the collapsed position and the expanded position when the first extension table is in the unstowed position, and wherein the second frame extension member is in one of the expanded position and the collapsed position, respectively, when the first extension table is in the stowed position, and wherein the second frame extension member is connected to the first extension table and the base module to support the first extension table from the base module when the first extension table is in the unstowed position; and
wherein the second extension table support system further includes:
another second frame extension member, having a first end connected to the base module and a second end connected to the second extension table, being disposed below the bale receiving surface of each of the load bed and the second extension table when the second extension table is in the unstowed position and being moveable between a collapsed position and an expanded position, wherein the other second frame extension member is in one of the collapsed position and the expanded position when the second extension table is in the unstowed position, and wherein the other second frame extension member is in one of the expanded position and the collapsed position, respectively, when the second extension table is in the stowed position, and wherein the other second frame extension member is connected to the second extension table and the base module to support the second extension table from the base module when the second extension table is in the unstowed position.

13. An agricultural bale accumulator according to claim 12,
wherein the second frame extension member of the first extension table support system further comprises:
a first hydraulic cylinder for moving the first extension table between the stowed position and the unstowed position responsive to receiving pressurized hydraulic fluid from a hydraulic fluid source, and
wherein the second frame extension member of the second extension table support system further comprises:
a second hydraulic cylinder for moving the second extension table between the stowed position and the unstowed position responsive to receiving pressurized hydraulic fluid from the hydraulic fluid source.

14. An agricultural bale accumulator according to claim 13 further comprising:
at least a third hydraulic fluid cylinder having a first end connected to the main frame and a second end connected to at least one of the right load bed and the left load bed, wherein the at least a third hydraulic fluid cylinder moves the at least one of the right load bed and the left load bed relative to the main frame between the bale accumulating position and the bale discharging position responsive to receiving pressurized hydraulic fluid from the hydraulic fluid source; and
a hydraulic valve for selectively routing the pressurized hydraulic fluid from the hydraulic fluid source to either both the first hydraulic cylinder and the second hydraulic cylinder or the at least a third hydraulic fluid cylinder responsive to an electric control signal.

15. An agricultural bale accumulator according to claim 11:
- wherein the first extension table support system further comprises:
  - a third extension member having a proximal end and a distal end, wherein the proximal end of the third extension member is connected to the base module, wherein a distal end of the third extension member extends beyond the first hinge axis in a direction transverse to the direction of travel of the agricultural bale accumulator at a fixed position which is located inside the first lateral width dimension providing a road travel width dimension of the agricultural bale accumulator to permit safe traveling of the agricultural bale accumulator on a public roadway when the first extension table is in the stowed position, and
  - wherein a first portion of the first extension table is positioned inside the distal end of the third extension member and a second portion of the first extension table is positioned outside the distal end of the third extension member when the first extension table is in the unstowed position to permit the distal end of the third extension member to contact the first extension table at the fixed position between the first portion of the first extension table and the second portion of the first extension table to support the first extension table from the main frame, and
- wherein the second extension table support system further comprises:
  - another third extension member having a proximal end and a distal end, wherein the proximal end of the third extension member is connected to the base module, wherein a distal end of the other third extension member extends beyond the second hinge axis in a direction transverse to the direction of travel of the agricultural bale accumulator at a fixed position which is located inside the first lateral width dimension providing a road travel width dimension of the agricultural bale accumulator to permit safe traveling of the agricultural bale accumulator on a public roadway when the second extension table is in the stowed position, and
  - wherein a first portion of the second extension table is positioned inside the distal end of the other third extension member and a second portion of the second extension table is positioned outside the distal end of the other third extension member when the second extension table is in the unstowed position to permit the distal end of the other third extension member to contact the second extension table at the fixed position between the first portion of the second extension table and the second portion of the second extension table to support the second extension table from the base module.

16. An agricultural bale accumulator comprising:
- a base module including:
  - a main frame positioned substantially horizontal to a ground surface;
  - a hitch assembly mechanically coupled to the main frame and adapted to mechanically couple and decouple a front side of the main frame to a mating hitch assembly on a rear side of an agricultural baler, wherein the hitch assembly supports the front side of the main frame when the hitch assembly is mechanically coupled to the mating hitch assembly on the rear side of the agricultural baler to permit the agricultural bale accumulator and the agricultural baler to move about a longitudinal, fore-and-aft axis of the agricultural bale accumulator and the agricultural baler;
  - first and second pairs of castor wheels mechanically coupled to the main frame at first and second locations, respectively, and adapted to pivot about first and second vertical axes, respectively, wherein the first and second pair of castor wheels, having a common axis of rotation transverse to the longitudinal axis, support the agricultural bale accumulator from the ground surface to permit the agricultural bale accumulator to be transported across the ground surface in a direction of travel;
  - a load bed, having a substantially planar bale receiving surface, mechanically coupled to the main frame in a substantially horizontal position, and adapted to receive thereon a plurality of bales, having either a medium size or a large size, having a rectangular shape, and including a leading bale immediately followed by a trailing bale, successively ejected from a bale chamber of the agricultural baler along a bale receiving axis in a bale traveling direction, opposite to the direction of travel of the agricultural bale accumulator, towards a rear side of the agricultural bale accumulator to accumulate the plurality of bales on the load bed, wherein the load bed further includes:
    - a center load bed adapted to successively receive thereon each bale of the plurality of bales ejected from the bale chamber of the agricultural baler and to accumulate thereon a first bale of the plurality of bales, where the center load bed is mechanically coupled to the main frame in a fixed, substantially horizontal position;
    - a right load bed, located adjacent to a right side of the center load bed, adapted to receive thereon a bale of the plurality of bales from the center load bed and to accumulate thereon a second bale of the plurality of bales; and
    - a left load bed, located adjacent to a left side, opposite to the right side, of the center load bed, adapted to receive thereon a bale of the plurality of bales from the center load bed and to accumulate thereon a third bale of the plurality of bales,
  - a load bed extension module including:
    - a first extension table, having a substantially planar bale receiving surface, adapted to receive thereon a bale of the plurality of bales from the right load bed and to accumulate thereon a fourth bale of the plurality of bales;
    - a first hinge mechanism, including at least two spaced apart hinges, adapted to pivotally connect the first extension table to a right side of the right load bed about a first hinge axis to permit the first extension table to be moveable relative to the right load bed between a stowed position and an unstowed position, and to permit the first extension table to be moveable with the right load bed when the right load bed moves between a bale accumulating position and a bale discharging position, wherein the first extension table is disposed substantially perpendicular to and above the right load bed when the first extension table is in the stowed position thereby preventing the first extension table from accumulating thereon the fourth bale when the right load bed is in the bale accumulating position, and wherein the first extension table is disposed substantially co-planar with the right load bed and adjacent to the right side of the right load bed when the first extension table is in the unstowed position to permit the first extension table to accumulate thereon the fourth bale when the right load bed is in the bale accumulating position;

a first spring member, mechanically coupled between the right load bed and the first extension table and extending at least partially above the right load bed when the first extension table is in the stowed position, for exerting a bias force on the first extension table in a direction upward and inward towards the right load bed portion to assist manual movement of the first extension table between the unstowed position and the stowed position when the right load bed is in the bale accumulating position;

a second extension table, having a substantially planar bale receiving surface, adapted to receive thereon a bale of the plurality of bales from the left load bed and to accumulate thereon a fifth bale of the plurality of bales;

a second hinge mechanism adapted to pivotally connect the second extension table to a left side of the right load bed about a second hinge axis to permit the second extension table to be moveable relative to the left load bed between a stowed position and an unstowed position, and to permit the second extension table to be moveable with the left load bed when the left load bed moves between the bale accumulating position and the bale discharging position, wherein the second extension table is disposed substantially perpendicular to and above the left load bed when the second extension table is in the stowed position thereby preventing the second extension table from accumulating thereon the fifth bale when the left load bed is in the bale accumulating position, and wherein the second extension table is disposed substantially co-planar with the left load bed and adjacent to the left side of the left load bed when the second extension table is in the unstowed position to permit the second extension table to accumulate thereon the fifth bale when the left load bed is in the bale accumulating position; and a second spring member, mechanically coupled between the left load bed and the second extension table and extending at least partially above the left load bed when the second extension table is in the stowed position, for exerting a bias force on the second extension table in a direction upward and inward towards the left load bed to assist manual movement of the second extension table between the unstowed position and the stowed position when the left load bed is in the bale accumulating position;

wherein the bale accumulator has a first lateral width dimension when the first extension table and the second extension table are each in their stowed positions to provide a first bale accumulating capacity and a first bale discharging capacity, and wherein the bale accumulator has a second lateral width dimension, longer than the first lateral width dimension, when the first extension table and the second extension table are each in their unstowed positions to provide a second bale accumulating capacity greater than the first bale accumulating capacity and a second bale discharging capacity greater than the first bale discharging capacity, wherein the agricultural bale accumulator is permitted to accumulate up to five bales, including the first bale, the second bale, the third bale, the fourth bale, and the fifth bale, when the first extension table and the second extension table are each in the unstowed position and when the right load bed and the left load bed are each in the bale accumulating position, and wherein the agricultural bale accumulator is permitted to discharge up to four bales at one time, including the second bale, the third bale, the fourth bale, and the fifth bale, when the first extension table and the second extension table are each in the unstowed position and when the right load bed and the left load bed are each in the bale discharging position, and wherein the agricultural bale accumulator is permitted to accumulate up to three bales, including the first bale, the second bale, and the third bale, when the first extension table and the second extension table are each in the stowed position and when at least one of the right load bed and the left load bed is in the bale accumulating position, and wherein the agricultural bale accumulator is permitted to discharge up to two bales at one time, including the second bale, the third bale, when the first extension table and the second extension table are each in the stowed position and when at least one of the right load bed and the left load bed is in the bale discharging position;

a bale position sensing module adapted to determine when each bale of the plurality of bales located in a predetermined position on the center load bed along the bale receiving axis, indicative of each bale of the plurality of bales being completely formed, received by and accumulated on the center load bed, responsive to the receipt of each bale onto the center load bed to generate a first bale position signal, wherein the bale position sensing module further includes:

a sensing plate located at the predetermined position along the bale receiving axis and moveable between a first position, at least coplanar with the bale receiving surface of the center load bed, and a second position, extending above the bale receiving surface of the center load bed, wherein the sensing plate is located in the first position responsive to a bale applying a force on the sensing plate, and wherein the sensing plate is located in the second position responsive to a bale not applying a force on the sensing plate; and a switch coupled to the sensing plate, wherein the switch has a first switch state responsive to the sensing plate being located in the first position to generate the first bale position signal, and wherein the switch has a second switch state responsive to the sensing plate being located in the second position to generate a second bale position signal;

a bale transfer module adapted to alternately transfer each of the plurality of bales, received by and accumulated on the center load bed, across the load bed to the right load bed and to the left load bed along a bale transfer axis transverse to the bale receiving axis responsive to a bale transfer signal to accumulate the plurality of bales on at least one of the right load bed, the left load bed, the first extension table, and the second extension table in a side-by-side relationship, wherein the bale transfer module moves between the first position and the second position responsive to an automatically or manually generated electrical signal, and wherein the bale transfer module further includes:
a push bar extending above the bale receiving surface of the load bed and having a longitudinal axis disposed substantially parallel to the bale receiving axis, wherein the push bar is adapted move between a first position and a second position, wherein the push bar is in the first position when the push bar is located on at a right side of the center load, wherein the push bar is in the second position when the push bar is located at a left side of the center load bed, wherein the push bar is adapted to push a bale from the center load bed to the left load bed along the bale transfer axis responsive to the push bar moving from the first position to the second position, and wherein the push bar is adapted to push a bale from the center load bed to the right load bed along the bale transfer axis responsive to the push bar moving from the second position to the first position;

a bale discharge module adapted to discharge the plurality of bales accumulated on the load bed to the ground surface, wherein the bale discharge module is adapted to move between the bale accumulating position and the bale discharging position, wherein the agricultural bale accumulator is adapted to accumulate the plurality of bales on at least one of the center load bed, the right load bed, the left load bed, the first extension table, and the second extension table when the bale discharge module is located in the bale accumulating position, wherein the agricultural bale accumulator is adapted to discharge the plurality of bales accumulated on at least one of the right load bed, the left load bed, the first extension table, and the second extension table to the ground surface when the bale discharge module is located in the bale discharging position, wherein the bale discharge module moves between the bale accumulating position and the bale discharging position responsive to an automatically or manually generated electrical signal, and wherein the bale discharge module further includes:

an attachment mechanism adapted to pivotally connect the load bed to the main frame, about a pivot point disposed on a horizontal pivot axis positioned transverse to the bale receiving axis, to permit the load bed to pivot relative to the main frame between the bale accumulating position and the bale discharging position, wherein the load bed is in a substantially horizontal position relative to the main frame when the load bed is in the bale accumulating position, and wherein the load bed is in an inclined position relative to the main frame when the load bed is in the bale discharging position, wherein a front side of the load bed is pivoted above the horizontal pivot axis and a rear side of the load bed is pivoted below the horizontal pivot axis when the load bed is in the inclined position to permit the plurality of bales accumulated on at least one of the right load bed, the left load bed, the first extension table, and the second extension table to be discharged from the rear side of the agricultural bale accumulator to the ground surface; and a pivot mechanism adapted to pivot the load bed between the bale accumulating position and the bale discharging position, wherein the pivot mechanism further includes:

a latch mechanism, including at least one hook and at least one catch bar located at a front side of the agricultural bale accumulator, mechanically coupled to an inside of the main frame and an under side of the load bed, and adapted to move between a latched position and an unlatched position, wherein the latch mechanism latches at least one of the right load bed and the left load bed to the main frame when the latch mechanism is in the latched position, wherein the latch mechanism unlatches at least one of the right load bed and the left load bed from the main frame when the latch mechanism is in the unlatched position, wherein at least one of the right load bed and the left load bed is in the bale accumulating position when the latch mechanism is in the latched position, wherein at least one of the right load bed and the left load bed is permitted to move to from the bale accumulating position to the bale discharging position under a force of gravity acting on a weight of the plurality of bales accumulated on at least one of the right load bed, the left load bed, the first extension table, and the second extension table when the latch mechanism is moved from the latched position to the unlatched position, respectively, and wherein at least one of the right load bed and the left load bed is permitted to move from the bale discharging position to the bale accumulating position under a bias force acting on at least one of the right load bed, the left load bed, the first extension table, and the second extension table without any bales accumulated thereon when the latch mechanism moves from the unlatched position to the latched position, respectively; and a controller, electrically coupled to the bale position sensing module, the bale transfer module, and the bale discharge module, and adapted to control the operation of the agricultural bale accumulator.

17. An agricultural bale accumulator according to claim 16 further comprising:

a control console, electrically coupled to a controller, adapted to be mounted in a cab or an operator to provide the operator with feedback about the operation of the agricultural bale accumulator to permit the operator to at least one of monitor and change the operation of the agricultural bale accumulator.

18. An agricultural bale accumulator comprising:

a base module including:

a main frame positioned substantially horizontal to a ground surface;

a hitch assembly mechanically coupled to the main frame and adapted to mechanically couple and decouple a front side of the main frame to a mating hitch assembly on a rear side of an agricultural baler, wherein the hitch assembly supports the front side of the main frame when the hitch assembly is mechanically coupled to the mating hitch assembly on the rear side of the agricultural baler to permit the agricultural bale accumulator and the agricultural baler to move about a longitudinal, fore-and-aft axis of the agricultural bale accumulator and the agricultural baler;

first and second pairs of castor wheels mechanically coupled to the main frame at first and second locations, respectively, and adapted to pivot about first and second vertical axes, respectively, wherein the first and second pair of castor wheels, having a common axis of rotation transverse to the longitudinal axis, support the agricultural bale accumulator from the ground surface to permit the agricultural bale accumulator to be transported across the ground surface in a direction of travel;

a load bed, having a substantially planar bale receiving surface, mechanically coupled to the main frame in a substantially horizontal position, and adapted to receive thereon a plurality of bales, having either a medium size or a large size, having a rectangular shape, and including a leading bale immediately followed by a trailing bale, successively ejected from a bale chamber of the agricultural baler along a bale receiving axis in a bale traveling direction, opposite to the direction of travel of the agricultural bale accumulator, towards a rear side of the agricultural bale accumulator to accumulate the plurality of bales on the load bed, wherein the load bed further includes:

a center load bed adapted to successively receive thereon each bale of the plurality of bales ejected from the bale chamber of the agricultural baler and to accumulate thereon a first bale of the plurality of bales, where the center load bed is mechanically coupled to the main frame in a fixed, substantially horizontal position;

a right load bed, located adjacent to a right side of the center load bed, adapted to receive thereon a bale of the plurality of bales from the center load bed and to accumulate thereon a second bale of the plurality of bales; and a left load bed, located adjacent to a left side, opposite to the right side, of the center load bed, adapted to receive thereon a bale of the plurality of bales from the center load bed and to accumulate thereon a third bale of the plurality of bales, a load bed extension module including:

a first extension table, having a substantially planar bale receiving surface, adapted to receive thereon a bale of the plurality of bales from the right load bed and to accumulate thereon a fourth bale of the plurality of bales;

a first hinge mechanism, including at least two spaced apart hinges, adapted to pivotally connect the first extension table to a right side of the right load bed about a first hinge axis to permit the first extension table to be moveable relative to the right load bed between a stowed position and an unstowed position, and to permit the first extension table to be moveable with the right load bed when the right load bed moves between a bale accumulating position and a bale discharging position, wherein the first extension table is disposed substantially perpendicular to and above the right load bed when the first extension table is in the stowed position thereby preventing the first extension table from accumulating thereon the fourth bale when the right load bed is in the bale accumulating position, and wherein the first extension table is disposed substantially co-planar with the right load bed and adjacent to the right side of the right load bed when the first extension table is in the unstowed position to permit the first extension table to accumulate thereon the fourth bale when the right load bed is in the bale accumulating position;

a second extension table, having a substantially planar bale receiving surface, adapted to receive thereon a bale of the plurality of bales from the left load bed and to accumulate thereon a fifth bale of the plurality of bales; and a second hinge mechanism, including at least two spaced apart hinges, adapted to pivotally the second extension table to a left side of the right load bed about a second hinge axis to permit the second extension table to be moveable relative to the left load bed between a stowed position and an unstowed position, and to permit the second extension table to be moveable with the left load bed when the left load bed moves between the bale accumulating position and the bale discharging position, wherein the second extension table is disposed substantially perpendicular to and above the left load bed when the second extension table is in the stowed position thereby preventing the second extension table from accumulating thereon the fifth bale when the left load bed is in the bale accumulating position, and wherein the second extension table is disposed substantially co-planar with the left load bed and adjacent to the left side of the left load bed when the second extension table is in the unstowed position to permit the second extension table to accumulate thereon the fifth bale when the left load bed is in the bale accumulating position;

wherein the bale accumulator has a first lateral width dimension when the first extension table and the second extension table are each in their stowed positions to provide a first bale accumulating capacity and a first bale discharging capacity, and wherein the bale accumulator has a second lateral width dimension, longer than the first lateral width dimension, when the first extension table and the second extension table are each in their unstowed positions to provide a second bale accumulating capacity greater than the first bale accumulating capacity and a second bale discharging capacity greater than the first bale discharging capacity, wherein the agricultural bale accumulator is permitted to accumulate up to five bales, including the first bale, the second bale, the third bale, the fourth bale, and the fifth bale, when the first extension table and the second extension table are each in the unstowed position and when the right load bed and the left load bed are each in the bale accumulating position, and wherein the agricultural bale accumulator is permitted to discharge up to four bales at one time, including the second bale, the third bale, the fourth bale, and the fifth bale, when the first extension table and the second extension table are each in the unstowed position and when the right load bed and the left load bed are each in the bale discharging position, and wherein the agricultural bale accumulator is permitted to accumulate only the first bale when the first extension table and the second extension table are each in the stowed position and when each one of the right load bed and the left load bed is in the bale accumulating position, and wherein the agricultural bale accumulator is permitted to discharge only the first bale when the first extension table and the second extension table are each in the stowed position and when each one of the right load bed and the left load bed is in one of the bale accumulating position and the bale discharging position;

a bale position sensing module adapted to determine when each bale of the plurality of bales located in a predetermined position on the center load bed along the bale receiving axis, indicative of each bale of the plurality of bales being completely formed, received by and accumulated on the center load bed, responsive to the receipt of each bale onto the center load bed to generate a first bale position signal, wherein the bale position sensing module further includes:

a sensing plate located at the predetermined position along the bale receiving axis and moveable between a first position, at least coplanar with the bale receiving surface of the center load bed, and a second position, extending above the bale receiving surface of the center load bed, wherein the sensing plate is located in the first position responsive to a bale applying a force on the sensing plate, and wherein the sensing plate is located in the second position responsive to a bale not applying a force on the sensing plate; and a switch coupled to the sensing plate, wherein the switch has a first switch state responsive to the sensing plate being located in the first position to generate the first bale position signal, and wherein the switch has a second switch state responsive to the sensing plate being located in the second position to generate a second bale position signal;

a bale transfer module adapted to alternately transfer each of the plurality of bales, received by and accumulated on the center load bed, across the load bed to the right load bed and to the left load bed along a bale transfer axis transverse to the bale receiving axis responsive to a bale transfer signal to accumulate the plurality of bales on at least one of the right load bed, the left load bed, the first extension table, and the second extension table in a side-by-side relationship, wherein the bale transfer module moves between the first position and the second position responsive to an automatically or manually generated electrical signal, and wherein the bale transfer module further includes:
a push bar extending above the bale receiving surface of the load bed and having a longitudinal axis disposed substantially parallel to the bale receiving axis, wherein the push bar is adapted move between a first position and a second position, wherein the push bar is in the first position when the push bar is located on at a right side of the center load, wherein the push bar is in the second position when the push bar is located at a left side of the center load bed, wherein the push bar is adapted to push a bale from the center load bed to the left load bed along the bale transfer axis responsive to the push bar moving from the first position to the second position, and wherein the push bar is adapted to push a bale from the center load bed to the right load bed along the bale transfer axis responsive to the push bar moving from the second position to the first position;

a bale discharge module adapted to discharge the plurality of bales accumulated on the load bed to the ground surface, wherein the bale discharge module is adapted to move between the bale accumulating position and the bale discharging position, wherein the agricultural bale accumulator is adapted to accumulate the plurality of bales on at least one of the center load bed, the right load bed, the left load bed, the first extension table, and the second extension table when the bale discharge module is located in the bale accumulating position, wherein the agricultural bale accumulator is adapted to discharge the plurality of bales accumulated on at least one of the right load bed, the left load bed, the first extension table, and the second extension table to the ground surface when the bale discharge module is located in the bale discharging position, wherein the bale discharge module moves between the bale accumulating position and the bale discharging position responsive to an automatically or manually generated electrical signal, and wherein the bale discharge module further includes:
an attachment mechanism adapted to pivotally connect the load bed to the main frame, about a pivot point disposed on a horizontal pivot axis positioned transverse to the bale receiving axis, to permit the load bed to pivot relative to the main frame between the bale accumulating position and the bale discharging position, wherein the load bed is in a substantially horizontal position relative to the main frame when the load bed is in the bale accumulating position, and wherein the load bed is in an inclined position relative to the main frame when the load bed is in the bale discharging position, wherein a front side of the load bed is pivoted above the horizontal pivot axis and a rear side of the load bed is pivoted below the horizontal pivot axis when the load bed is in the inclined position to permit the plurality of bales accumulated on at least one of the right load bed, the left load bed, the first extension table, and the second extension table to be discharged from the rear side of the agricultural bale accumulator to the ground surface; and a pivot mechanism adapted to pivot the load bed between the bale accumulating position and the bale discharging position wherein the pivot mechanism further includes:
a hydraulic cylinder having a first end coupled to the main frame and a second end coupled to at least one of the right load bed and the left load bed, and adapted to move the at least one of the right load bed and the left load bed between the bale accumulating position and the bale discharging position; and a controller, electrically coupled to the bale position sensing module, the bale transfer module, and the bale discharge module, and adapted to control the operation of the agricultural bale accumulator.

19. An agricultural bale accumulator according to claim 18 wherein the load bed extension module further includes:
a first extension table support system connected to at least one of the base module and the first extension table, wherein the first extension table support system contacts the first extension table at a location beyond the first hinge axis and contacts at least one of the base module and the ground surface to support the first extension table from at least one of the base module and the ground surface, respectively, when the first extension table is in the unstowed position and when the right load bed is in one of or between the bale accumulating position and the bale discharging position; and a second extension table support system connected to at least one of the base module and the second extension table, wherein the first extension table support system contacts the second extension table at a location beyond the second hinge axis and contacts at least one of the base module and the ground surface to support the second extension table from at least one of the base module and the ground surface, respectively, when the second extension table is in the unstowed position and when the left load bed is in one of or between the bale accumulating position and the bale discharging position.

20. An agricultural bale accumulator according to claim 19:
wherein the first extension table support system further comprises:

a third extension member having a proximal end and a distal end, wherein the proximal end of the third extension member is connected to the base module, wherein a distal end of the third extension member extends beyond the first hinge axis in a direction transverse to the direction of travel of the agricultural bale accumulator at a fixed position which is located inside the first lateral width dimension providing a road travel width dimension of the agricultural bale accumulator to permit safe traveling of the agricultural bale accumulator on a public roadway when the first extension table is in the stowed position, and wherein a first portion of the first extension table is positioned inside the distal end of the third extension member and a second portion of the first extension table is positioned outside the distal end of the third extension member when the first extension table is in the unstowed position to permit the distal end of the third extension member to contact the first extension table at the fixed position between the first portion of the first extension table and the second portion of the first extension table to support the first extension table from the main frame, and wherein the second extension table support system further comprises:

another third extension member having a proximal end and a distal end, wherein the proximal end of the other third extension member is connected to the base module, wherein a distal end of the other third extension member extends beyond the second hinge axis in a direction transverse to the direction of travel of the agricultural bale accumulator at a fixed position which is located inside the first lateral width dimension providing a road travel width dimension of the agricultural bale accumulator to permit safe traveling of the agricultural bale accumulator on a public roadway when the second extension table is in the stowed position, and wherein a first portion of the second extension table is positioned inside the distal end of the other third extension member and a second portion of the second extension table is positioned outside the distal end of the other third extension member when the second extension table is in the unstowed position to permit the distal end of the other third extension member to contact the second extension table at the fixed position between the first portion of the second extension table and the second portion of the second extension table to support the second extension table from the base module.

21. Agricultural bale accumulator comprising:

a base module including:

a main frame positioned substantially horizontal to a ground surface; and a load bed, having a substantially planar bale receiving surface, mechanically coupled to and supported by the main frame, and adapted to receive thereon a plurality of bales, having either a medium size or a large size, having a rectangular shape, including a leading bale immediately followed by a trailing bale, successively ejected from a bale chamber of a agricultural baler along a bale receiving axis in a bale traveling direction, opposite to a direction of travel of the agricultural bale accumulator, towards a rear side of the agricultural bale accumulator to accumulate the plurality of bales on the load bed, wherein the load bed further includes:

a center load bed adapted to successively receive thereon each bale of the plurality of bales ejected from the bale chamber of the agricultural baler and to accumulate thereon a second bale of the plurality of bales; and a right load bed, located adjacent to a right side of a center load bed, adapted to receive thereon a bale chamber of the plurality of bales from the center load bed and to accumulate thereon a second bale of the plurality of bales; and a left load bed, located adjacent to a right side of the center load bed, adapted to receive thereon a bale of the plurality of bales from the center load bed and to accumulate thereon a second bale of the plurality of bales;

a right load bed, located adjacent to a right side of te center load bed, adapted to receive thereon a bale of the plurality of bales from the center load bed and accumulate thereon a second bale of the plurality of bales; and a left load bed, located adjacent to a left side, opposite to the right side, of the center load bed, adapted to receive thereon a bale of the plurality of bales from the center load bed and to accumulate thereon a third bale of the plurality of bales;

a bale transfer module adapted to alternately transfer each of the plurality of bales, received by and accumulated on the center load bed, across the load bed to the right load bed and to the left load bed along a bale transfer axis transverse to the bale receiving axis responsive to bale transfer signal to accumulate the plurality of bales on at least one of the center load bed, the right load bed, and the left load bed in a side-by-side relationship, wherein the bale transfer module further comprises:

a first push mechanism extending above the bale receiving surface of the load bed and having a longitudinal axis disposed substantially parallel to the bale receiving axis, wherein the first push mechanism is adapted move between a first position when the first position and a second position, wherein the first push mechanism is in the first position when the first push mechanism is located at a right side of the center load, wherein the first push mechanism is in the second position when the first push mechanism is located at a left side of the center load bed, wherein the first push mechanism is adapted to push a bale from the center load bed to the left load bed along the bale transfer axis responsive to the first push mechanism moving from the first position to the second position, and wherein the first push mechanism is adapted to push a bale from the center load bed to the right load bed along the bale transfer axis responsive to the first push mechanism moving from the second position to the first position; and a bale discharge module adapted to move between the bale accumulating position and the bale discharging position responsive to a bale discharge signal to discharge at least one of the plurality of bales accumulated on the load bed to the ground surface, wherein the agricultural bale accumulator is adapted to accumulate at least one of the plurality of bales on the load bed when the bale discharge module is located in the bale accumulating position, and wherein the agricultural bale accumulator is adapted to discharge at least one of the plurality of bales accumulated on the load bed to the ground surface when the bale discharge module is moved from the bale accumulating position to the bale discharging position, wherein the bale discharge module further comprises:

a second push mechanism extending above the bale receiving surface of the load bed and having a longitudinal axis disposed substantially transverse to the bale receiving axis, wherein the second push mechanism is adapted move along a bale discharge axis parallel to the bale receiving axis between the bale accumulating position and the bale discharging position, wherein the second push mechanism is in the bale accumulating position when the second push mechanism is located near a front side of the load bed, wherein the second push mechanism is in the bale discharging position when the second push mechanism is moved towards a rear side of the load bed.

22. Agricultural bale accumulator, according to claim 21, further comprising:
a hitch assembly mechanically coupled to the main frame and adapted to mechanically couple and decouple a front side of the main frame to a mating hitch assembly on a rear side of the agricultural baler to permit the agricultural bale accumulator to be towed by the agricultural baler; and
first and second pairs of castor wheels mechanically coupled to the main frame at first and second locations, respectively, and adapted to pivot about first and second substantially vertical axes, respectively, wherein the first and second pair of castor wheels, having a common axis of rotation transverse to a longitudinal axis of the agricultural bale accumulator, support the agricultural bale accumulator from the ground surface to permit the agricultural bale accumulator to be transported across the ground surface in the direction of travel.

23. Agricultural bale accumulator, according to claim 21, a bale position sensing module adapted to generate at least one bale position signal responsive to determining a position of at least one bale received and accumulated on at least one of the center load bed, the right load bed, and the left load bed.

24. Agricultural bale accumulator, according to claim 21, further comprising:
a hydraulic fluid system including:
a hydraulic fluid valve including a first set of hydraulic fluid ports, a second set of hydraulic fluid ports, and a third set of hydraulic fluid ports, and adapted to selectively couple pressurized hydraulic fluid received by the first set of hydraulic fluid ports from a hydraulic fluid source to one of the second set of hydraulic fluid ports and the third set of hydraulic fluid ports;
a first set of hydraulic fluid lines adapted to be mechanically coupled to and in fluid communication with first set of hydraulic fluid ports to distribute the pressurized hydraulic fluid from the hydraulic fluid source to the first set of hydraulic fluid ports;
a first hydraulic fluid cylinder mechanically coupled to and in fluid communication with the second set of hydraulic fluid ports, and adapted to move between a first position of the first hydraulic fluid cylinder and a second position of the first hydraulic fluid cylinder responsive to receiving the pressurized hydraulic fluid from the second set of hydraulic fluid ports;
a second set of hydraulic fluid lines adapted to be mechanically coupled to and in fluid communication with the second set of hydraulic fluid ports to distribute the pressurized hydraulic fluid from the second set of hydraulic fluid ports to the first hydraulic fluid cylinder;
a second hydraulic fluid cylinder mechanically coupled to and in fluid communication with the third set of hydraulic fluid ports, and adapted to move between a first position of the second hydraulic fluid cylinder and a second position of the second hydraulic fluid cylinder responsive to receiving the pressurized hydraulic fluid from the third set of hydraulic fluid ports; and
a third set of hydraulic fluid lines adapted to be mechanically coupled to and in fluid communication with the third set of hydraulic fluid ports to distribute the pressurized hydraulic fluid from the third set of hydraulic fluid ports to the second hydraulic fluid cylinder;
a first accumulator module including a first mechanical part adapted to perform a first mechanical function and adapted to move between a first position of the first mechanical part and a second position of the first mechanical part responsive to the first hydraulic fluid cylinder moving between the first position of the first hydraulic fluid cylinder and the second position of the first hydraulic fluid cylinder, respectively, and
a second accumulator module including a second mechanical part adapted to perform a second mechanical function, different from the first function, and adapted to move between a first position of the second mechanical part and a second position of the second mechanical part responsive to the second hydraulic fluid cylinder moving between the first position of the second hydraulic fluid cylinder and the second position of the second hydraulic fluid cylinder, respectively.

25. Agricultural bale accumulator, according to claim 24, further comprising:
a controller adapted to cause the hydraulic fluid valve to selectively couple the pressurized hydraulic fluid from the first set of hydraulic fluid ports to one of the second set of hydraulic fluid ports and the third set of hydraulic fluid ports.

26. Agricultural bale accumulator, according to claim 25, further comprising:
an operator control console adapted to be electrically coupled to the controller to permit an operator generate an operator control signal to cause the controller to selectively couple the pressurized hydraulic fluid from the first set of hydraulic fluid ports to one of the second set of hydraulic fluid ports and the third set of hydraulic fluid ports.

27. Agricultural bale accumulator, according to claim 25, wherein the first accumulator module and the second accumulator module further comprise: two different corresponding modules selected from the following modules: a bale movement module; a load bed extension module; the bale transfer module; and the bale discharge module.

28. Agricultural bale accumulator, according to claim 27, wherein the load bed extension module further comprises:
a first extension table, having a substantially planar bale receiving surface, adapted to receive thereon a bale of the plurality of bales from the right load bed and to accumulate thereon a fourth bale of the plurality of bales;
a first attachment mechanism adapted to connect the first extension table to a right side of the right load bed to permit the first extension table to be moveable relative to the right load bed between a stowed position and an unstowed position, wherein the first extension table is disposed substantially co-planar with the right load bed and adjacent to the right side of the right load bed when the first extension table is in the unstowed position to permit the first extension table to accumulate thereon the fourth bale, and wherein the first extension table is prevented from accumulating thereon the fourth bale when the first extension table is in the stowed position;

a second extension table, having a substantially planar bale receiving surface, adapted to receive thereon a bale of the plurality of bales from the left load bed and to accumulate thereon a fifth bale of the plurality of bales; and a second attachment mechanism adapted to connect the second extension table to a left side of the left load bed to permit the second extension table to be moveable relative to the left load bed between a stowed position and an unstowed position, wherein the second extension table is disposed substantially co-planar with the left load bed and adjacent to the left side of the left load bed when the second extension table is in the unstowed position to permit the second extension table to accumulate thereon the fifth bale, wherein the second extension table is prevented from accumulating thereon the fifth bale when the second extension table is in the stowed position;

wherein the bale accumulator has a first lateral width dimension when the first extension table and the second extension table are each in their stowed positions to provide a first bale accumulating capacity and a first bale discharging capacity, and wherein the bale accumulator has a second lateral width dimension, longer than the first lateral width dimension, when the first extension table and the second extension table are each in their unstowed positions to provide a second bale accumulating capacity greater than the first bale accumulating capacity and a second bale discharging capacity greater than the first bale discharging capacity.

29. Agricultural bale accumulator, according to claim 27, wherein the first accumulator module and the second accumulator module further comprise the bale transfer module and the bale discharge module, respectively, wherein the first push mechanism of the bale transfer module is adapted move between the first position and the second position responsive to the first hydraulic fluid cylinder moving between the first position of the first hydraulic fluid cylinder and the second position of the first hydraulic fluid cylinder, respectively, and wherein the second push mechanism of the bale discharge module is adapted move along the bale discharge axis parallel to the bale receiving axis between the bale accumulating position and the bale discharging position responsive to the second hydraulic fluid cylinder moving between the first position of the second hydraulic fluid cylinder and the second position of the second hydraulic fluid cylinder, respectively.

30. Agricultural bale accumulator comprising: a base module including:

a main frame positioned substantially horizontal to a ground surface; and a load bed, having a substantially planar bale receiving surface, mechanically coupled to and supported by the main frame, and adapted to receive thereon a plurality of bales, having either a medium size or a large size, having a rectangular shape, including a leading bale immediately followed by a trailing bale, successively ejected from a bale chamber of an agricultural baler along a bale receiving axis in a bale traveling direction, opposite to a direction of travel of the agricultural bale accumulator, towards a rear side of the agricultural bale accumulator to accumulate the plurality of bales on the load bed, wherein the load bed further comprises:

a center load bed adapted to successively receive thereon each bale of the plurality of bales ejected from the bale chamber of the agricultural baler and to accumulate thereon a first bale of the plurality of bales;

a right load bed, located adjacent to a right side of the center load bed, adapted to receive thereon a bale of the plurality of bales from the center load bed and to accumulate thereon a second bale of the plurality of bales; and a left load bed, located adjacent to a left side, opposite to the right side, of the center load bed, adapted to receive thereon a bale of the plurality of bales from the center load bed and to accumulate thereon a third bale of the plurality of bales;

a bale transfer module adapted to alternately transfer each of the plurality of bales, received by and accumulated on the center load bed, across the load bed to the right load bed and to the left load bed along a bale transfer axis transverse to the bale receiving axis responsive to thea bale transfer signal to accumulate the plurality of bales on at least one of the center load bed, the right load bed, and the left load bed in a side-by-side relationship, wherein the bale transfer module further comprises:

a first push mechanism extending above the bale receiving surface of the load bed and having a longitudinal axis disposed substantially parallel to the bale receiving axis, wherein the first push mechanism is adapted move between a first position and a second position, wherein the first push mechanism is in the first position when the first push mechanism is located at a right side of the center load, wherein the first push mechanism is in the second position when the first push mechanism is located at a left side of the center load bed, wherein the first push mechanism is adapted to push a bale from the center load bed to the left load bed along the bale transfer axis responsive to the first push mechanism moving from the first position to the second position, and wherein the first push mechanism is adapted to push a bale from the center toad bed to the right load bed along the bale transfer axis responsive to the first push mechanism moving from the second position to the first position; and a bale discharge module adapted to move between the bale accumulating position and the bale discharging position responsive to a bale discharge signal to discharge at least one of the plurality of bales accumulated on the load bed to the ground surface, wherein the agricultural bale accumulator is adapted to accumulate at least one of the plurality of bales on the load bed when the bale discharge module is located in the bale accumulating position, and wherein the agricultural bale accumulator is adapted to discharge at least one of the plurality of bales accumulated on the load bed to the ground surface when the bale discharge module is moved from the bale accumulating position to the bale discharging position, wherein the bale discharge module further comprises:

a second push mechanism extending above the bale receiving surface of the load bed and having a longitudinal axis disposed substantially transverse to the bale receiving axis, wherein the second push mechanism is adapted move along a bale discharge axis parallel to the bale receiving axis between the bale accumulating position and the bale discharging position, wherein the second push mechanism is in the bale accumulating position when the second push mechanism is located near a front side of the load bed, wherein the second push mechanism is in the bale discharging position when the second push mechanism is moved towards thea rear side of the load bed;

a bale position sensing module adapted to generate at least one bale position signal responsive to determining a position of at least one bale received and accumulated on at least one of the center load bed, the right load bed, and the left load bed; and a controller adapted to control at least one of the bale transfer module and the bale discharge module responsive to the bale transfer signal and the bale discharge signal, respectively, wherein each of the bale transfer signal and the bale discharge signal is represented by at least one of one of the at least one bale position signal and an operator control signal.

31. Agricultural bale accumulator, according to claim 30, further comprising:

a hitch assembly mechanically coupled to the main frame and adapted to mechanically couple and decouple a front side of the main frame to a mating hitch assembly on a rear side of the agricultural baler to permit the agricultural bale accumulator to be towed by the agricultural baler; and first and second pairs of castor wheels mechanically coupled to the main frame at first and second locations, respectively, and adapted to pivot about first and second substantially vertical axes, respectively, wherein the first and second pair of castor wheels, having a common axis of rotation transverse to a longitudinal axis of the agricultural bale accumulator, support the agricultural bale accumulator from the ground surface to permit the agricultural bale accumulator to be transported across the ground surface in the direction of travel.

32. Agricultural bale accumulator, according to claim 30, further comprising:

a hydraulic fluid system including:

a hydraulic fluid valve including a first set of hydraulic fluid ports, a second set of hydraulic fluid ports, and a third set of hydraulic fluid ports, and adapted to selectively couple pressurized hydraulic fluid received by the first set of hydraulic fluid ports from a hydraulic fluid source to one of the second set of hydraulic fluid ports and the third set of hydraulic fluid ports;

a first set of hydraulic fluid lines adapted to be mechanically coupled to and in fluid communication with first set of hydraulic fluid ports to distribute the pressurized hydraulic fluid from the hydraulic fluid source to the first set of hydraulic fluid ports; p1 a first hydraulic fluid cylinder mechanically coupled to and in fluid communication with the second set of hydraulic fluid ports, and adapted to move between a first position of the first hydraulic fluid cylinder and a second position of the first hydraulic fluid cylinder responsive to receiving the pressurized hydraulic fluid from the second set of hydraulic fluid ports;

a second set of hydraulic fluid lines adapted to be mechanically coupled to and in fluid communication with the second set of hydraulic fluid ports to distribute the pressurized hydraulic fluid from the second set of hydraulic fluid ports to the first hydraulic fluid cylinder;

a second hydraulic fluid cylinder mechanically coupled to and in fluid communication with the third set of hydraulic fluid ports, and adapted to move between a first position of the second hydraulic fluid cylinder and a second position of the second hydraulic fluid cylinder responsive to receiving the pressurized hydraulic fluid from the third set of hydraulic fluid ports; and a third set of hydraulic fluid lines adapted to be mechanically coupled to and in fluid communication with the third set of hydraulic fluid ports to distribute the pressurized hydraulic fluid from the third set of hydraulic fluid ports to the second hydraulic fluid cylinder;

a first accumulator module including a first mechanical part adapted to perform a first mechanical function and adapted to move between a first position of the first mechanical part and a second position of the first mechanical part responsive to the first hydraulic fluid cylinder moving between the first position of the first hydraulic fluid cylinder and the second position of the first hydraulic fluid cylinder, respectively, and a second accumulator module including a second mechanical part adapted to perform a second mechanical function, different from the first function, and adapted to move between a first position of the second mechanical part and a second position of the second mechanical part responsive to the second hydraulic fluid cylinder moving between the first position of the second hydraulic fluid cylinder and the second position of the second hydraulic fluid cylinder, respectively.

33. Agricultural bale accumulator, according to claim 32, wherein the controller is adapted to cause the hydraulic fluid valve to selectively couple the pressurized hydraulic fluid from the first set of hydraulic fluid ports to one of the second set of hydraulic fluid ports and the third set of hydraulic fluid ports.

34. Agricultural bale accumulator, according to claim 33, further comprising:

an operator control console adapted to be electrically coupled to the controller to permit an operator generate an operator control signal to cause the controller to selectively couple the pressurized hydraulic fluid from the first set of hydraulic fluid ports to one of the second set of hydraulic fluid ports and the third set of hydraulic fluid ports.

35. Agricultural bale accumulator, according to claim 33, wherein the first accumulator module and the second accumulator module further comprise:

two different corresponding modules selected from the following modules:
a bale movement module;
a load bed extension module;
the bale transfer module; and
the bale discharge module.

36. Agricultural bale accumulator, according to claim 35, wherein the load bed extension module further comprises:

a first extension table, having a substantially planar bale receiving surface, adapted to receive thereon a bale of the plurality of bales from the right load bed and to accumulate thereon a fourth bale of the plurality of bales;

a first attachment mechanism adapted to connect the first extension table to a right side of the right load bed to permit the first extension table to be moveable relative to the right load bed between a stowed position and an unstowed position, wherein the first extension table is disposed substantially co-planar with the right load bed and adjacent to the right side of the right load bed when the first extension table is in the unstowed position to permit the first extension table to accumulate thereon the fourth bale, and wherein the first extension table is prevented from accumulating thereon the fourth bale when the first extension table is in the stowed position;

a second extension table, having a substantially planar bale receiving surface, adapted to receive thereon a bale of the plurality of bales from the left load bed and to accumulate thereon a fifth bale of the plurality of bales; and a second attachment mechanism adapted to connect the second extension table to a left side of the left load bed to permit the second extension table to be moveable relative to the left load bed between a stowed position and an unstowed position, wherein the second extension table is disposed substantially co-planar with the left load bed and adjacent to the left side of the left load bed when the second extension table is in the unstowed position to permit the second extension table to accumulate thereon the fifth bale, wherein the second extension table is prevented from accumulating thereon the fifth bale when the second extension table is in the stowed position;

wherein the bale accumulator has a first lateral width dimension when the first extension table and the second extension table are each in their stowed positions to provide a first bale accumulating capacity and a first bale discharging capacity, and wherein the bale accumulator has a second lateral width dimension, longer than the first lateral width dimension, when the first extension table and the second extension table are each in their unstowed positions to provide a second bale accumulating capacity greater than the first bale accumulating capacity and a second bale discharging capacity greater than the first bale discharging capacity.

37. Agricultural bale accumulator, according to claim 35, wherein the first accumulator module and the second accumulator module further comprise the bale transfer module and the bale discharge module, respectively, wherein the first push mechanism of the bale transfer module is adapted move between the first position and the second position responsive to the first hydraulic fluid cylinder moving between the first position of the first hydraulic fluid cylinder and the second position of the first hydraulic fluid cylinder, respectively, and wherein the second push mechanism of the bale discharge module is adapted move along the bale discharge axis parallel to the bale receiving axis between the bale accumulating position and the bale discharging position responsive to the second hydraulic fluid cylinder moving between the first position of the second hydraulic fluid cylinder and the second position of the second hydraulic fluid cylinder, respectively.

38. Agricultural bale equipment comprising: an agricultural baler including:

a baler hydraulic fluid distribution system, including a first set of baler hydraulic fluid distribution paths, a second set of baler hydraulic fluid distribution paths, and a third set of baler hydraulic fluid distribution paths, mechanically coupled to and in fluid communication with a hydraulic fluid source providing hydraulic fluid;

a baler hydraulic cylinder mechanically coupled to and in fluid communication with the third set of baler hydraulic fluid distribution paths, and adapted to operate a baler module of the agricultural baler;

a rear baler interface including:
a rear baler hitch;
a rear baler hydraulic interface, including a first set of rear baler hydraulic fluid ports and a second set of rear baler hydraulic fluid ports, and adapted to be mechanically coupled to and in fluid communication with the first set of baler hydraulic fluid distribution paths and the second set of baler hydraulic fluid distribution paths, respectively; and an agricultural bale accumulator including:
an accumulator interface including:
an accumulator hitch adapted to be mechanically coupled to the rear baler hitch to permit the agricultural bale accumulator to be towed by the agricultural baler; and
an accumulator hydraulic fluid interface, including a first set of accumulator hydraulic fluid ports and a second set of accumulator hydraulic fluid parts, and adapted to be mechanically coupled to and in fluid communication with the first set of rear baler hydraulic fluid ports and the second set of rear baler hydraulic fluid ports, respectively;

a load bed, having a substantially planar bale receiving surface, adapted to receive thereon a plurality of bales, having either a medium size or a large size, having a rectangular shape, including a leading bale immediately followed by a trailing bale, successively ejected from a bale chamber of the agricultural baler along a bale receiving axis in a bale traveling direction, opposite to a direction of travel of the agricultural bale accumulator, towards a rear side of the agricultural bale accumulator to accumulate the plurality of bales on the load bed, wherein the load bed further includes:

a center load bed adapted to successively receive thereon each bale of the plurality of bales ejected from the bale chamber of the agricultural baler and to accumulate thereon a first bale of the plurality of bales;

a right load bed, located adjacent to a right side of the center load bed, adapted to receive thereon a bale of the plurality of bales from the center load bed and to accumulate thereon a second bale of the plurality of bales; and a left load bed, located adjacent to a left side, opposite to the right side, of the center load bed, adapted to receive thereon a bale of the plurality of bales from the center load bed and to accumulate thereon a third bale of the plurality of bales;

an accumulator hydraulic fluid distribution system, including a first set of accumulator hydraulic fluid distribution paths and a second set of accumulator hydraulic fluid distribution paths, and adapted to be mechanically coupled to and in fluid communication with the first set of accumulator hydraulic fluid ports and the second set of accumulator hydraulic fluid ports, respectively;

a first accumulator hydraulic fluid cylinder adapted to be mechanically coupled to and in fluid communication with the first set of accumulator hydraulic fluid distribution paths, and adapted to move between a first position of the first accumulator hydraulic fluid cylinder and a second position of the first accumulator hydraulic fluid cylinder responsive to pressure exerted by the hydraulic fluid;

a first accumulator module including a first accumulator mechanical part adapted to move between a first position of the first accumulator mechanical part and a second position of the first accumulator mechanical part responsive to the first accumulator hydraulic fluid cylinder moving between the first position of the first accumulator hydraulic fluid cylinder and the second position of the first accumulator hydraulic fluid cylinder, respectively;

a second accumulator hydraulic fluid cylinder adapted to be mechanically coupled to and in fluid communication with the first set of accumulator hydraulic fluid distribution paths, and adapted to move between a first position of the second accumulator hydraulic fluid cylinder and a second position of the second accumulator hydraulic fluid cylinder responsive to pressure exerted by the hydraulic fluid;

a second accumulator module including a second accumulator mechanical part adapted to move between a first position of the second accumulator mechanical part and a second position of the second accumulator mechanical part responsive to the second accumulator hydraulic cylinder moving between the first position of the second accumulator hydraulic fluid cylinder and the second position of the second accumulator hydraulic fluid cylinder, respectively;

a third accumulator hydraulic fluid cylinder adapted to be mechanically coupled to and in fluid communication with the second set of accumulator hydraulic fluid distribution paths, and adapted to move between a first position of the third accumulator hydraulic fluid cylinder and a second position of the third accumulator hydraulic fluid cylinder;

a third accumulator module including a third accumulator mechanical part adapted to move between a first position of the third accumulator mechanical part and a second position of the third accumulator mechanical part responsive to the third accumulator hydraulic fluid cylinder moving between the first position of the third accumulator hydraulic fluid cylinder and the second position of the third accumulator hydraulic fluid cylinder, respectively;

an electrical switch adapted to generate a first electrical control signal and a second electrical control signal when the electrical switch is in a first switch position and a second switch position, respectively, responsive to receiving an operational control signal; and a hydraulic fluid valve mechanically coupled to and in fluid communication with the accumulator hydraulic fluid distribution system, and adapted to selectively couple the hydraulic fluid from the first set of hydraulic fluid distribution paths to the first hydraulic fluid cylinder, at a first time, and to the second hydraulic fluid cylinder, at a second time, different from the first time, responsive to receiving the first electrical control signal and the second electrical control signal, respectively.

39. Agricultural bale equipment, according to claim 38, further comprising:
an agricultural tractor including:
a tractor hitch; and
a tractor hydraulic fluid system including:
the hydraulic fluid source adapted to provide the hydraulic fluid; and
a tractor hydraulic interface, including a first set of tractor hydraulic fluid ports, a second set of tractor hydraulic fluid ports, and a third set of tractor hydraulic fluid ports, and adapted to be mechanically coupled to and in fluid communication with the hydraulic fluid source; and wherein the agricultural baler further comprises:
a front baler interface including:
a front baler hitch adapted to be mechanically coupled to the tractor hitch to permit the agricultural baler to be towed by the agricultural tractor; and
a front baler hydraulic fluid interface, including a first set of front baler hydraulic fluid ports, a second set of front baler hydraulic fluid ports, and a third set of front baler hydraulic fluid ports, adapted to be mechanically coupled to and in fluid communication with the first set of tractor hydraulic fluid ports, the second set of tractor hydraulic fluid ports, and the third set of tractor hydraulic fluid ports, respectively, and adapted to be mechanically coupled to and in fluid communication with the first set of baler hydraulic fluid distribution paths, the second set of baler hydraulic fluid distribution paths, and the third set of baler hydraulic fluid distribution paths.

40. Agricultural bale equipment, according to claim 38, wherein the first equipment module, the second equipment module, and the third equipment module of the agricultural bale accumulator further comprise:
three different corresponding modules selected from the following modules:
a bale movement module;
a bale transfer module;
a load bed extension module; and
a bale discharge module.

41. Agricultural bale accumulator comprising: a load bed, having a substantially planar bale receiving surface, adapted to receive thereon a plurality of bales, having either a medium size or a large size, having a rectangular shape, including a leading bale immediately followed by a trailing bale, successively ejected from a bale chamber of an agricultural baler along a bale receiving axis in a bale traveling direction, opposite to a direction of travel of the agricultural bale accumulator, towards a rear side of the agricultural bale accumulator to accumulate the plurality of bales on the load bed, wherein the load bed further includes:
a center load bed adapted to successively receive thereon each bale of the plurality of bales ejected from the bale chamber of the agricultural baler and to accumulate thereon a first bale of the plurality of bales;
a right load bed, located adjacent to a right side of the center load bed, adapted to receive thereon a bale of the plurality of bales from the center load bed and to accumulate thereon a second bale of the plurality of bales; and
a left load bed, located adjacent to a left side, opposite to the right side, of the center load bed, adapted to receive thereon a bale of the plurality of bales from the center load bed and to accumulate thereon a third bale of the plurality of bales;
a hydraulic fluid valve including a first hydraulic fluid distribution path, a. second hydraulic fluid distribution path, and a third hydraulic fluid distribution path, and adapted to selectively couple pressurized hydraulic fluid received by the first hydraulic fluid distribution path from a hydraulic fluid source to one of the second hydraulic fluid distribution path and the third hydraulic fluid distribution path;

a first accumulator module adapted to perform a first mechanical function at a first time responsive to receiving a first force generated by the pressurized hydraulic fluid from the second hydraulic fluid distribution path; and a second accumulator module adapted to perform a second mechanical function, different from the first function, at a second time, different from the first time, responsive to receiving a second force generated by the pressurized hydraulic fluid from the third hydraulic fluid distribution path.

42. Agricultural bale accumulator according to claim 41, further comprising:

at least a first hydraulic fluid line adapted to be mechanically coupled to and in fluid communication with the first hydraulic fluid distribution path to distribute the pressurized hydraulic fluid from the hydraulic fluid source to the first hydraulic fluid distribution path.

43. Agricultural bale accumulator according to claim 41, further comprising:

a first hydraulic fluid cylinder mechanically coupled to and in fluid communication with the second hydraulic fluid distribution path, and adapted to move between a first position of the first hydraulic fluid cylinder and a second position of the first hydraulic fluid cylinder responsive to receiving the pressurized hydraulic fluid from the second hydraulic fluid distribution path to generate the first force; and a second hydraulic fluid cylinder mechanically coupled to and in fluid communication with the at least the third hydraulic fluid distribution path, and adapted to move between a first position of the second hydraulic fluid cylinder and a second position of the second hydraulic fluid cylinder responsive to receiving the pressurized hydraulic fluid from the third hydraulic fluid distribution path to generate the second force.

44. Agricultural bale accumulator according to claim 43, further comprising: at least a second hydraulic fluid lines adapted to be mechanically coupled to and in fluid communication with the second hydraulic fluid distribution path to distribute the pressurized hydraulic fluid from the second hydraulic fluid distribution path to the first hydraulic fluid cylinder; and at least a third hydraulic fluid lines adapted to be mechanically coupled to and in fluid communication with the third hydraulic fluid distribution path to distribute the pressurized hydraulic fluid from the third hydraulic fluid distribution path to the second hydraulic fluid cylinder.

45. Agricultural bale accumulator according to claim 43, wherein the first accumulator module includes a first mechanical part adapted to move between a first position of the first mechanical part and a second position of the first mechanical part responsive to the first hydraulic fluid cylinder moving between the first position of the first hydraulic fluid cylinder and the second position of the first hydraulic fluid cylinder, respectively, and wherein the second accumulator module includes a second mechanical part adapted to move between a first position of the second mechanical part and a second position of the second mechanical part responsive to the second hydraulic fluid cylinder moving between the first position of the second hydraulic fluid cylinder and the second position of the second hydraulic fluid cylinder, respectively.

46. Agricultural bale accumulator according to claim 43, further comprising:

an electrical switch adapted to generate a first electrical control signal and a second electrical control signal when the electrical switch is in a first switch position and a second switch position, respectively, responsive to receiving a control signal, wherein the hydraulic fluid valve is adapted to selectively couple the pressurized hydraulic fluid received by the first hydraulic fluid distribution path from the hydraulic fluid source to one of the second hydraulic fluid distribution path and the third hydraulic fluid distribution path responsive to the first electrical control signal and the second electrical control signal, respectively.

47. Agricultural bale accumulator according to claim 43, further comprising:

a controller adapted to cause the hydraulic fluid valve to selectively couple the pressurized hydraulic fluid from the first hydraulic fluid distribution path to one of the second hydraulic fluid distribution path and the third hydraulic fluid distribution path.

48. Agricultural bale accumulator according to claim 47, further comprising:

an operator control console adapted to be electrically coupled to the controller to permit an operator to generate at least one operator control signal causing the controller to selectively couple the pressurized hydraulic fluid from the first hydraulic fluid distribution path to one of the second hydraulic fluid distribution path and the third hydraulic fluid distribution path.

49. Agricultural bale accumulator according to claim 41, further comprising:

an electrical switch adapted to generate a first electrical control signal and a second electrical control signal when the electrical switch is in a first switch position and a second switch position, respectively, responsive to receiving a control signal, wherein the hydraulic fluid valve is adapted to selectively couple the pressurized hydraulic fluid received by the first hydraulic fluid distribution path from the hydraulic fluid source to one of the second hydraulic fluid distribution path and the third hydraulic fluid distribution path responsive to the first electrical control signal and the second electrical control signal, respectively.

50. Agricultural bale accumulator according to claim 41, further comprising:

a controller adapted to cause the first force and the second force to be generated responsive to receiving at least one control signal.

51. Agricultural bale accumulator according to claim 50, further comprising: p1 an operator control console adapted to be electrically coupled to the controller to permit an operator to generate the at least one control signal.

52. Agricultural bale accumulator according to claim 41, further comprising:

a base module including:

a main frame positioned substantially horizontal to a ground surface;

a hitch assembly mechanically couple and decouple a front side of the main frame to a mating hitch assembly on a rear side of the agricultural baler to permit the agricultural bale accumulator to be towed by the agricultural baler.

53. Agricultural bale accumulator according to claim 52, wherein the base module further includes: first and second pairs of castor wheels mechanically coupled to the main frame at first and second locations, respectively, and adapted to pivot about first and second vertical axes, respectively, wherein the first and second pair of castor wheels, having a common axis of rotation transverse to a longitudinal axis of the agricultural bale accumulator, support the agricultural bale accumulator from the ground surface to permit the agricultural bale accumulator to be transported across the ground surface in the direction of travel.

54. Agricultural bale accumulator according to claim 41, wherein the first accumulator module and the second accumulator module further compnse:

a bale transfer module and a bale discharge module, respectively, wherein the bale transfer module is adapted to alternately transfer each of the plurality of bales, received by and accumulated on the center load bed, across the load bed to the right load bed and to the left load bed along a bale transfer axis transverse to the bale receiving axis responsive to the bale transfer signal to accumulate the plurality of bales on at least one of the center load bed, the right load bed, and the left load bed in a side-by-side relationship, wherein the bale transfer module further comprises:

a first push mechanism extending above the bale receiving surface of the load bed and having a longitudinal axis disposed substantially parallel to the bale receiving axis, wherein the first push mechanism is adapted move between a first position and a second position, wherein the first push mechanism is in the first position when the first push mechanism is located at a right side of the center load, wherein the first push mechanism is in the second position when the first push mechanism is located at a left side of the center load bed, wherein the first push mechanism is adapted to push a bale from the center load bed to the left load bed along the bale transfer axis responsive to the first push mechanism moving from the first position to the second position, and wherein the first push mechanism is adapted to push a bale from the center load bed to the right load bed along the bale transfer axis responsive to the first push mechanism moving from the second position to the first position; and wherein the bale discharge module is adapted to move between the bale accumulating position and the bale discharging position responsive to the bale discharge signal to discharge at least one of the plurality of bales accumulated on the load bed to a ground surface, wherein the agricultural bale accumulator is adapted to accumulate at least one of the plurality of bales on the load bed when the bale discharge module is located in the bale accumulating position, and wherein the agricultural bale accumulator is adapted to discharge at least one of the plurality of bales accumulated on the load bed to the ground surface when the bale discharge module is moved from the bale accumulating position to the bale discharging position, wherein .the bale discharge module further comprises:

a second push mechanism extending above the bale receiving surface of the load bed and having a longitudinal axis disposed substantially transverse to the bale receiving axis, wherein the second push mechanism is adapted move along a bale discharge axis parallel to the bale receiving axis between the bale accumulating position and the bale discharging position, wherein the second push mechanism is in the bale accumulating position when the second push mechanism is located near a front side of the load bed, and wherein the second push mechanism is in the bale discharging position when the second push mechanism is moved towards the rear side of the load bed.

55. Agricultural bale accumulator according to claim 41, wherein the first accumulator module and the second accumulator module further comprise:

two different corresponding modules selected from the following modules:
a bale movement module;
a load bed extension module;
a bale transfer module; and
a bale discharge module.

56. Agricultural bale accumulator according to claim 55, wherein the load bed extension module, when included with the agricultural bale accumulator, further includes:

a first extension table, having a substantially planar bale receiving surface, adapted to receive thereon a bale of the plurality of bales from the right load bed and to accumulate thereon a fourth bale of the plurality of bales;

a first attachment mechanism adapted to connect the first extension table to a right side of the right load bed to permit the first extension table to be moveable relative to the right load bed between a stowed position and an unstowed position, wherein the first extension table is disposed substantially co-planar with the right load bed and adjacent to the right side of the right load bed when the first extension table is in the unstowed position to permit the first extension table to accumulate thereon the fourth bale, and wherein the first extension table is prevented from accumulating thereon the fourth bale when the first extension table is in the. stowed position;

a second extension table, having a substantially planar bale receiving surface, adapted to receive thereon a bale of the plurality of bales from the left load bed and to accumulate thereon a fifth bale of the plurality of bales; and a second attachment mechanism adapted to connect the second extension table to a left side of the left load bed to permit the second extension table to be moveable relative to the left load bed between a stowed position and an unstowed position, wherein the second extension table is disposed substantially co-planar with the left load bed and adjacent to the left side of the left load bed when the second extension table is in the unstowed position to permit the second extension table to accumulate thereon the fifth bale, wherein the second extension table is prevented from accumulating thereon the fifth bale when the second extension table is in the stowed position;

wherein the bale accumulator has a first lateral width dimension when the first extension table and the second extension table are each in their stowed positions to provide a first bale accumulating capacity and a first bale discharging capacity, and wherein the bale accumulator has a second lateral width dimension, longer than the first lateral width dimension, when the first extension table and the second extension table are each in their unstowed positions to provide a second bale accumulating capacity greater than the first bale accumulating capacity and a second bale discharging capacity greater than the first bale discharging capacity, wherein the bale transfer module, when included with the agricultural bale accumulator, is adapted to alternately transfer each of the plurality of bales, received by and accumulated on the center load bed, across the load bed to the right load bed and to the left load bed along a bale transfer axis transverse to the bale receiving axis responsive to a bale transfer signal to accumulate the plurality of bales on at least one of the center load bed, the right load bed, the left load bed, first extension table, and the second extension table in a side-by-side relationship, and wherein the bale discharge module, when included with the agricultural bale accumulator, is adapted to move between the bale accumulating position and the bale discharging position responsive to a bale discharge signal to discharge at least one of the plurality of bales accumulated on at least one of the load bed and the load bed extension module to a ground surface, wherein the agricultural bale accumulator is adapted to accumulate at least one of the plurality of bales on at least one of the load bed and the load bed extension module when the bale discharge module is located in the bale accumulating position, and wherein the agricultural bale accumulator is adapted to discharge at least one of the plurality of bales accumulated on at least one of the load bed and the load bed extension module to the ground surface when the bale discharge module is moved from the bale accumulating position to the bale discharging position.

57. Agricultural bale accumulator according to claim 56, wherein the bale transfer module further comprises:

a first push mechanism extending above the bale receiving surface of the load bed and having a longitudinal axis disposed substantially parallel to the bale receiving axis, wherein the first push mechanism is adapted move between a first position and a second position, wherein the first push mechanism is in the first position when the first push mechanism ar is located at a right side of the center load, wherein the first push mechanism is in the second position when the first push mechanism is located at a left side of the center load bed, wherein the first push mechanism is adapted to push a bale from the center load bed to the left load bed along the bale transfer axis responsive to the first push mechanism moving from the first position to the second position, and wherein the first push mechanism is adapted to push a bale from the center load bed to the right load bed along the bale transfer axis responsive to the first push mechanism moving from the second position to the first position, and wherein the bale discharge module further comprises:

a second push mechanism extending above the bale receiving surface of the load bed and having a longitudinal axis disposed substantially transverse to the bale receiving axis, wherein the second push mechanism is adapted move along a bale discharge axis parallel to the bale receiving axis between the bale accumulating position and the bale discharging position, wherein the second push mechanism is in the bale accumulating position when the second push mechanism is located near a front side of the load bed, and wherein the second push mechanism is in the bale discharging position when the second push mechanism is moved towards thea rear side of the load bed.

58. Agricultural bale accumulator according to claim 41, wherein the first accumulator module and the second accumulator module further comprise:

a bale transfer module and a bale discharge module, respectively, wherein the bale transfer module is adapted to alternately transfer each of the plurality of bales, received by and accumulated on the center load bed, across the load bed to the right load bed and to the left load bed along a bale transfer axis transverse to the bale receiving axis responsive to the bale transfer signal to accumulate the plurality of bales on at least one of the center load bed, the right load bed, and the left load bed in a side-by-side relationship, wherein the bale transfer module further comprises:

a first push mechanism extending above the bale receiving surface of the load bed and having a longitudinal axis disposed substantially parallel to the bale receiving axis, wherein the first push mechanism is adapted move between a first position and a second position, wherein the first push mechanism is in the first position when the first push mechanism is located at a right side of the center load, wherein the first push mechanism is in the second position when the first push mechanism is located at a left side of the center load bed, wherein the first push mechanism is adapted to push a bale from the center load bed to the left load bed along the bale transfer axis responsive to the first push mechanism moving from the first position to the second position, and wherein the first push mechanism is adapted to push a bale from the center load bed to the right load bed along the bale transfer axis responsive to the first push mechanism moving from the second position to the first position; and wherein the bale discharge module is adapted to move between the bale accumulating position and the bale discharging position responsive to the bale discharge signal to discharge at least one of the plurality of bales accumulated on the load bed to a ground surface, wherein the agricultural bale accumulator is adapted to accumulate at least one of the plurality of bales on the load bed when the bale discharge module is located in the bale accumulating position, and wherein the agricultural bale accumulator is adapted to discharge at least one of the plurality of bales accumulated on the load bed to the ground surface when the bale discharge module is moved from the bale accumulating position to the bale discharging position, wherein the bale discharge module further comprises:

at least a portion of the load bed pivotally connected to a main frame about a pivot point disposed on a horizontal pivot axis and moveable relative to the main frame between the bale accumulating position and the bale discharging position, wherein the at least a portion of the load bed is in a horizontal position relative to the main frame when the at least a portion of the load bed is in the bale accumulating position to permit the at least a portion of the load bed to accumulate thereon the plurality of bales, and wherein the at least a portion of the load bed is in an inclined position relative to the main frame when the at least a portion of the load bed is in the bale discharging position to permit the at least a portion of the load bed to discharge the plurality of bales accumulated thereon to the ground surface.

59. Agricultural bale accumulator according to claim 56, further comprising:

a bale position sensing module adapted to generate at least one bale position signal responsive to determining a position of at least one bale received and accumulated on at least one of the center load bed, the right load bed, the left load bed, the first extension table, and the second extension table.

60. Agricultural bale accumulator comprising: a load bed, having a substantially planar bale receiving surface, adapted to receive thereon a plurality of bales, having either a medium size or a large size, having a rectangular shape, including a leading bale immediately followed by a trailing bale, successively ejected from a bale chamber of an agricultural baler along a bale receiving axis in a bale traveling direction, opposite to a direction of travel of the agricultural bale accumulator, towards a rear side of the agricultural bale accumulator to accumulate the plurality of bales on the load bed, wherein the load bed further includes:
- a center load bed adapted to successively receive thereon each bale of the plurality of bales ejected from the bale chamber of the agricultural baler and to accumulate thereon a first bale of the plurality of bales;
- a right load bed, located adjacent to a right side of the center load bed, adapted to receive thereon a bale of the plurality of bales from the center load bed and to accumulate thereon a second bale of the plurality of bales; and
- a left load bed, located adjacent to a left side, opposite to the right side, of the center load bed, adapted to receive thereon a bale of the plurality of bales from the center load bed and to accumulate thereon a third bale of the plurality of bales;
- a hydraulic fluid system including:
  - a hydraulic fluid valve including a first set of hydraulic fluid ports, a second set of hydraulic fluid ports, and a third set of hydraulic fluid ports, and adapted to selectively couple pressurized hydraulic fluid received by the first set of hydraulic fluid ports from a hydraulic fluid source to one of the second set of hydraulic fluid ports and the third set of hydraulic fluid ports;
  - a first hydraulic fluid cylinder mechanically coupled to and in fluid communication with the second set of hydraulic fluid ports, and adapted to move between a first position of the first hydraulic fluid cylinder and a second position of the first hydraulic fluid cylinder responsive to receiving the pressurized hydraulic fluid from the second set of hydraulic fluid ports;
  - a second hydraulic fluid cylinder mechanically coupled to and in fluid communication with the third set of hydraulic fluid ports, and adapted to move between a first position of the second hydraulic fluid cylinder and a second position of the second hydraulic fluid cylinder responsive to receiving the pressurized hydraulic fluid from the third set of hydraulic fluid ports; and
  - a controller adapted to cause the hydraulic fluid valve to selectively couple the pressurized hydraulic fluid from the first set of hydraulic fluid ports to one of the second set of hydraulic fluid ports and the third set of hydraulic fluid ports;
- a first accumulator module including a first mechanical part adapted to perform a first mechanical function and adapted to move between a first position of the first mechanical part and a second position of the first mechanical part responsive to the first hydraulic fluid cylinder moving between the first position of the first hydraulic fluid cylinder and the second position of the first hydraulic fluid cylinder, respectively, and
- a second accumulator module including a second mechanical part adapted to perform a second mechanical function, different from the first function, and adapted to move between a first position of the second mechanical part and a second position of the second mechanical part responsive to the second hydraulic fluid cylinder moving between the first position of the second hydraulic fluid cylinder and the second position of the second hydraulic fluid cylinder, respectively.

61. Agricultural bale accumulator according to claim 60, further comprising: a first set of hydraulic fluid lines adapted to be mechanically coupled to and in fluid communication with first set of hydraulic fluid ports to distribute the pressurized hydraulic fluid from the hydraulic fluid source to the first set of hydraulic fluid ports; a second set of hydraulic fluid lines adapted to be mechanically coupled to and in fluid communication with the second set of hydraulic fluid ports to distribute the pressurized hydraulic fluid from the second set of hydraulic fluid ports to the first hydraulic fluid cylinder; and a third set of hydraulic fluid lines adapted to be mechanically coupled to and in fluid communication with the third set of hydraulic fluid ports to distribute the pressurized hydraulic fluid from the third set of hydraulic fluid ports to the second hydraulic fluid cylinder.

62. Agricultural bale accumulator according to claim 60, further comprising: an operator control console adapted to be electrically coupled to the controller to permit an operator generate an operator control signal to cause the controller to selectively couple the pressurized hydraulic fluid from the first set of hydraulic fluid ports to one of the second set of hydraulic fluid ports and the third set of hydraulic fluid ports.

63. Agricultural bale accumulator according to claim 60, further comprising:
- a base module including:
  - a main frame positioned substantially horizontal to a ground surface;
  - a hitch assembly mechanically coupled to the main frame and adapted to mechanically couple and decouple a front side of the main frame to a mating hitch assembly on a rear side of the agricultural baler to permit the agricultural bale accumulator to be towed by the agricultural baler.

64. Agricultural bale accumulator according to claim 63, wherein the base module further comprises: first and second pairs of castor wheels mechanically coupled to the main frame at first and second locations, respectively, and adapted to pivot about first and second vertical axes, respectively, wherein the first and second pair of castor wheels, having a common axis of rotation transverse to a longitudinal axis of the agricultural bale accumulator, support the agricultural bale accumulator from the ground surface to permit the agricultural bale accumulator to be transported across the ground surface in the direction of travel.

65. Agricultural bale accumulator according to claim 60, wherein the first accumulator module and the second accumulator module further comprises: a bale transfer module and a bale discharge module, respectively, wherein the bale transfer module is adapted to alternately transfer each of the plurality of bales, received by and accumulated on the center load bed, across the load bed to the right load bed and to the left load bed along a bale transfer axis transverse to the bale receiving axis responsive to a bale transfer signal to accumulate the plurality of bales on at least one of the center load bed, the right load bed, and the left load bed in a side-by-side relationship, wherein the bale transfer module further comprises: a first push mechanism extending above the bale receiving surface of the load bed and having a longitudinal axis disposed substantially parallel to the bale receiving axis, wherein the first push mechanism is adapted move between a first position and a second position responsive to the first hydraulic fluid cylinder moving between the first position of the first hydraulic fluid cylinder and the second position of the first hydraulic fluid cylinder, respectively, wherein the first push mechanism is in the first position when the first push mechanism is located at a right side of the center load, wherein the first push mechanism is in the second position when the first push mechanism is located at a left side of the center load bed, wherein the first push mechanism is adapted to push a bale from the center load bed to the left load bed along the bale transfer axis responsive to the first push mechanism moving from the first position to the second position, and wherein the first push mechanism is adapted to push a bale from the center load bed to the right load bed along the bale transfer axis responsive to the first push mechanism moving from the second position to the first position; and wherein the bale discharge module is adapted to move between the bale accumulating position and the bale discharging position responsive to thea bale discharge signal to discharge at least one of the plurality of bales accumulated on the load bed to a ground surface, wherein the agricultural bale accumulator is adapted to accumulate at least one of the plurality of bales on the load bed when the bale discharge module is located in the bale accumulating position, and wherein the agricultural bale accumulator is adapted to discharge at least one of the plurality of bales accumulated on the load bed to the ground surface when the bale discharge module is moved from the bale accumulating position to the bale discharging position, wherein the bale discharge module further comprises:

a second push mechanism extending above the bale receiving surface of the load bed and having a longitudinal axis disposed substantially transverse to the bale receiving axis, wherein the second push mechanism is adapted move along a bale discharge axis parallel to the bale receiving axis between the bale accumulating position and the bale discharging position responsive to the second hydraulic fluid cylinder moving between the first position of the second hydraulic fluid cylinder and the second position of the second hydraulic fluid cylinder, respectively, wherein the second push mechanism is in the bale accumulating position when the second push mechanism is located near a front side of the load bed, wherein the second push mechanism is in the bale discharging position when the second push mechanism is moved towards a rear side of the load bed.

66. Agricultural bale accumulator according to claim 60, wherein the first accumulator module and the second accumulator module further comprise:

two different corresponding modules selected from the following modules:
a bale movement module;
a load bed extension module;
a bale transfer module; and
a bale discharge module.

67. Agricultural bale accumulator according to claim 66, wherein the load bed extension module, when included with the agricultural bale accumulator, further includes:

a first extension table, having a substantially planar bale receiving surface, adapted to receive thereon a bale of the plurality of bales from the right load bed and to accumulate thereon a fourth bale of the plurality of bales;

a first attachment mechanism adapted to connect the first extension table to a right side of the right load bed to permit the first extension table to be moveable relative to the right load bed between a stowed position and an unstowed position, wherein the first extension table is disposed substantially co-planar with the right load bed and adjacent to the right side of the right load bed when the first extension table is in the unstowed position to permit the first extension table to accumulate thereon the fourth bale, and wherein the first extension table is prevented from accumulating thereon the fourth bale when the first extension table is in the stowed position;

a second extension table, having a substantially planar bale receiving surface, adapted to receive thereon a bale of the plurality of bales from the left load bed and to accumulate thereon a fifth bale of the plurality of bales; and a second attachment mechanism adapted to connect the second extension table to a left side of the left load bed to permit the second extension table to be moveable relative to the left load bed between a stowed position and an unstowed position, wherein the second extension table is disposed substantially co-planar with the left load bed and adjacent to the left side of the left load bed when the second extension table is in the unstowed position to permit the second extension table to accumulate thereon the fifth bale, wherein the second extension table is prevented from accumulating thereon the fifth bale when the second extension table is in the stowed position;

wherein the bale accumulator has a first lateral width dimension when the first extension table and the second extension table are each in their stowed positions to provide a first bale accumulating capacity and a first bale discharging capacity, and wherein the bale accumulator has a secondlateral width dimension, longer than the first lateral width dimension, when the first extension table and the second extension table are each in their unstowed positions to provide a second bale accumulating capacity greater than the first bale accumulating capacity and a second bale discharging capacity greater than the first bale discharging capacity, wherein the bale transfer module, when included with the agricultural bale accumulator, is adapted to alternately transfer each of the plurality of bales, received by and accumulated on the center load bed, across the load bed to the right load bed and to the left load bed along a bale transfer axis transverse to the bale receiving axis responsive to a bale transfer signal to accumulate the plurality of bales on at least one of the center load bed, the right load bed, the left load bed, the first extension table, and the second extension table in a side-by-side relationship, and wherein the bale discharge module, when included with the agricultural bale accumulator, is adapted to move between the bale accumulating position and the bale discharging position responsive to a bale discharge signal to discharge at least one of the plurality of bales accumulated on the load bed to a ground surface, wherein the agricultural bale accumulator is adapted to accumulate at least one of the plurality of bales on the load bed when the bale discharge module is located in the bale accumulating position, and wherein the agricultural bale accumulator is adapted to discharge at least one of the plurality of bales accumulated on the load bed to the ground surface when the bale discharge module is moved from the bale accumulating position to the bale discharging position.

68. Agricultural bale accumulator according to claim 67, wherein the bale transfer module further comprises: a first push mechanism extending above the bale receiving surface of the load bed and having a longitudinal axis disposed substantially parallel to the bale receiving axis, wherein the first push mechanism is adapted move between a first position and a second .position responsive to the first hydraulic fluid cylinder moving between the first position of the first hydraulic fluid cylinder and the second position of the first hydraulic fluid cylinder, respectively, wherein the first push mechanism is in the first position when the first push mechanism is located at a right side of the center load, wherein the first push mechanism is in the second position when the first push mechanism is located at a left side of the center load bed, wherein the first push mechanism is adapted to push a bale from the center load bed to the left load bed along the bale transfer axis responsive to the first push mechanism moving from the first position to the second position, and wherein the first push mechanism is adapted to push a bale from the center load bed to the right load bed along the bale transfer axis responsive to the first push mechanism moving from the second position to the first position, and wherein the bale discharge module further comprises:
a second push mechanism extending above the bale receiving surface of the load bed and having a longitudinal axis disposed substantially transverse to the bale receiving axis, wherein the second push mechanism is adapted move along a bale discharge axis parallel to the bale receiving axis between the bale accumulating position and the bale discharging position responsive to the second hydraulic fluid cylinder moving between the first position of the second hydraulic fluid cylinder and the second position of the second hydraulic fluid cylinder, respectively, wherein the second push mechanism is in the bale accumulating position when the second push mechanism is located near a front side of the load bed, wherein the second push mechanism is in the bale discharging position when the second push mechanism is moved towards a rear side of the load bed.

69. Agricultural bale accumulator according to claim 60, wherein the first accumulator module and the second accumulator module further comprise: a bale transfer module and a bale discharge module, respectively, wherein the bale transfer module is adapted to alternately transfer each of the plurality of bales, received by and accumulated on the center load bed, across the load bed to the right load bed and to the left load bed along a bale transfer axis transverse to the bale receiving axis responsive to a bale transfer signal to accumulate the plurality of bales on at least one of the center load bed, the right load bed, and the left load bed in a side-by-side relationship, wherein the bale transfer module further comprises:

a first push mechanism extending above the bale receiving surface of the load bed and having a longitudinal axis disposed substantially parallel to the bale receiving axis, wherein the first push mechanism is adapted move between a first position and a second position responsive to the first hydraulic fluid cylinder moving between the first position of the first hydraulic fluid cylinder and the second position of the first hydraulic fluid cylinder, respectively, wherein the first push mechanism is in the first position when the first push mechanism is located at a right side of the center load, wherein the first push mechanism is in the second position when the first push mechanism is located at a left side of the center load bed, wherein the first push mechanism is adapted to push a bale from the center load bed to the left load bed along the bale transfer axis responsive to the first push mechanism moving from the first position to the second position, and wherein the first push mechanism is adapted to push a bale from the center load bed to the right load bed along the bale transfer axis responsive to the first push mechanism moving from the second position to the first position; and wherein the bale discharge module is adapted to move between the bale accumulating position and the bale discharging position responsive to thea bale discharge signal to discharge at least one of the plurality of bales accumulated on the load bed to a ground surface, wherein the agricultural bale accumulator is adapted to accumulate at least one of the plurality of bales on the load bed when the bale discharge module is located in the bale accumulating position, and wherein the agricultural bale accumulator is adapted to discharge at least one of the plurality of bales accumulated on the load bed to the ground surface when the bale discharge module is moved from the bale accumulating position to the bale discharging position, wherein the bale discharge module further comprises:

at least a portion of the load bed pivotally connected to a main frame about a pivot point disposed on a horizontal pivot axis and moveable relative to the main frame between the bale accumulating position and the bale discharging position responsive to the second hydraulic fluid cylinder moving between the first position of the second hydraulic fluid cylinder and the second position of the second hydraulic fluid cylinder, respectively, wherein the at least a portion of the load bed is in a horizontal position relative to the main frame when the at least a portion of the load bed is in the bale accumulating position to permit the at least a portion of the load bed to accumulate thereon the plurality of bales, and wherein the at least a portion of the load bed is in an inclined position relative to the main frame when the at least a portion of the load bed is in the bale discharging position to permit the at least a portion of the load bed to discharge the plurality of bales accumulated thereon to the ground surface.

70. Agricultural bale accumulator according to claim 67, further comprising: a bale position sensing module adapted to generate at least one bale position signal responsive to determining a position of at least one bale received and accumulated on at least one of the center load bed, the right load bed, the left load bed, the first extension table, and the second extension table, wherein the controller is adapted to generate the bale transfer signal and the bale discharge signal responsive to receiving the at least one bale position signal.

71. Agricultural bale accumulator comprising: a base module including:

a main frame positioned substantially horizontal to a ground surface;

a hitch assembly mechanically coupled to the main frame and adapted to mechanically couple and decouple a front side of the main frame to a mating hitch assembly on a rear side of an agricultural baler to permit the agricultural bale accumulator to be towed by the agricultural baler; and a load bed, having a substantially planar bale receiving surface, supported by the main frame and adapted to receive thereon a plurality of bales, having either a medium size or a large size, having a rectangular shape, including a leading bale immediately followed by a trailing bale, successively ejected from a bale chamber of the agricultural baler along a bale receiving axis in a bale traveling direction, opposite to a direction of travel of the agricultural bale accumulator, towards a rear side of the agricultural bale accumulator to accumulate the plurality of bales on the load bed, wherein the load bed further includes:
- a center load bed adapted to successively receive thereon each bale of the plurality of bales ejected from the bale chamber of the agricultural baler and to accumulate thereon a first bale of the plurality of bales;
- a right load bed, located adjacent to a right side of the center load bed, adapted to receive thereon a bale of the plurality of bales from the center load bed and to accumulate thereon a second bale of the plurality of bales; and
- a left load bed, located adjacent to a left side, opposite to the right side, of the center load bed, adapted to receive thereon a bale of the plurality of bales from the center load bed and to accumulate thereon a third bale of the plurality of bales;

a hydraulic fluid system including:
- a hydraulic fluid valve including a first set of hydraulic fluid ports, a second set of hydraulic fluid ports, and a third set of hydraulic fluid ports, and adapted to selectively couple pressurized hydraulic fluid received by the first set of hydraulic fluid ports from a hydraulic fluid source to one of the second set of hydraulic fluid ports and the third set of hydraulic fluid ports;
- a first set of hydraulic fluid lines adapted to be mechanically coupled to and in fluid communication with first set of hydraulic fluid ports to distribute the pressurized hydraulic fluid from the hydraulic fluid source to the first set of hydraulic fluid ports;
- a first hydraulic fluid cylinder mechanically coupled to and in fluid communication with the second set of hydraulic fluid ports, and adapted to move between a first position of the first hydraulic fluid cylinder and a second position of the first hydraulic fluid cylinder responsive to receiving the pressurized hydraulic fluid from the second set of hydraulic fluid ports;
- a second set of hydraulic fluid lines adapted to be mechanically coupled to and in fluid communication with the second set of hydraulic fluid ports to distribute the pressurized hydraulic fluid from the second set of hydraulic fluid ports to the first hydraulic fluid cylinder;
- a second hydraulic fluid cylinder mechanically coupled to and in fluid communication with the third set of hydraulic fluid ports, and adapted to move between a first position of the second hydraulic fluid cylinder and a second position of the second hydraulic fluid cylinder responsive to receiving the pressurized hydraulic fluid from the third set of hydraulic fluid ports;
- a third set of hydraulic fluid lines adapted to be mechanically coupled to and in fluid communication with the third set of hydraulic fluid ports to distribute the pressurized hydraulic fluid from the third set of hydraulic fluid ports to the second hydraulic fluid cylinder; and
- a controller adapted to cause the hydraulic fluid valve to selectively couple the pressurized hydraulic fluid from the first set of hydraulic fluid ports to one of the second set of hydraulic fluid ports and the third set of hydraulic fluid ports;
- a first accumulator module including a first mechanical part adapted to perform a first mechanical function and adapted to move between a first position of the first mechanical part and a second position of the first mechanical part responsive to the first hydraulic fluid cylinder moving between the first position of the first hydraulic fluid cylinder and the second position of the first hydraulic fluid cylinder, respectively, and
- a second accumulator module including a second mechanical part adapted to perform a second mechanical function, different from the first function, and adapted to move between a first position of the second mechanical part and a second position of the second mechanical part responsive to the second hydraulic fluid cylinder moving between the first position of the second hydraulic fluid cylinder and the second position of the second hydraulic fluid cylinder, respectively.

72. Agricultural bale accumulator according to claim 71, further comprising:
- an operator control console adapted to be electrically coupled to the controller to permit an operator to generate an operator control signal causing the controller to selectively couple the pressurized hydraulic fluid from the first set of hydraulic fluid ports to one of the second set of hydraulic fluid ports and the third set of hydraulic fluid ports.

73. Agricultural bale accumulator according to claim 71, wherein the base module further comprises:
- first and second pairs of castor wheels mechanically coupled to the main frame at first and second locations, respectively, and adapted to pivot about first and second vertical axes, respectively, wherein the first and second pair of castor wheels, having a common axis of rotation transverse to a longitudinal axis of the agricultural bale accumulator, support the agricultural bale accumulator from the ground surface to permit the agricultural bale accumulator to be transported across the ground surface in the direction of travel.

74. Agricultural bale accumulator according to claim 71, wherein the first accumulator module and the second accumulator module further comprise:
- a bale transfer module and a bale discharge module, respectively,
- wherein the bale transfer module is adapted to alternately transfer each of the plurality of bales, received by and accumulated on the center load bed, across the load bed to the right load bed and to the left load bed along a bale transfer axis transverse to the bale receiving axis responsive to the bale transfer signal to accumulate the plurality of bales on at least one of the center load bed, the right load bed, and the left load bed in a side-by-side relationship, wherein the bale transfer module further comprises:
  - a first push mechanism extending above the bale receiving surface of the load bed and having a longitudinal axis disposed substantially parallel to the bale receiving axis, wherein the first push mechanism is adapted move between a first position and a second position responsive to the first hydraulic fluid cylinder moving between the first position of the first hydraulic fluid cylinder and the second position of the first hydraulic cylinder, respectively, wherein the first push mechanism is in the first position when the first push mechanism is located at a right side of the center load, wherein the first push mechanism is in the second position when the first push mechanism is located at a left side of the center load bed, wherein the first push mechanism is adapted to push a bale from the center load bed to the left load bed along the bale transfer axis responsive to the first push mechanism moving from the first position to the second position, and wherein the first push mechanism is adapted to push a bale from the center load bed to the right load bed along the bale transfer axis responsive to the first push mechanism moving from the second position to the first position; and wherein the bale discharge module is adapted to move between the bale accumulating position and the bale discharging position responsive to thea bale discharge signal to discharge at least one of the plurality of bales accumulated on the load bed to a ground surface, wherein the agricultural bale accumulator is adapted to accumulate at least one of the plurality of bales on the load bed when the bale discharge module is located in the bale accumulating position, and wherein the agricultural bale accumulator is adapted to discharge at least one of the plurality of bales accumulated on the load bed to the ground surface when the bale discharge module is moved from the bale accumulating position to the bale discharging position, wherein the bale discharge module further comprises:

a second push mechanism extending above the bale receiving surface of the load bed and having a longitudinal axis disposed substantially transverse to the bale receiving axis, wherein the second push mechanism is adapted move along a bale discharge axis parallel to the bale receiving axis between the bale accumulating position and the bale discharging position responsive to the second hydraulic fluid cylinder moving between the first position of the second hydraulic fluid cylinder and the second position of the second hydraulic fluid cylinder, respectively, wherein the second push mechanism is in the bale accumulating position when the second push mechanism is located near a front side of the load bed, wherein the second push mechanism is in the bale discharging position when the second push mechanism is moved towards a rear side of the load bed.

75. Agricultural bale accumulator according to claim 71, wherein the first accumulator module and the second accumulator module further comprise two different corresponding modules selected from the following modules:
a bale movement module;
a load bed extension module;
a bale transfer module; and
a bale discharge module.

76. Agricultural bale accumulator according to claim 75, wherein the load bed extension module, when included with the agricultural bale accumulator, further includes:
a first extension table, having a substantially planar bale receiving surface, adapted to receive thereon a bale of the plurality of bales from the right load bed and to accumulate thereon a fourth bale of the plurality of bales;
a first attachment mechanism adapted to connect the first extension table to a right side of the right load bed to permit the first extension table to be moveable relative to the right load bed between a stowed position and an unstowed position, wherein the first extension table is disposed substantially co-planar with the right load bed and adjacent to the right side of the right load bed when the first extension table is in the unstowed position to permit the first extension table to accumulate thereon the fourth bale, and wherein the first extension table is prevented from accumulating thereon the fourth bale when the first extension table is in the stowed position;
a second extension table, having a substantially planar bale receiving surface, adapted to receive thereon a bale of the plurality of bales from the left load bed and to accumulate thereon a fifth bale of the plurality of bales; and
a second attachment mechanism adapted to connect the second extension table to a left side of the left load bed to permit the second extension table to be moveable relative to the left load bed between a stowed position and an unstowed position, wherein the second extension table is disposed substantially co-planar with the left load bed and adjacent to the left side of the left load bed when the second extension table is in the unstowed position to permit the second extension table to accumulate thereon the fifth bale, wherein the second extension table is prevented from accumulating thereon the fifth bale when the second extension table is in the stowed position;
wherein the bale accumulator has a first lateral width dimension when the first extension table and the second extension table are each in their stowed positions to provide a first bale accumulating capacity and a first bale discharging capacity, and wherein the bale accumulator has a second lateral width dimension, longer than the first lateral width dimension, when the first extension table and the second extension table are each in their unstowed positions to provide a second bale accumulating capacity greater than the first bale accumulating capacity and a second bale discharging capacity greater than the first bale discharging capacity,
wherein the bale transfer module, when included with the agricultural bale accumulator, is adapted to alternately transfer each of the plurality of bales, received by and accumulated on the center load bed, across the load bed to the right load bed and to the left load bed along a bale transfer axis transverse to the bale receiving axis responsive to a bale transfer signal to accumulate the plurality of bales on at least one of the center load bed, the right load bed, the left load bed, the first extension table, and the second extension table in a side-by-side relationship. and
wherein the bale discharge module, when included with the agricultural bale accumulator, is adapted to move between the bale accumulating position and the bale discharging position responsive to a bale discharge signal to discharge at least one of the plurality of bales accumulated on the load bed to the ground surface, wherein the agricultural bale accumulator is adapted to accumulate at least one of the plurality of bales on at least one of the load bed and the load bed extension module when the bale discharge module is located in the bale accumulating position, and wherein the agricultural bale accumulator is adapted to discharge at least one of the plurality of bales accumulated on at least one of the load bed and the load bed extension module to the ground surface when the bale discharge module is moved from the bale accumulating position to the bale discharging position.

77. Agricultural bale accumulator according to claim 76, wherein the bale transfer module further comprises:

a first push mechanism extending above the bale receiving surface of the load bed and having a longitudinal axis disposed substantially parallel to the bale receiving axis, wherein the first push mechanism is adapted move between a first position and a second position responsive to the first hydraulic fluid cylinder moving between the first position of the first hydraulic fluid cylinder and the second position of the first hydraulic fluid cylinder, respectively, wherein the first push mechanism is in the first position when the first push mechanism is located at a right side of the center load, wherein the first push mechanism is in the second position when the first push mechanism is located at a left side of the center load bed, wherein the first push mechanism is adapted to push a bale from the center load bed to the left load bed along the bale transfer axis responsive to the first push mechanism moving from the first position to the second position, and wherein the first push mechanism is adapted to push a bale from the center load bed to the right load bed along the bale transfer axis responsive to the first push mechanism moving from the second position to the first position, and wherein the bale discharge module further comprises:

a second push mechanism extending above the bale receiving surface of the load bed and having a longitudinal axis disposed substantially transverse to the bale receiving axis, wherein the second push mechanism is adapted move between the bale accumulating position and the bale discharging position responsive to the second hydraulic fluid cylinder moving between the first position of the second hydraulic fluid cylinder and the second position of the second hydraulic fluid cylinder, respectively, wherein the second push mechanism is in the bale accumulating position when the second push mechanism is located near a front side of the load bed, wherein the second push mechanism is in the bale discharging position when the second push mechanism moved towards the rear side of the load bed.

78. Agricultural bale accumulator according to claim 71, wherein the first accumulator module and the second accumulator module further comprise:

a bale transfer module and a bale discharge module, respectively, wherein the bale transfer module is adapted to alternately transfer each of the plurality of bales, received by and accumulated on the center load bed, across the load bed to the right load bed and to the left load bed along a bale transfer axis transverse to the bale receiving axis responsive to a bale transfer signal to accumulate the plurality of bales on at least one of the center load bed, the right load bed, and the left load bed in a side-by-side relationship, wherein the bale transfer module further comprises:

a first push mechanism extending above the bale receiving surface of the load bed and having a longitudinal axis disposed substantially parallel to the bale receiving axis, wherein the first push mechanism is adapted move between a first position and a second position responsive to the first hydraulic fluid cylinder moving between the first position of the first hydraulic fluid cylinder and the second position of the first hydraulic fluid cylinder, respectively, wherein the first push mechanism is in the first position when the first push mechanism is located at a right side of the center load, wherein the first push mechanism is in the second position when the first push mechanism is located at a left side of the center load bed, wherein the first push mechanism is adapted to push a bale from the center load bed to the left load bed along the bale transfer axis responsive to the first push mechanism moving from the first position to the second position, and wherein the first push mechanism is adapted to push a bale from the center load bed to the right load bed along the bale transfer axis responsive to the first push mechanism moving from the second position to the first position; and wherein the bale discharge module is adapted to move between the bale accumulating position and the bale discharging position responsive to thea bale discharge signal to discharge at least one of the plurality of bales accumulated on the load bed to a ground surface, wherein the agricultural bale accumulator is adapted to accumulate at least one of the plurality of bales on the load bed when the bale discharge module is located in the bale accumulating position, and wherein the agricultural bale accumulator is adapted to discharge at least one of the plurality of bales accumulated on the load bed to the ground surface when the bale discharge module is moved from the bale accumulating position to the bale discharging position, wherein the bale discharge module further comprises:

at least a portion of the load bed pivotally connected to a main frame about a pivot point disposed on a horizontal pivot axis and moveable relative to the main frame between the bale accumulating position and the bale discharging position responsive to the second hydraulic fluid cylinder moving between the first position of the second hydraulic fluid cylinder and the second position of the second hydraulic fluid cylinder, respectively, wherein the at least a portion of the load bed is in a horizontal position relative to the main frame when the at least a portion of the load bed is in the bale accumulating position to permit the at least a portion of the load bed to accumulate thereon the plurality of bales, and wherein the at least a portion of the load bed is in an inclined position relative to the main frame when the at least a portion of the load bed is in the bale discharging position to permit the at least a portion of the load bed to discharge the plurality of bales accumulated thereon to the ground surface.

79. Agricultural bale accumulator according to claim 76, further comprising:

a bale position sensing module adapted to generate at least one bale position signal responsive to determining a position of at least one bale received and accumulated on at least one of the center load bed, the right load bed, the left load bed, the first extension table, and the second extension table, wherein the controller is adapted to generate the bale transfer signal and the bale discharge signal responsive to receiving the at least one bale position signal.

80. An agricultural bale accumulator comprising:

a base module including:

a main frame positioned substantially horizontal to a ground surface;

a hitch assembly mechanically coupled to the main frame and adapted to mechanically couple and decouple a front side of the main frame to a mating hitch assembly on a rear side of an agricultural baler to permit the agricultural bale accumulator to be towed by the agricultural baler;

first and second pairs of castor wheels mechanically coupled to the main frame at first and second locations, respectively, and adapted to pivot about first and second vertical axes, respectively, wherein the first and second pair of castor wheels, having a common axis of rotation transverse to a longitudinal axis of the agricultural bale accumulator, support the agricultural bale accumulator from the ground surface to permit the agricultural bale accumulator to be transported across the ground surface in a direction of travel; and a load bed, having a substantially planar bale receiving surface, mechanically coupled to the main frame in a substantially horizontal position, and adapted to receive thereon a plurality of bales) having either a medium size or a large size, having a rectangular shape, including a leading bale immediately followed by a trailing bale, successively ejected from a bale chamber of the agricultural baler along a bale receiving axis in a bale traveling direction, opposite to the direction of travel of the agricultural bale accumulator, towards a rear side of the agricultural bale accumulator to accumulate the plurality of bales on the load bed, wherein the load bed further includes:

a center load bed adapted to successively receive thereon each bale of the plurality of bales ejected from the bale chamber of the agricultural baler and to accumulate thereon a first bale of the plurality of bales;

a right load bed, located adjacent to a right side of the center load bed, adapted to receive thereon a bale of the plurality of bales from the center load bed and to accumulate thereon a second bale of the plurality of bales; and a left load bed, located adjacent to a left side, opposite to the right side, of the center load bed, adapted to receive thereon a bale of the plurality of bales from the center load bed and to accumulate thereon a third bale of the plurality of bales;

a bale position sensing module adapted to generate at least one bale position signal responsive to determining a position of at least one bale received and accumulated on at least one of the center load bed, the right load bed, and the left load bed;

a hydraulic fluid system including:

a hydraulic fluid valve including a first set of hydraulic fluid ports, a second set of hydraulic fluid ports, and a third set of hydraulic fluid ports, and adapted to selectively couple pressurized hydraulic fluid received by the first set of hydraulic fluid ports from a hydraulic fluid source to one of the second set of hydraulic fluid ports and the third set of hydraulic fluid ports;

a first set of hydraulic fluid lines adapted to be mechanically coupled to and in fluid communication with first set of hydraulic fluid ports to distribute the pressurized hydraulic fluid from the hydraulic fluid source to the first set of hydraulic fluid ports;

a first hydraulic fluid cylinder mechanically coupled to and in fluid communication with the second set of hydraulic fluid ports, and adapted to move between a first position of the first hydraulic fluid cylinder and a second position of the first hydraulic fluid cylinder responsive to receiving the pressurized hydraulic fluid from the second set of hydraulic fluid ports;

a second set of hydraulic fluid lines adapted to be mechanically coupled to and in fluid communication with the second set of hydraulic fluid ports to distribute the pressurized hydraulic fluid from the second set of hydraulic fluid ports to the first hydraulic fluid cylinder;

a second hydraulic fluid cylinder mechanically coupled to and in fluid communication with the third set of hydraulic fluid ports, and adapted to move between a first position of the second hydraulic fluid cylinder and a second position of the second hydraulic fluid cylinder responsive to receiving the pressurized hydraulic fluid from the third set of hydraulic fluid ports;

third set of hydraulic fluid lines adapted to be mechanically coupled to and in fluid communication with the third set of hydraulic fluid ports to distribute the pressurized hydraulic fluid from the third set of hydraulic fluid ports to the second hydraulic fluid cylinder; and a controller adapted to cause the hydraulic fluid valve to selectively couple the pressurized hydraulic fluid from the first set of hydraulic fluid ports to one of the second set of hydraulic fluid ports and the third set of hydraulic fluid ports responsive to receiving a bale transfer signal and a bale discharge signal, respectively, wherein each of the bale transfer signal and the bale discharge signal is represented by one of the at least one bale position signal and an operator control signal;

an operator control console adapted to be electrically coupled to the controller to permit an operator to generate the operator control signal; a bale transfer module adapted to alternately transfer each of the plurality of bales, received by and accumulated on the center load bed, across the load bed to the right load bed and to the left load bed along a bale transfer axis transverse to the bale receiving axis responsive to the bale transfer signal to accumulate the plurality of bales on at least one of the center load bed, the right load bed, and the left load bed in a side-by-side relationship, wherein the bale transfer module further includes:

a first push mechanism extending above the bale receiving surface of the load bed and having a longitudinal axis disposed substantially parallel to the bale receiving axis, wherein the first push mechanism is adapted move between a first position and a second position responsive to the first hydraulic fluid cylinder moving between the first position of the first hydraulic fluid cylinder and the second position of the first hydraulic fluid cylinder, respectively, wherein the first push mechanism is in the first position when the first push mechanism is located at a right side of the center load, wherein the first push mechanism is in the second position when the first push mechanism is located at a left side of the center load bed, wherein the first push mechanism is adapted to push a bale from the center load bed to the left load bed along the bale transfer axis responsive to the first push mechanism moving from the first position to the second position, and wherein the first push mechanism is adapted to push a bale from the center load bed to the right load bed along the bale transfer axis responsive to the first push mechanism moving from the second position to the first position; and a bale discharge module adapted to move between the bale accumulating position and the bale discharging position responsive to the bale discharge signal to discharge at least one of the plurality of bales accumulated on the load bed to the ground surface, wherein the agricultural bale accumulator is adapted to accumulate at least one of the plurality of bales on the load bed when the bale discharge module is located in the bale accumulating position, and wherein the agricultural bale accumulator is adapted to discharge at least one of the plurality of bales accumulated on the load bed to the ground surface when the bale discharge module is moved from the bale accumulating position to the bale discharging position, wherein the bale discharge module further comprises:

a second push mechanism extending above the bale receiving surface of the load bed and having a longitudinal axis disposed substantially transverse to the bale receiving axis, wherein the second push mechanism is adapted move along a bale discharge axis parallel to the bale receiving axis between the bale accumulating position and the bale discharging position responsive to the second hydraulic fluid cylinder moving between the first position of the second hydraulic fluid cylinder and the second position of the second hydraulic fluid cylinder, respectively, wherein the second push mechanism is in the bale accumulating position when the second push mechanism is located near a front side of the load bed, wherein the second push mechanism is in the bale discharging position when the second push mechanism is moved towards a rear sideof the load bed.

* * * * *